(12) United States Patent
Tally et al.

(10) Patent No.: US 11,802,061 B2
(45) Date of Patent: Oct. 31, 2023

(54) WATER TREATMENT SYSTEM

(71) Applicant: Renew Health Ltd., Athlone (IE)

(72) Inventors: William N Tally, Milford, MI (US);
Mitch O'Brien, Royal Oak, MI (US);
Thomas Reesbeck, Farmington Hills, MI (US); Michael Kovalcik, Farmington Hills, MI (US); Dereck Kowalski, Macomb, MI (US); Jeff Drulia, Royal Oak, MI (US); Alex Ruffolo, Ferndale, MI (US); Jack Juni, Royal Oak, MI (US)

(73) Assignee: Renew Health Ltd., Athlone (IE)

( * ) Notice: Subject to any disclaimer, the term of this patent is extended or adjusted under 35 U.S.C. 154(b) by 0 days.

(21) Appl. No.: 16/980,381

(22) PCT Filed: Mar. 13, 2019

(86) PCT No.: PCT/US2019/022061
§ 371 (c)(1),
(2) Date: Sep. 12, 2020

(87) PCT Pub. No.: WO2019/178235
PCT Pub. Date: Sep. 19, 2019

(65) Prior Publication Data
US 2021/0024382 A1  Jan. 28, 2021

Related U.S. Application Data

(60) Provisional application No. 62/768,419, filed on Nov. 16, 2018, provisional application No. 62/765,398, (Continued)

(51) Int. Cl.
*C02F 1/44* (2023.01)
*B01D 61/02* (2006.01)
(Continued)

(52) U.S. Cl.
CPC ............ *C02F 1/441* (2013.01); *B01D 61/025* (2013.01); *B01D 61/08* (2013.01); *B01D 61/12* (2013.01);
(Continued)

(58) Field of Classification Search
CPC .. C02F 1/001; C02F 1/44; C02F 1/441; C02F 2201/005; C02F 2201/006; C02F 2209/03;
(Continued)

(56) References Cited

U.S. PATENT DOCUMENTS 5,399,260 A * 3/1995 Eldredge .................. C02F 1/76
                                                                210/411
6,120,688 A    9/2000 Daly
(Continued)

FOREIGN PATENT DOCUMENTS

NL       1030532 C2 *  5/2007  .............. C02F 1/001
WO   WO-2014061695 A1 *  4/2014  ............. B01D 65/02
WO    WO2017/083836 A9   5/2017

OTHER PUBLICATIONS

English translation of NL-1030532-C2 copies from PE2E search database (Year: 2007).*

(Continued)

*Primary Examiner* — Terry K Cecil
(74) *Attorney, Agent, or Firm* — Oakland Law Group, PLLC

(57) ABSTRACT

The disclosure relates to water treatment systems that may be used to remove impurities from water, particularly systems that inserted at the point of entry of a water supply into a building.

9 Claims, 50 Drawing Sheets

Related U.S. Application Data filed on Aug. 22, 2018, provisional application No. 62/720,999, filed on Aug. 22, 2018, provisional application No. 62/672,250, filed on May 16, 2018, provisional application No. 62/642,592, filed on Mar. 13, 2018.

(51) Int. Cl.
*B01D 61/08* (2006.01)
*B01D 61/12* (2006.01)
*B01D 65/02* (2006.01)
*C02F 1/00* (2023.01)

(52) U.S. Cl.
CPC .............. *B01D 65/02* (2013.01); *C02F 1/001* (2013.01); *B01D 2311/14* (2013.01); *B01D 2311/246* (2013.01); *B01D 2311/2649* (2013.01); *B01D 2313/105* (2013.01); *B01D 2313/125* (2013.01); *B01D 2313/18* (2013.01); *B01D 2313/32* (2013.01); *B01D 2313/44* (2013.01); *B01D 2317/04* (2013.01); *B01D 2321/12* (2013.01); *B01D 2321/14* (2013.01); *C02F 2201/005* (2013.01); *C02F 2201/006* (2013.01); *C02F 2209/03* (2013.01); *C02F 2209/10* (2013.01); *C02F 2209/40* (2013.01); *C02F 2303/16* (2013.01)

(58) Field of Classification Search
CPC .............. C02F 2209/10; C02F 2209/40; C02F 2303/16; B01D 2311/14; B01D 2311/16; B01D 2311/246; B01D 2311/2649; B01D 2313/105; B01D 2313/125; B01D 2313/18; B01D 2313/20; B01D 2313/32; B01D 2313/44; B01D 2313/50; B01D 2317/04; B01D 2319/04; B01D 2321/02; B01D 2321/12; B01D 2321/14; B01D 61/025; B01D 61/08; B01D 61/12; B01D 65/02

See application file for complete search history.

(56) References Cited

U.S. PATENT DOCUMENTS

| | | | |
|---|---|---|---|
| 6,436,282 B1 | 8/2002 | Gundrum et al. | |
| 7,628,921 B2 | 12/2009 | Efraty | |
| 7,695,614 B2 | 4/2010 | Efraty | |
| 8,025,804 B2 | 9/2011 | Efraty | |
| 2003/0127388 A1 | 7/2003 | Ando | |
| 2008/0093275 A1* | 4/2008 | Brown | B01D 63/061 210/321.78 |
| 2009/0194478 A1 | 8/2009 | Saveliev | |
| 2009/0253019 A1 | 10/2009 | Yokozawa | |
| 2010/0219130 A1* | 9/2010 | Kopp | B01D 63/00 210/650 |
| 2014/0021115 A1 | 1/2014 | Ellegaard | |

OTHER PUBLICATIONS

Valve and Automation for Hygienic Use, Alfa Laval Corporate AB Brochure. 2011.
Material Selection Guide, 2009. Reichhold Inc.
Written Opinion of the International Searching Authority, PCT/US2019/022061, dated May 28, 2019.
Extended European Search Report for Application No. 1966864.3, dated Oct. 18, 2021.
Written Opinion of International Searching Authority for Application No. PCT/US2020/036855, dated Sep. 4, 2020.

* cited by examiner

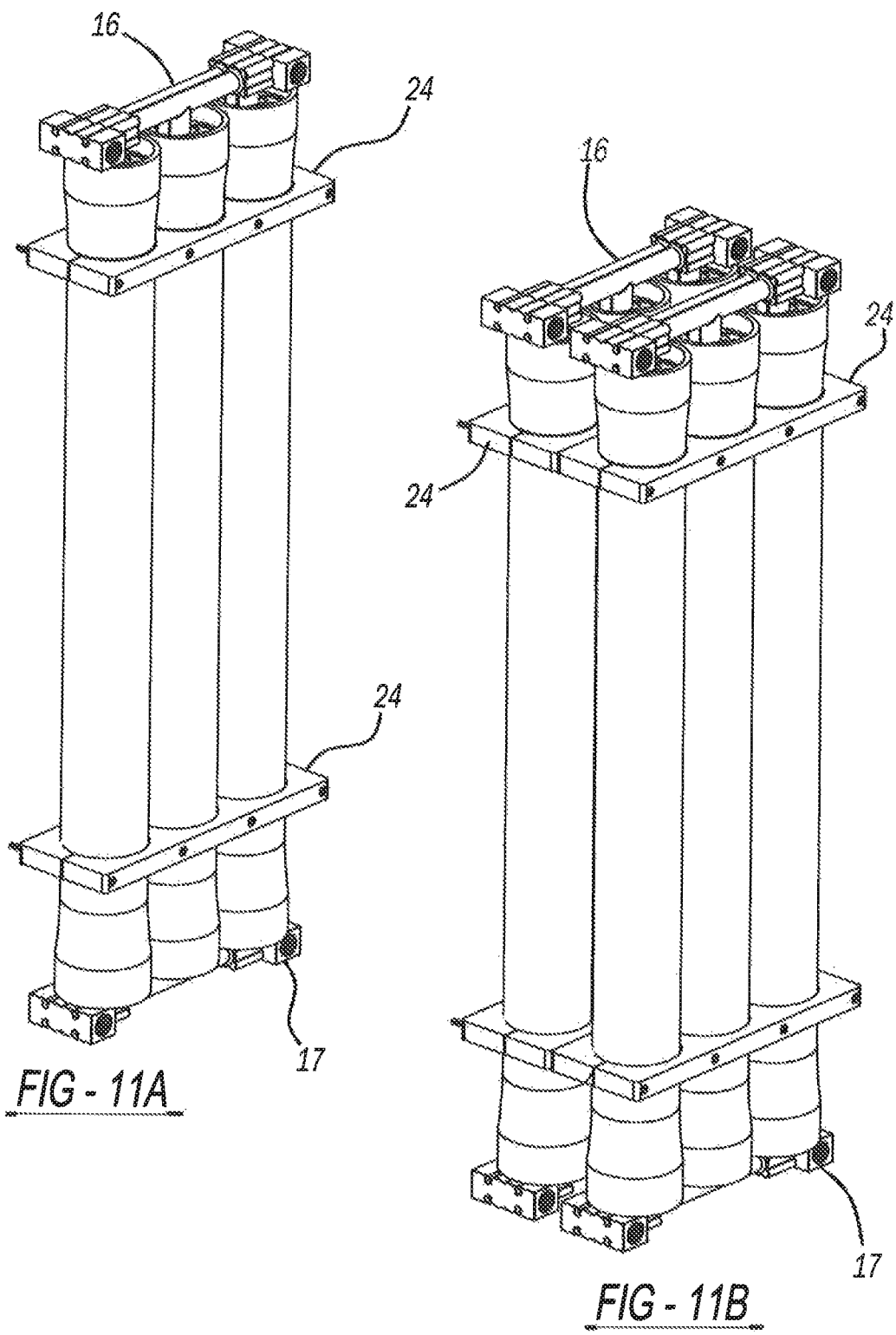

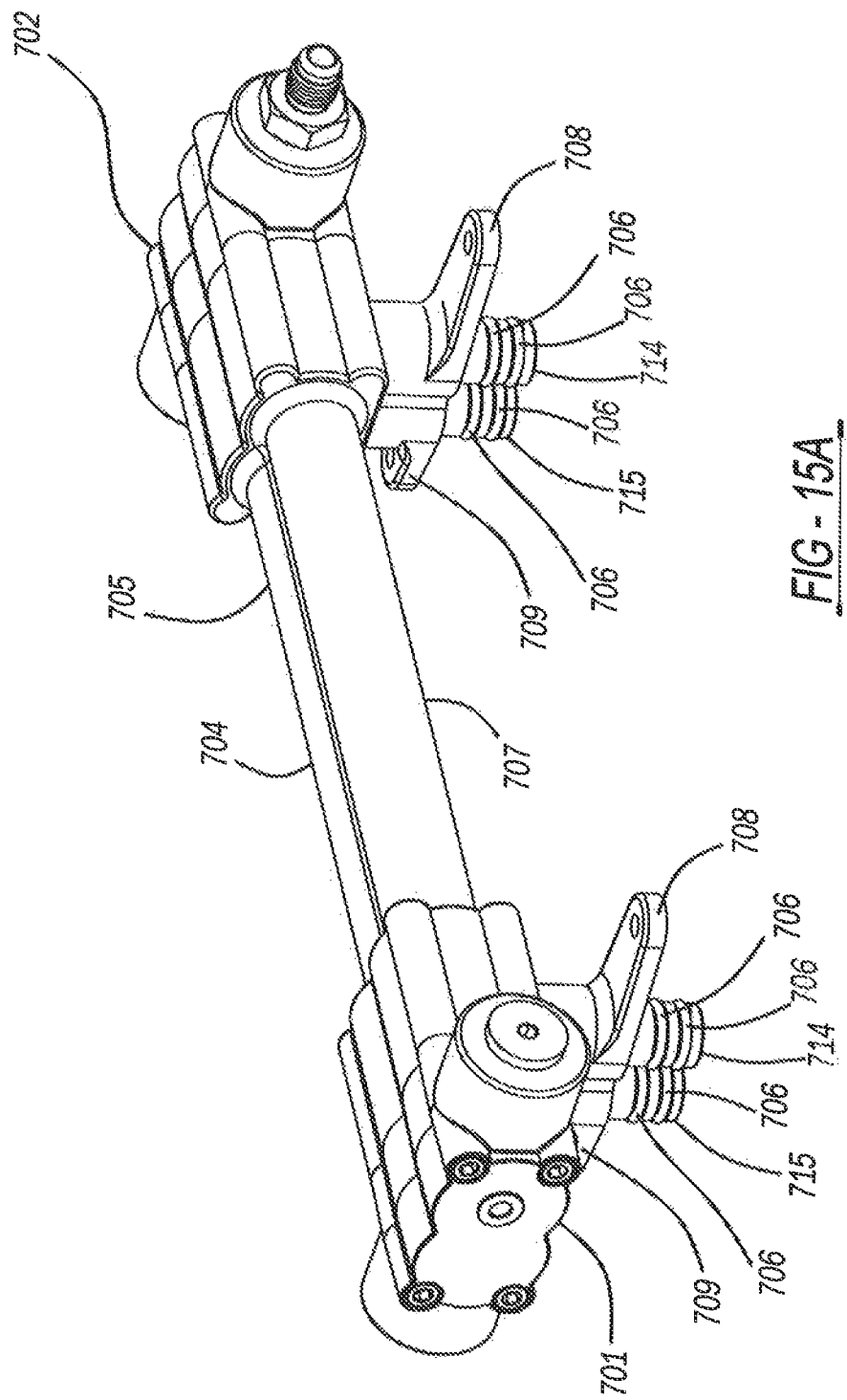

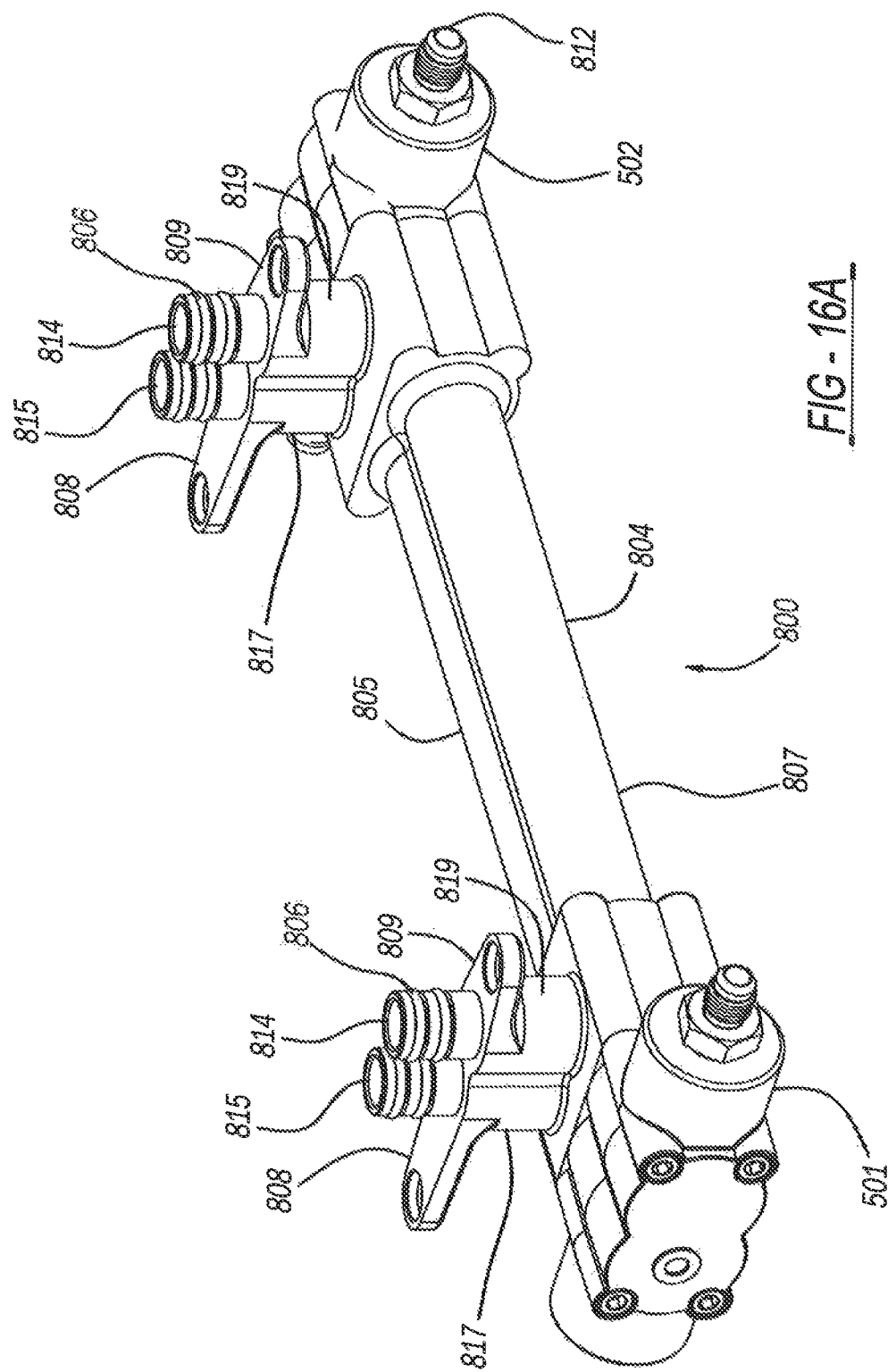

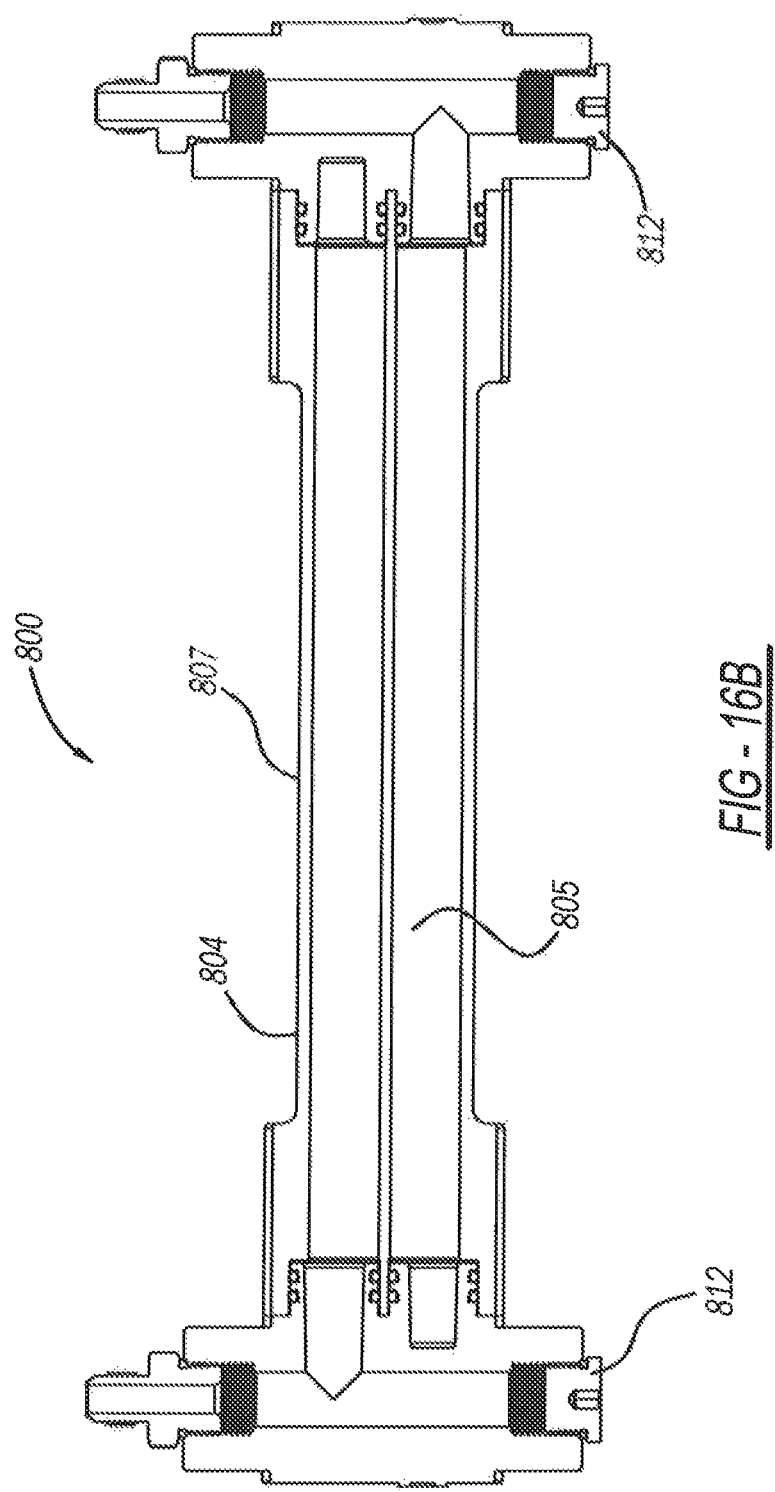

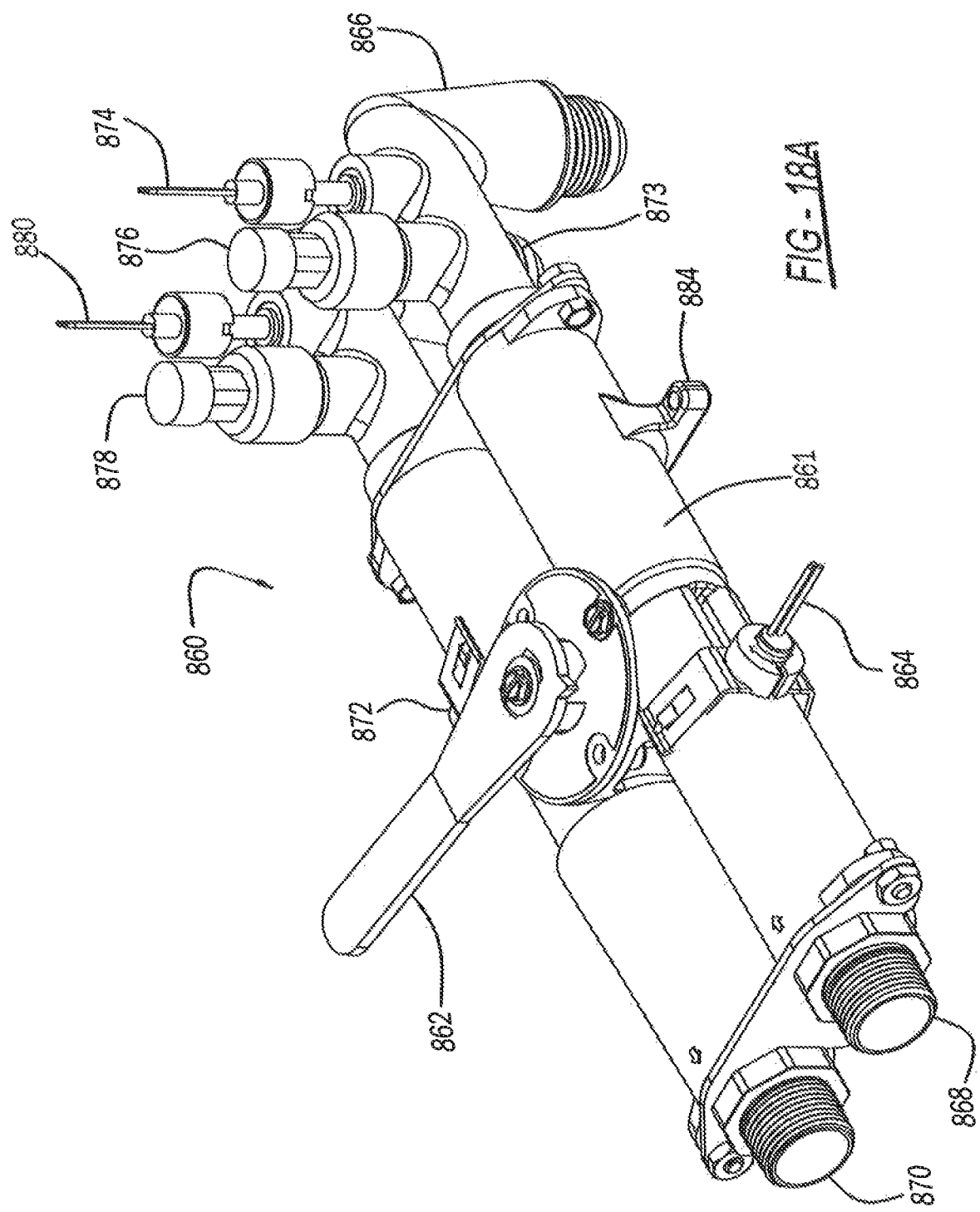

WATER TREATMENT SYSTEM

BACKGROUND

Water quality remains a concern for many individuals and organizations. For example, municipalities are often challenged to meet water quality standards. Further, some individuals do not rely on a municipality's water supply but use well water or some other water source and these individuals may desire further purification of the water from their water source. In addition, many people would prefer a water supply that exceeds established (e.g. government-designated) water quality standards.

Thus, some individuals or organizations may find it desirable to further purify water supplied to a building or an area in many situations. There is a need for water treatment systems that may be placed at or near the point of entry of water supply to a building. Existing systems are unwieldy, have a large footprint and have a poor efficiency with respect to recovery of purified water. Additionally, there is also a need for these systems to be easy to use, to assemble and to monitor by an inexperienced user, such as the owner or occupant of a building.

SUMMARY

The disclosure relates to water treatment systems that are easy to assemble and monitor. The disclosure also relates to those systems that may fit within a building at the point of entry of the water supply but retain a high capacity for water purification.

BRIEF DESCRIPTION OF DRAWINGS

FIGS. 11A-11J show views of reverse osmosis cassettes according to the disclosure.

FIGS. 15A-15B show views of further examples of a top manifold according to the disclosure FIGS. 16A-16B show views of examples of a bottom manifold according to the disclosure FIGS. 18A-18D show views of an example of a bypass unit according to the disclosure FIGS. 19 A-19H show views of an example of a combination valve according to the disclosure

DETAILED DESCRIPTION

Figure 1:
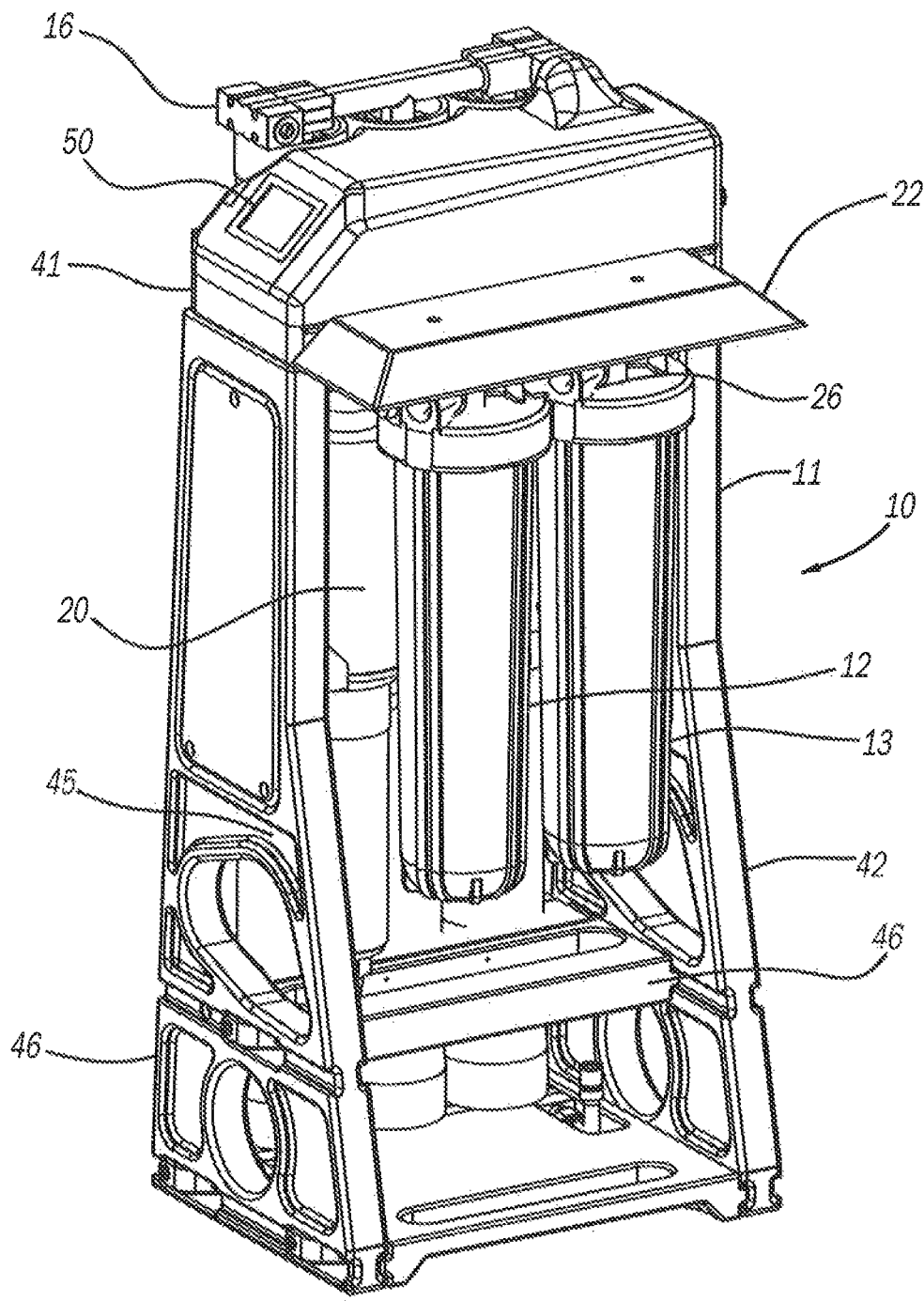
FIG. 1 shows a view of one example of a water treatment system according to the disclosure from one side.
Figure 2:
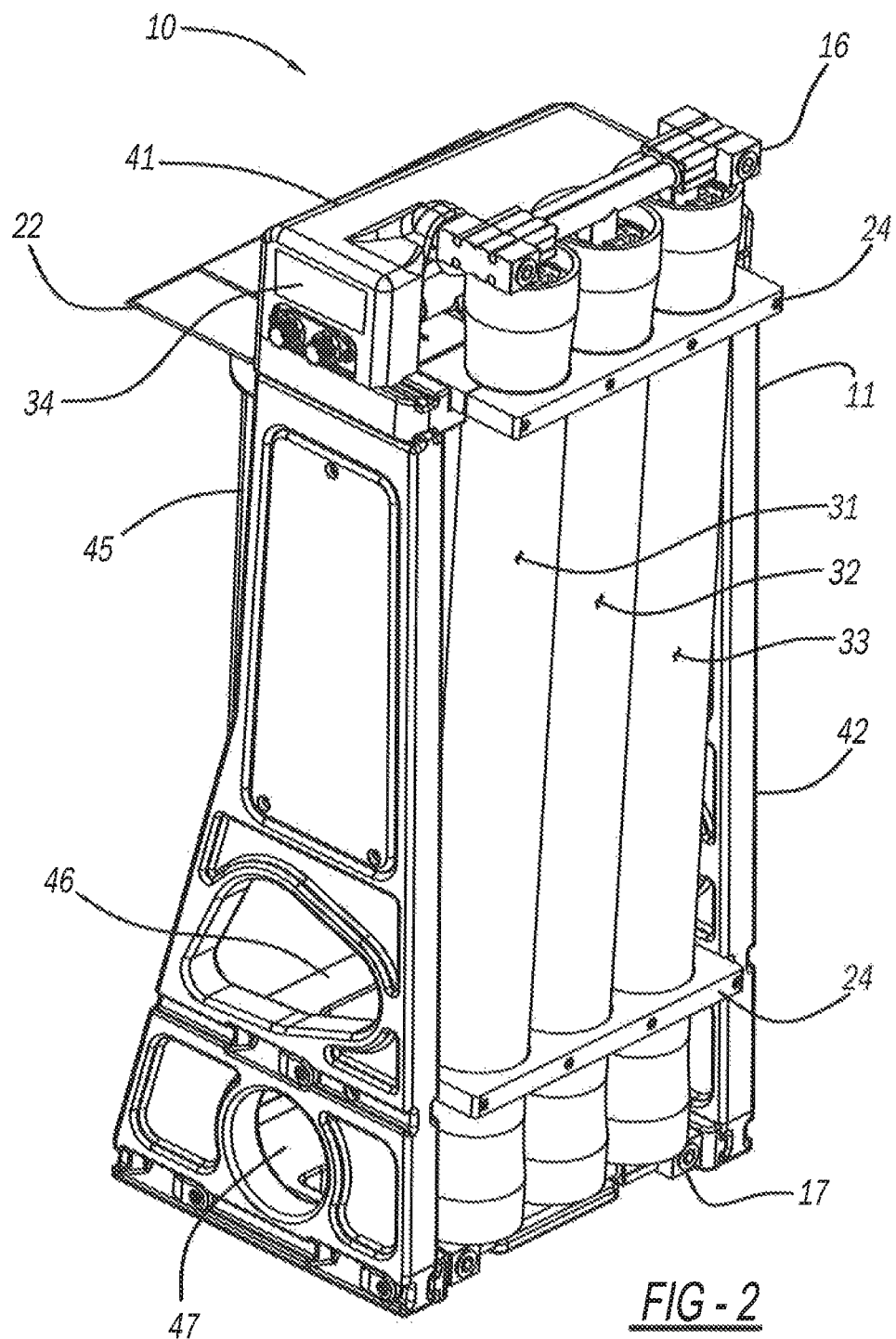
FIG. 2 shows a view of water treatment system according to the disclosure from another side

The systems and methods described herein are not limited in their application to the details of construction and the arrangement of components set forth in the description or illustrated in the drawings. The present disclosure is capable of other disclosure and of being practiced or of being carried out in various ways. Also, the phraseology and terminology used herein is for the purpose of description and should not be regarded as limiting. The use of "including", "comprising", "having", "containing", "involving" and variations thereof herein, is meant to encompass the items listed thereafter, equivalents thereof, and additional items, as well as alternate examples consisting of the items listed thereafter exclusively.

Other aspects, embodiments, and advantages of these exemplary aspects and embodiments are discussed in detail below. This description is intended to provide an overview or framework for understanding the nature and character of the claimed aspects and examples. The accompanying drawings are included to provide illustration and a further understanding of the various aspects and embodiments, and are incorporated in and constitute a part of this specification. The drawings, together with the specification, serve to explain the described and claimed aspects and embodiments.

The present disclosure relates to systems that may be used to increase the purity of water. According to the disclosure, the systems reduce the concentration of impurities or undesirable material in input or feed water samples that are inputted or flowed into the systems. That is, water treatment systems of the disclosure may produce an output water that has reduced concentrations of dissolved, suspended, particulate, or non-dissolved impurities compared to the concentrations of these impurities in input or feed water samples. In preferred examples, systems of the disclosure may reduce the total dissolved solids (TDS) of input water. The systems of the disclosure may reduce particulates, such as non-dissolved material, where the particulates may have a range of sizes or shapes. The systems may reduce the concentration of molecules dissolved in the input water. Systems of the disclosure may reduce the concentration of charged or uncharged molecules, ions, organic or inorganic compounds.

Systems of the disclosure may be customized to address a particular water treatment situation. For example, and without limitation, additional components may be added to further reduce soluble or insoluble components removed from a system to address situations where input water that may have greater or lesser amounts of some impurities or undesirable material, such as either dissolved or undissolved material. In preferred examples, systems of the disclosure may be used to treat water delivered to a residential or commercial building. That is, the system may be placed at or near the point of entry of the water supply into a building. In preferred examples, systems of the disclosure are compatible for use in a private residence. The water supply for the private residence may be from a city or otherwise public water supply. In other examples, the water may be sourced, for example, from a well.

In particularly preferred examples, a water treatment system is connected to the water supply of a single family residence. Systems of the disclosure may also be used to purify water supplied to a commercial building, including a multi-office building. Systems may be scaled to accommodate a particular situation. For example, two or more units may be linked to provide a larger capacity that may be used in multi-dwelling residential buildings or in commercial establishments, depending on requirements In general, the source of the water supply is not limited for water treatment systems of the disclosure.

The water treatment systems of the disclosure may be connected to hydro-pneumatic storage tanks where the output, purified water is stored in the tank. In hydro pneumatic tanks, water is stored under pressure. In general, air is introduced into the tank, where the air may apply pressure to permit water flow out of the tank or where air pressure is reduced to allow the tank to fill. According to the disclosure, hydro pneumatic tanks may include a bladder or diaphragm where water may be flowed into and stored in the bladder or diaphragm. The bladder or diaphragm may be under pressure from air contained within the tank. In this way, water may be supplied or delivered to a source for use in a building such as a residence. In other examples, the water under pressure may be used to flush the system with clean water. In other examples, water may be stored in unpressurized tanks. In preferred examples, tanks may contain about 20 to about 300 gallons, or about 50 to about 200 gallons, or about 50 to 100 gallons.

In preferred examples, the water treatment systems of the disclosure system are able to use a standard power outlet. For example, a water system may use a standard 110 volt, 15 ampere outlet. In these and other examples, a water treatment system may operate using less than about 2500 watts, or less than about 2000 watts or less than about 1500 watts, or less than about 1000 watts.

Systems of the disclosure may have a small footprint or may be relatively lightweight. The systems may be self-contained. The systems of the disclosure may be easily assembled by a non-professional. The systems may be assembled in a relatively confined space. Systems of the disclosure may be assembled using modular units, where the modular units may contain one or more components of a water treatment system. The modular units may be removed and a replacement modular unit inserted. The water treatment systems may have an easy-to-assemble frame.

The dimensions of a water treatment system may be customized to fit a particular situation. Similarly, the weight of a system will vary depending on components used. Systems of the disclosure may have a total weight of from about 100 pounds to about 250 pounds, or about 100 pounds to about 200 pounds or from about 100 pounds to about 150 pounds. In preferred examples, systems of the disclosure weigh about 110 to about 160 pounds. For example, a preferred example according to the disclosure weighs about 140 pounds. Another preferred example of the disclosure weighs about 124 pounds.

In preferred examples, systems of the disclosure may be from about 15 to 40 inches in length, from about 15 to about 40 inches wide and from about 25 to about 60 inches high. In preferred examples, a system may be about 19 inches long, about 22 inches wide and about 49 inches high. In other examples, the dimensions may vary depending on the components added.

The water treatment systems used in residences may provide all of the water required for a residence. For example, the water treatment system may provide up to 20 gallons of purified water, or may provide up to about 15 gallons per minute of purified water, or up to about 10 gallons per minute of purified water, or up to about 7 gallons per minute of purified water or up to about 5 gallons per minute of purified water. In other examples, systems of the disclosure may provide a portion of a building's total water supply.

The water treatment systems of the disclosure generally have a combination of filtration units and reverse osmosis cartridges. In preferred examples, a water treatment system has at least one filtration unit and at least one reverse osmosis cartridge. For example, and without limitation, the at least one filtration unit may be a 0.1 micron hollow filter, a 5 micron filter, a 10 micron filter, or a carbon filter or combinations of these filters.

In preferred examples, two or more filtration units may linked or integrated into one filtration cassette. In preferred examples, the integration of the filtration units into a cassette may reduce the number of leak paths. As a consequence, the efficiency of the system may be improved, for example, with respect to the volume of water processed and outputted by a system.

The water treatment systems of the disclosure also include at least one reverse osmosis cartridge where water purity is enhanced by the process of reverse osmosis. The water treatment system may have one reverse osmosis cartridge, two reverse osmosis cartridges, three reverse osmosis cartridges, four reverse osmosis cartridges, five reverse osmosis cartridges, six reverse osmosis cartridges or more than six cartridges. A cassette may have one reverse osmosis cartridge, may have two reverse osmosis cartridges, may have three reverse osmosis cartridges, have four osmosis cartridges or have more than four cartridges. In preferred examples, a system uses a cassette of linked reverse osmosis cartridges. The system may use one cassette, or two cassettes, or more than two cassettes.

Table 1 illustrates the properties of a reverse osmosis cartridge of the disclosure with respect to water purification, where percent rejection refers to the amount of selected contaminants removed. Table 1 refers to characteristics of the permeate, the water fraction purified by the reverse osmosis process. The reverse osmosis process also produces a concentrate water fraction.

TABLE 1

| Ion | Symbol | % Rejection |
| --- | --- | --- |
| Aluminum | AL + 3 | 97-98 |
| Ammonium | $NH_4^+$ | 85-95 |

TABLE 1-continued

| Ion | Symbol | % Rejection |
|---|---|---|
| Borate | $B_4O_2^{-2}$ | 30-50 |
| Boron | B | 50-70 |
| Bromide | Br– | 93-96 |
| Cadmium | $Cd^{+2}$ | 93-97 |
| Calcium | $Ca^{+2}$ | 95-98 |
| Chloride | Cl– | 92-98 |
| Chromate | $CrO_4^{-2}$ | 85-95 |
| Copper | $Cu^{+2}$ | 96-98 |
| Fluoride | F– | 93-95 |
| Iron | $Fe^{+2}$ | 96-98 |
| Lead | $Pb^{+2}$ | 95-98 |
| Manganese | $Mn^{+2}$ | 97-98 |
| Magnesium | $Mg^{+2}$ | 95-98 |
| Mercury | $Hg^{+2}$ | 95-97 |
| Nickel | $Ni^{+2}$ | 97-98 |
| Nitrate | $NO_3^-$ | 90-95 |
| Phosphate | $PO_4^{-3}$ | 95-98 |
| Polyphosphate |  | 96-98 |
| Potassium | $K^+$ | 92-96 |
| Silica | Si | 85-90 |
| Silicate | $SiO_2^{-2}$ | 92-95 |
| Silver | $Ag^+$ | 96-97 |
| Sodium | $Na^+$ | 92-98 |
| Sulfate | $SO_4^{-2}$ | 96-98 |
| Thiosulfate | $S_2O_3^{-2}$ | 97-98 |
| Zinc | $Zn^{+2}$ | 97-99 |

The water treatment systems of the disclosure may be used to generally improve the purity of the source water. For example, the systems may remove soluble lead and particulate lead. In preferred examples, the one or more components may remove up to up to 30 ppm of lead, or remove up to 20 ppm of lead or remove up to 10 ppm of lead.

Systems of the disclosure may recover or output from about 5% to about 90% of input feed water as purified water or from about 10% to about 80% or from about 10% to about 50%. In some preferred examples, systems may recover up to 80% of the feed water as purified water.

In examples according to the disclosure, reverse osmosis units are in parallel or in series when assembled in a cassette. In preferred examples, the reverse osmosis cartridges are in parallel.

According to the disclosure, a water treatment system includes a frame, at least one filtration unit, at least one reverse osmosis cartridge, at least one pump and at least one bypass unit. In further examples, a system may further include at least one flush valve for flushing the system. The system may further include sensors or may further include drains. Systems of the disclosure may include at least one manifold. In preferred examples, the systems have two manifolds. In preferred examples, the manifolds are a single piece. Systems of the disclosure may also include a status tracking method. In preferred examples, a system of the disclosure includes one or more drains that are used to drain water from the system during, for example, service. According to the disclosure, at least one drain valve may be located on the frame. In preferred examples, the drain valve may include a protection lip that protects the drain valve.

Example 1

The following describes a preferred example of a water treatment system of the disclosure. In this example, a water treatment system may be placed in a residential or commercial building where the water treatment system is connected to the building's water supply such that external water supply flows through the system. That is, a water treatment system may be placed at or near the point-of-entry of water into the building. For example, a system may be connected to a home's water supply. The residential or commercial building may receive its water from a well or from a city water supply or from another source.

Figure 3:
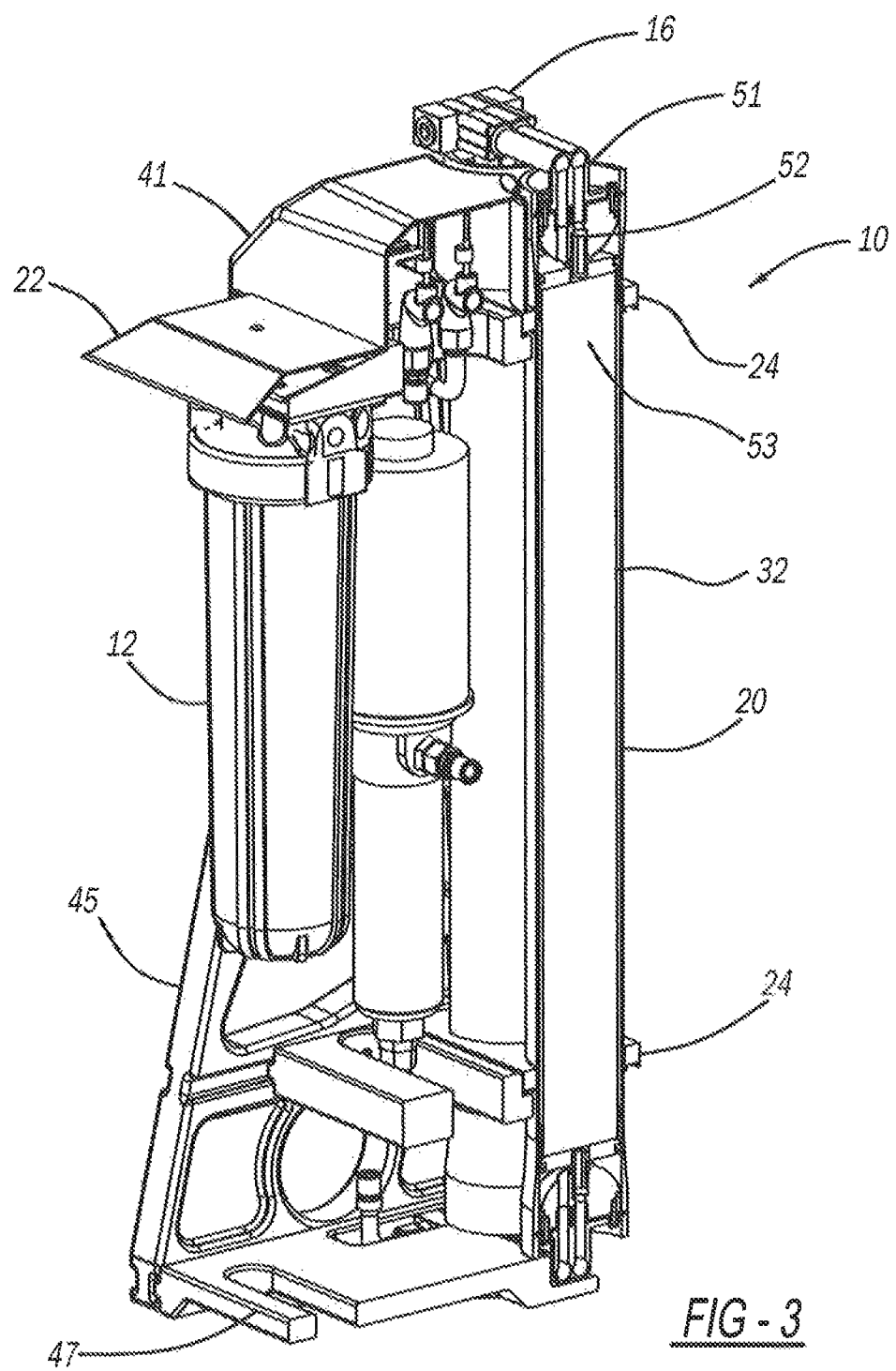
FIG. 3 shows a view of a water treatment system according to the disclosure with part of the system cut away to show the system interior.
Figure 4:
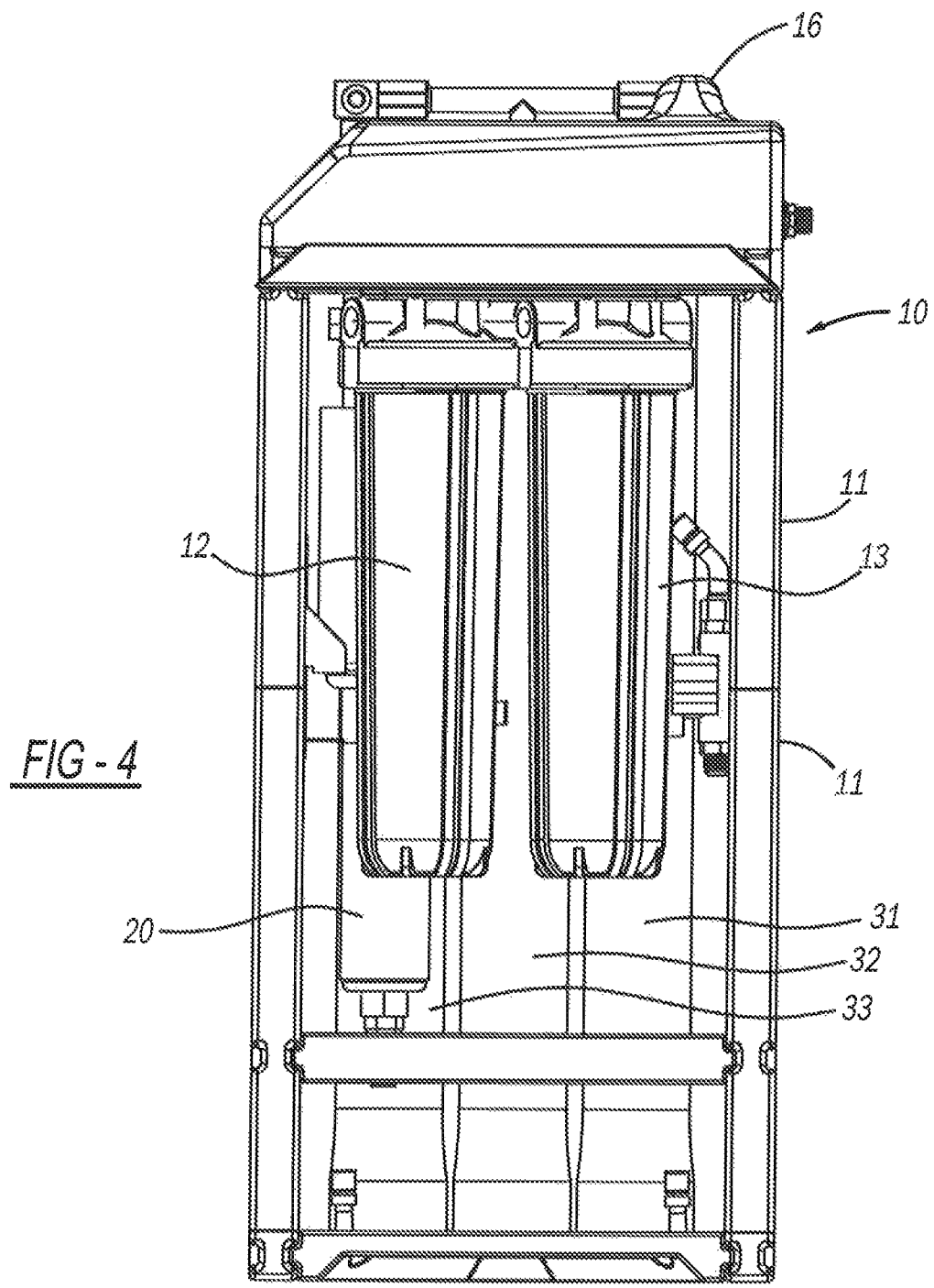
FIG. 4 shows a view of water treatment system according to the disclosure from another side
Figure 5:
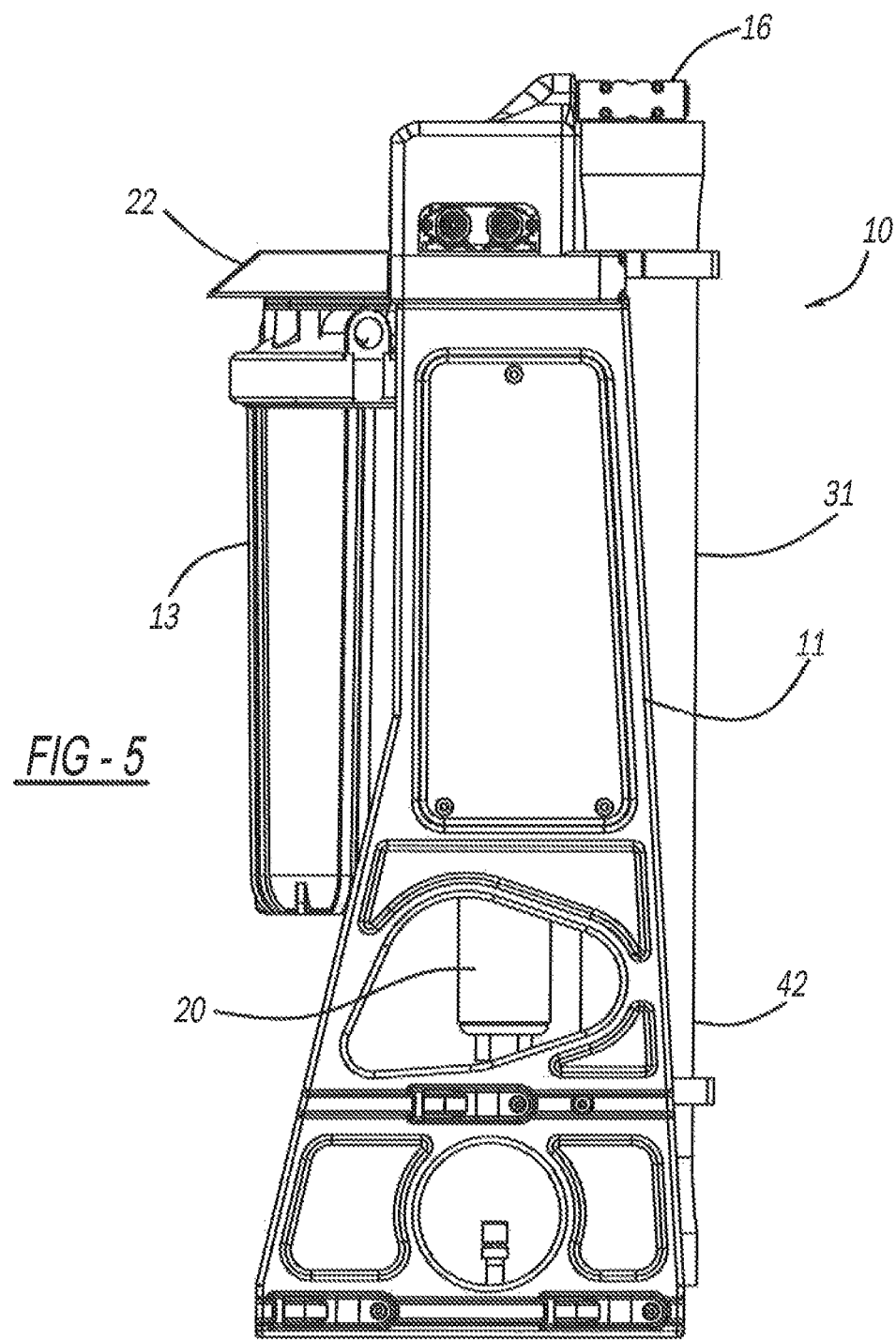
FIG. 5 shows a view of water treatment system according to the disclosure from another side
Figure 6:
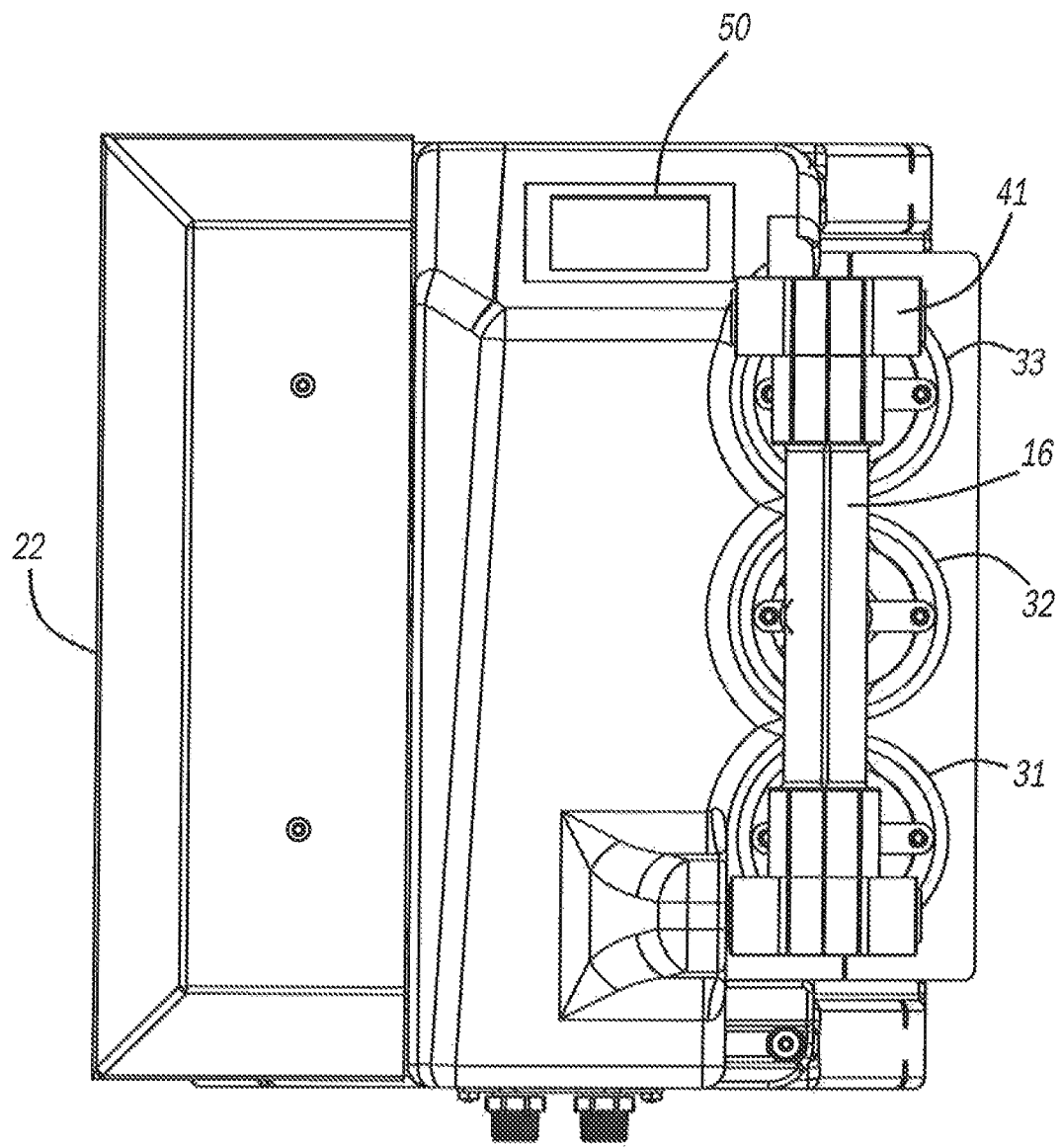
FIG. 6 shows a view of water treatment system according to the disclosure from above
Figure 7:
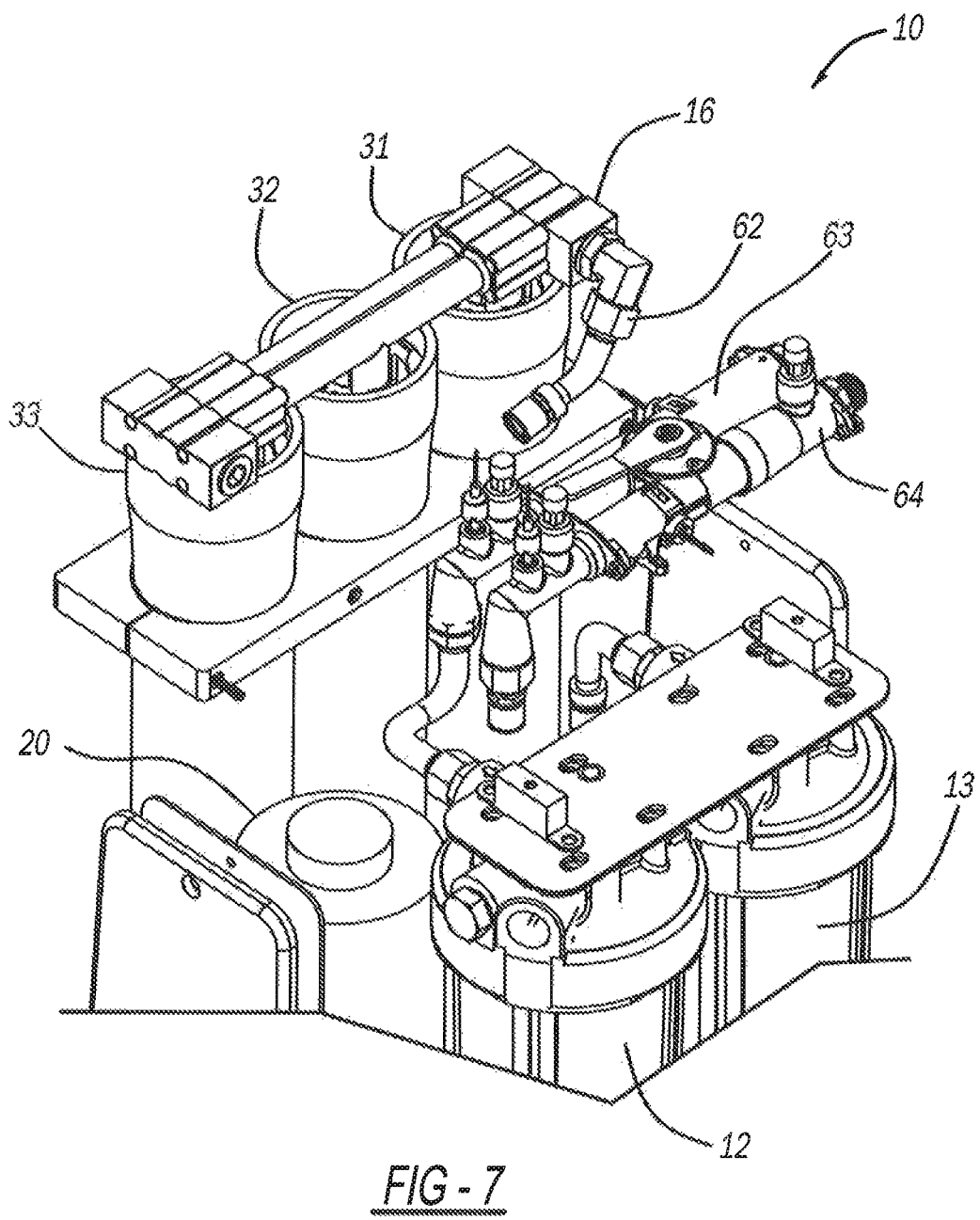
FIG. 7 shows a view of water treatment system according to the disclosure from the top
Figure 8:
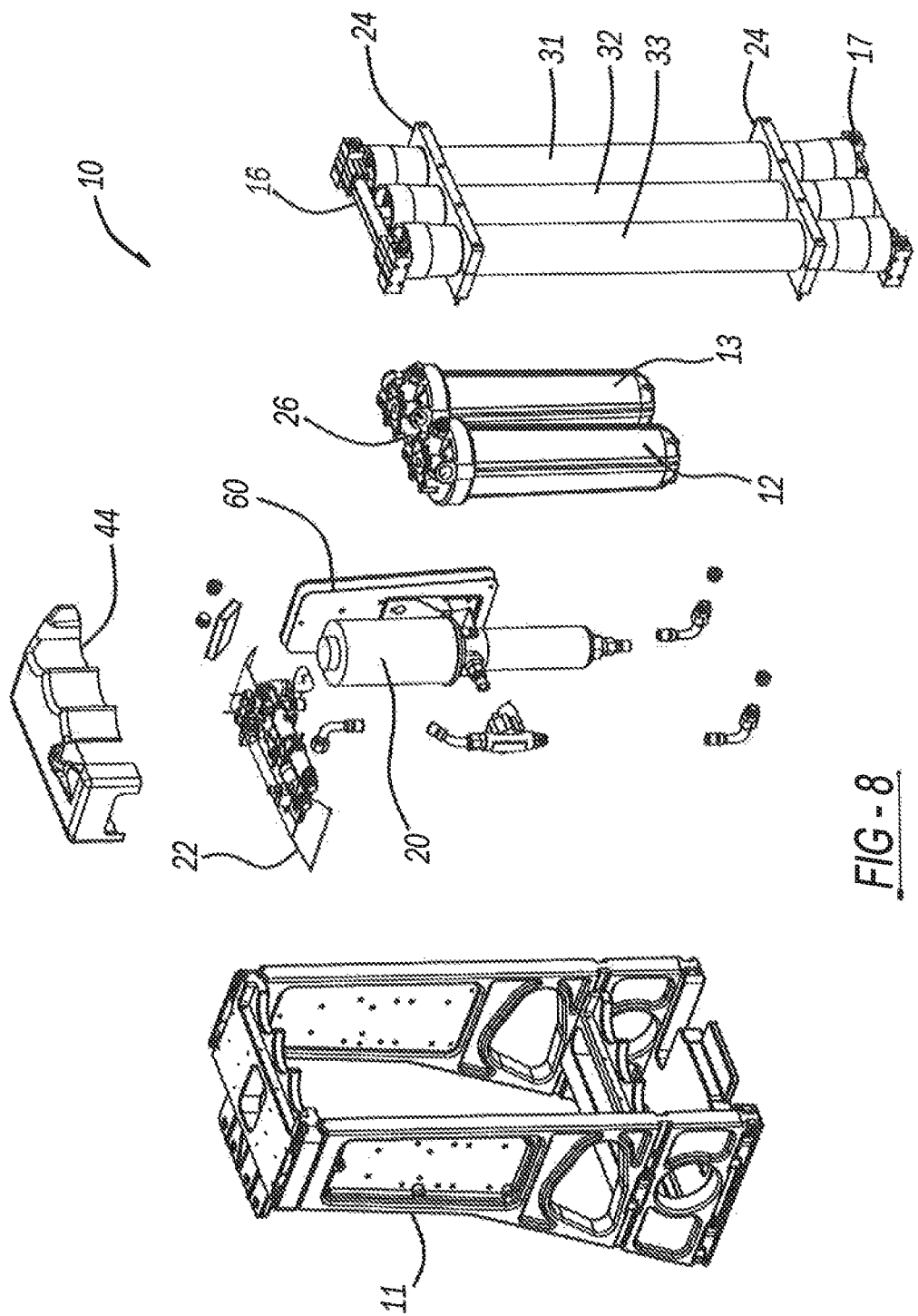
FIG. 8 shows an exploded view of a water treatment system according to the disclosure

FIGS. 1-8 show different views of an assembled water treatment system 10 according to this example. FIG. 3 shows a view where a portion of the system has been cut away to show the interior of the system. The system includes frame 11, filtration cartridges 12, 13 reverse osmosis cartridges 31, 32, 33, manifold 16, and pump 20. The system also includes cover 22. The reverse osmosis cartridges are held together to form a cassette by membrane supports 24.

In this example, the system may be about 18 inches wide, about 22 inches long, 53 inches high and about 160 pounds when assembled.

According to this example, a frame 11 for the system may be assembled using as few as five parts: upper support 41, middle support 46, side supports 42, 45, and bottom support 47.

Figure 9A:
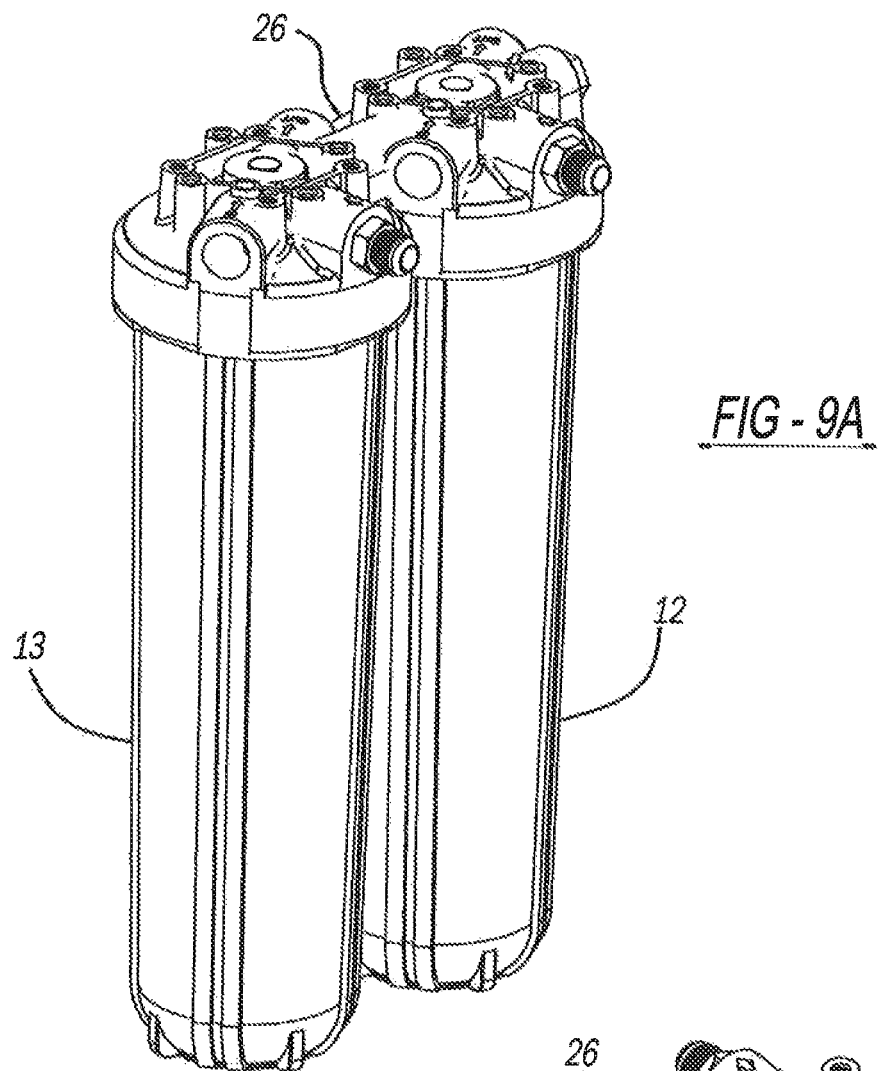
FIG. 9A shows a filtration cassette according to the disclosure.
Figure 9B:
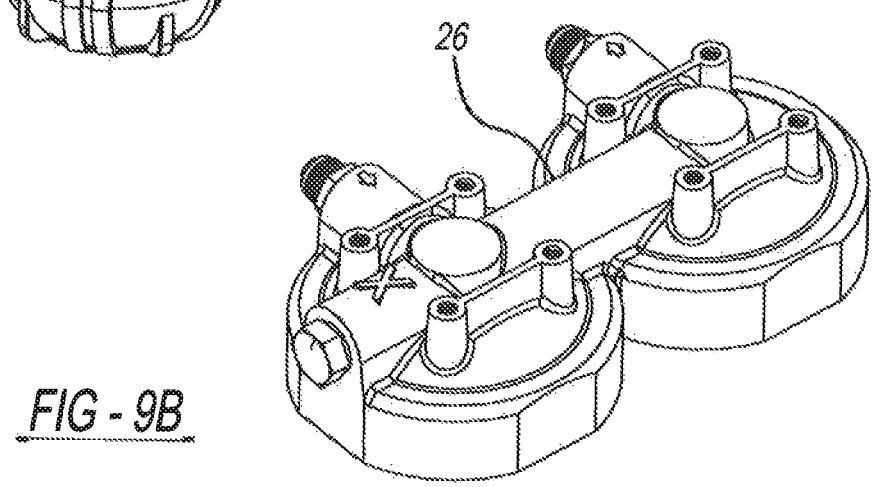
FIG. 9B shows an adaptor according to the disclosure.

According to this example, a water treatment system has two cassettes. A first cassette includes two linked filtration units 12, 13. The two filtration units are linked by an adaptor 26. Cover 22 is also present. In this example, feed water is fed into a first filtration unit 12 (e.g., with a 10 micron filter) and then passes through the adaptor to a second filtration unit 13 (e.g. with a carbon filter). FIG. 9A shows the filtration cassette in isolation where two filtration units 12, 13 are linked by an adaptor 26. FIG. 9B shows the adaptor in isolation. A screen 50 may show the status of an application by updating the operating parameters of the system.

In this example, as shown in FIGS. 1-8, a second cassette may include three reverse osmosis cartridges 31, 32, 33. Feed water having passed through filtration units 12, 13 is then flowed or passed through the reverse osmosis cartridges. In this example, the reverse osmosis cartridges are linked such that the water flows the cartridges in parallel. The three cartridges 31, 32, 33 are fluidly connected by top manifold 16 and bottom manifold 17. Each manifold has two channels. In preferred examples, the inner diameter of each channel is about 0.3 inches to about 2.0 inches, or about 0.5 to about 1.5 inches, or about 0.5 inches to about 1.0 inches. In preferred examples, the inner diameter of each channel is about 0.7 inches.

According to preferred examples, input water may be flowed in through the bottom manifold through one channel. After passing through the membrane, permeate water may be forced down by pressure through a second channel in the bottom manifold. The concentrate fraction passes through the channels of the top manifold. The concentrate may be sent to waste or recycled through the system. In preferred examples, the cassettes may be removed and replaced with new cassettes when the system is required to be serviced.

The figures also show components of the frame 11 (items 41, 42, 45, 46, 47). Pump 20 is also present. Screen 50 is present and is used to illustrate the state of the system. Tubing 53, 62 is shown. Plate 60 is attached to pump 20. Pressure relief valves 63, 64 are shown.

Figure 10A:
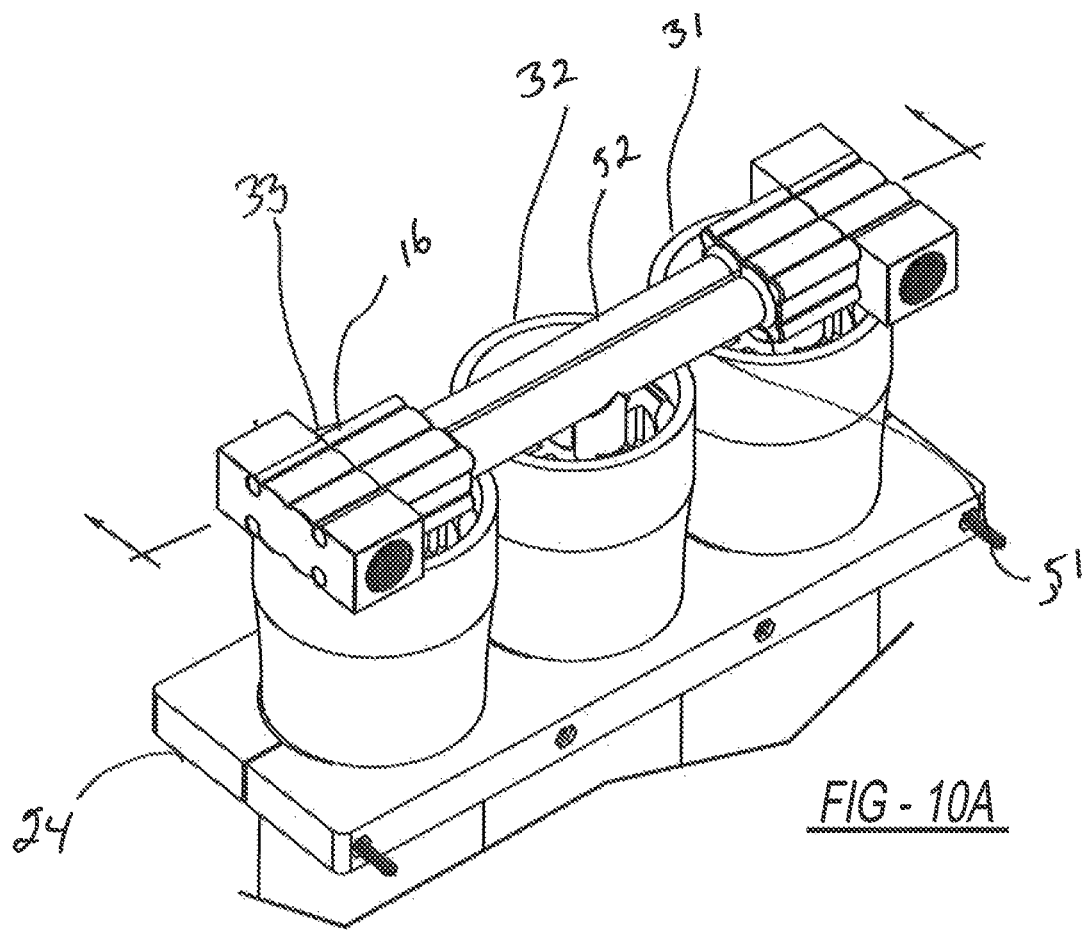
FIGS. 10A and 10B show views of a manifold according to the disclosure.
Figure 10B:
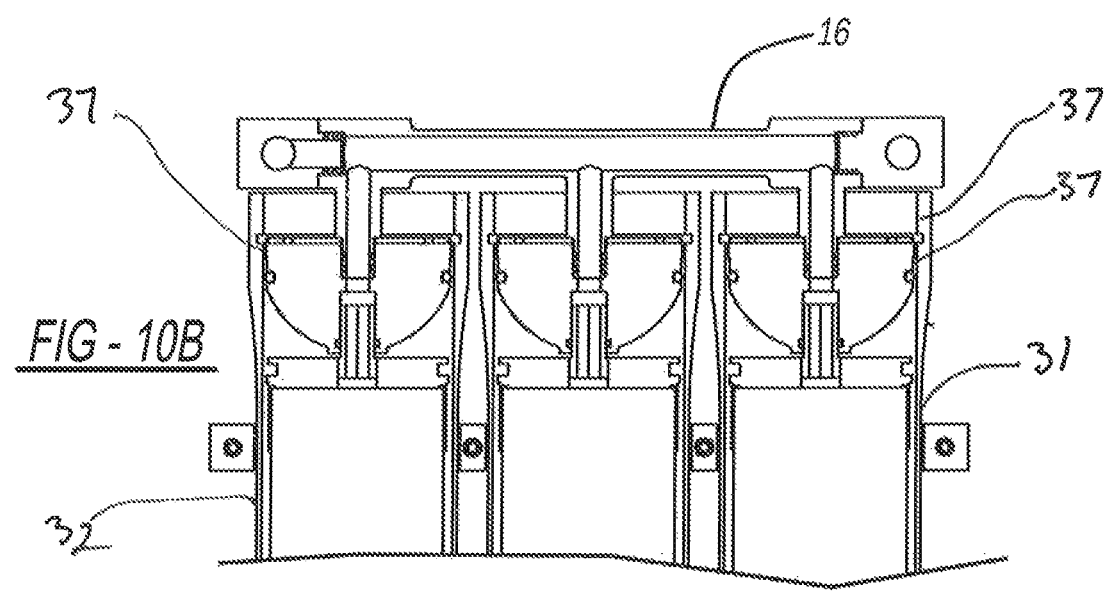

FIG. 10A shows a closer view of a one-piece manifold using to link reverse osmosis cartridges. In this example, the manifold is formed from plastic. The design of the manifold allows the reverse osmosis cartridges to be mounted closely together, thereby allowing a more compact packing of the reverse osmosis cartridges. A manifold may accommodate both permeate and concentrate flows from each unit by having separate channels 51, 52 for each of permeate and concentrate. The manifold is single piece that links all reverse osmosis cartridges. Leak paths are minimized with the use of this device. Flow restrictions are also minimized. FIG. 10B shows a top portion of a reverse osmosis cassette in cross-section, showing top manifold 16 and endcaps 37, where endcaps secure manifold 16 to reverse osmosis cartridges.

In a variation of the example, as shown in FIG. 11B, two reverse osmosis cassettes may be coupled together as shown, thereby forming a multi-cassette having six cartridges of reverse osmosis component as part of the water treatment system. A single cassette of three cartridges in shown in FIG. 11A. Reverse osmosis cassettes include manifolds, 16, 17, membrane supports 24.

Example 2

Figure 11C:
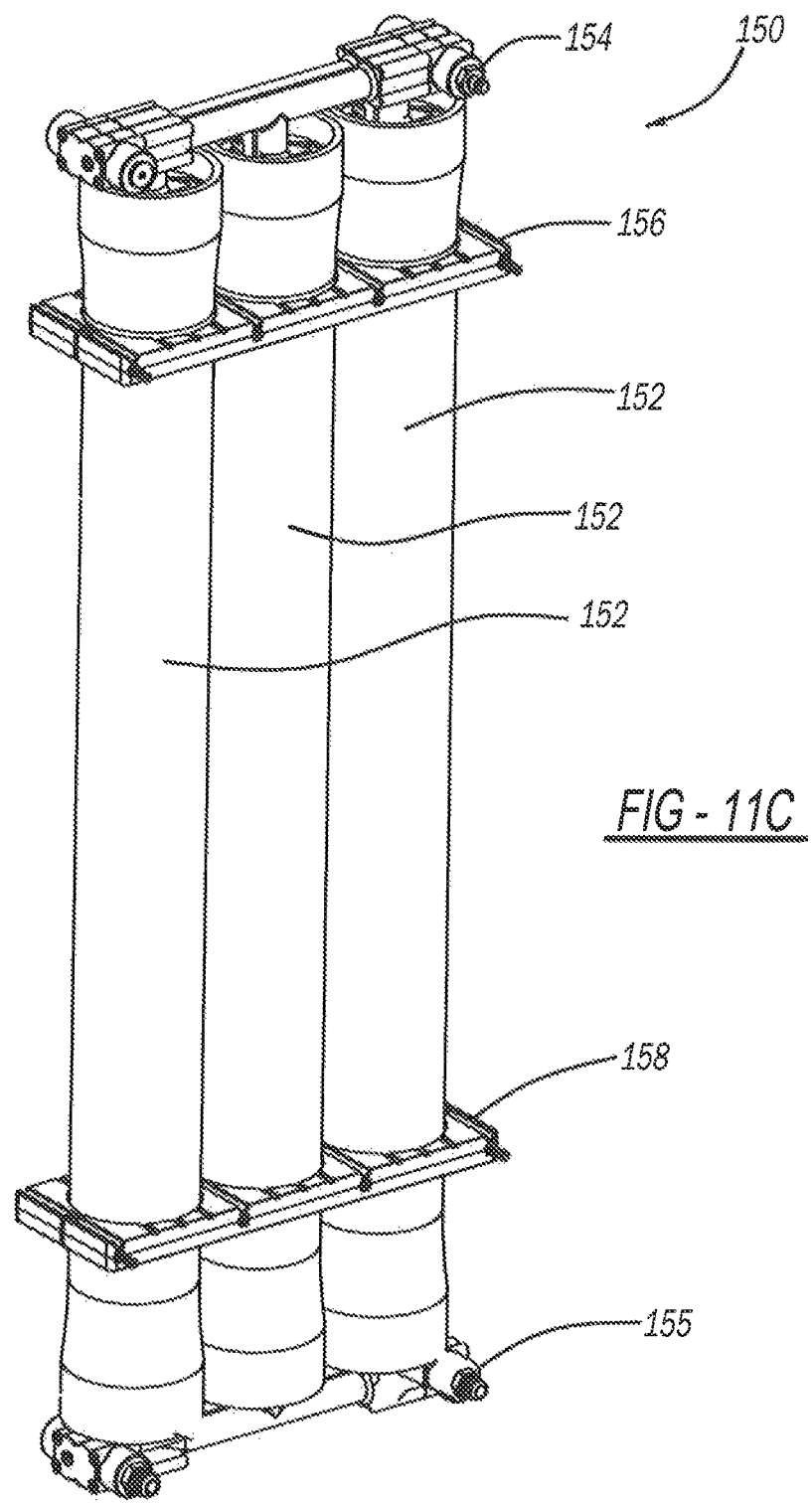

FIGS. 11C to 11K show further examples of reverse osmosis cassettes, according to the disclosure. FIG. 11C shows a cassette 150 with three reverse osmosis units 152. Membrane brackets 156 and 158 hold the reverse osmosis units together. Top manifold 154 and bottom manifold 155 are shown.

Figure 11D:
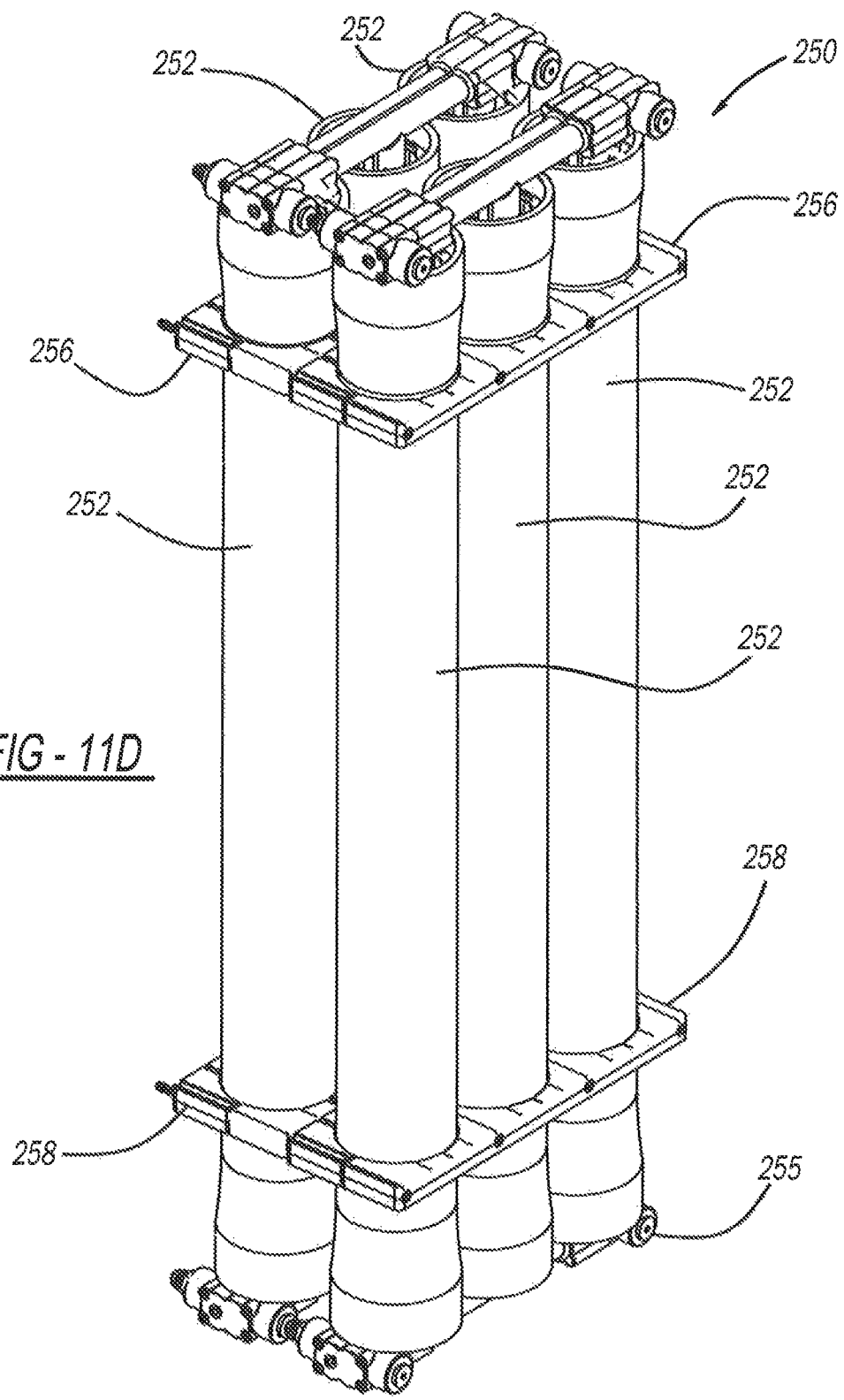

FIG. 11D shows two reverse osmosis cassettes, each with three reverse osmosis units, linked together. Reverse osmosis multi-cassette 250 includes six reverse osmosis units 252, two top membrane brackets 256 and two bottom membrane brackets. Top manifolds 254 and bottom manifold 255 are shown.

Figure 11E:
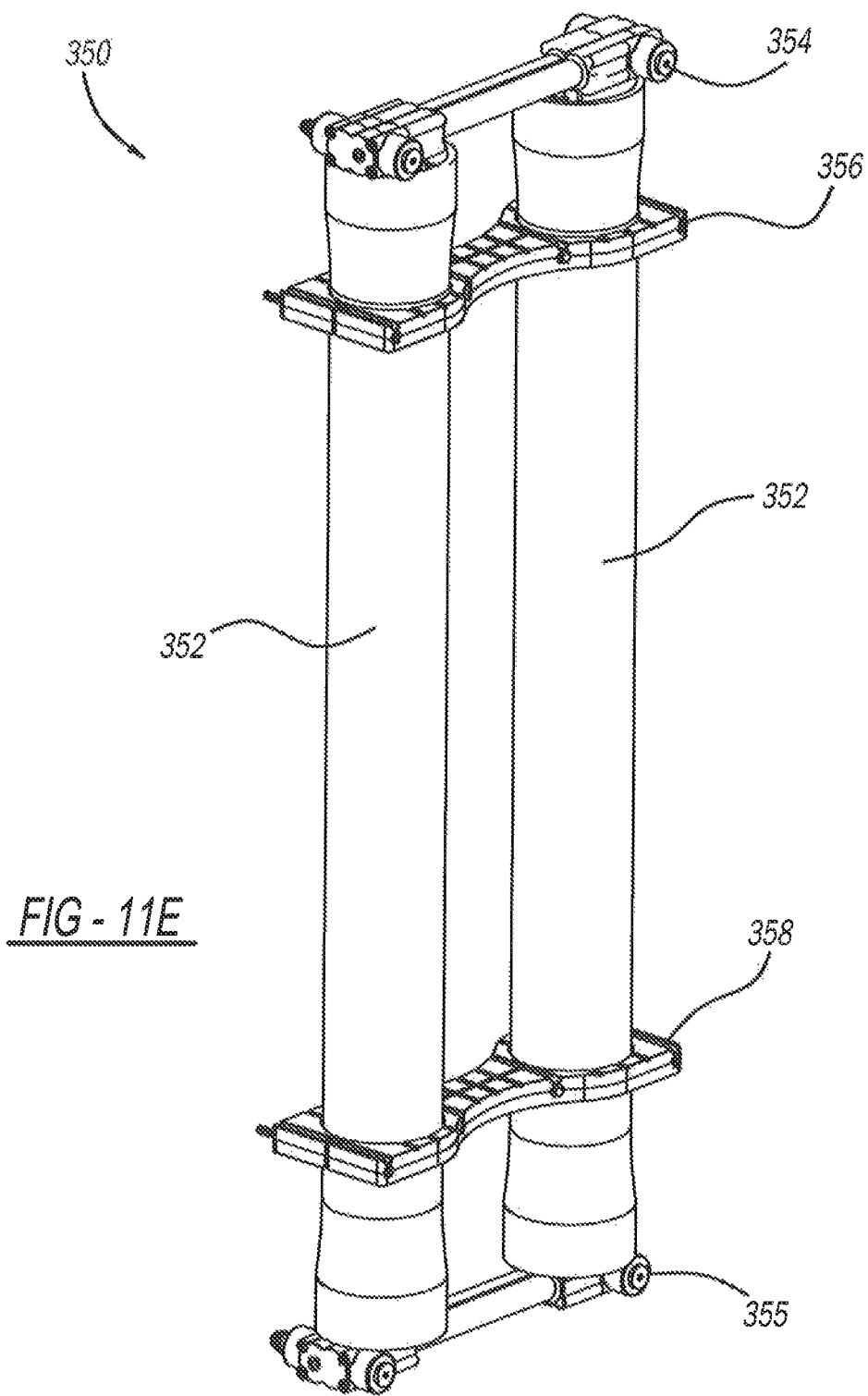
Figure 11F:
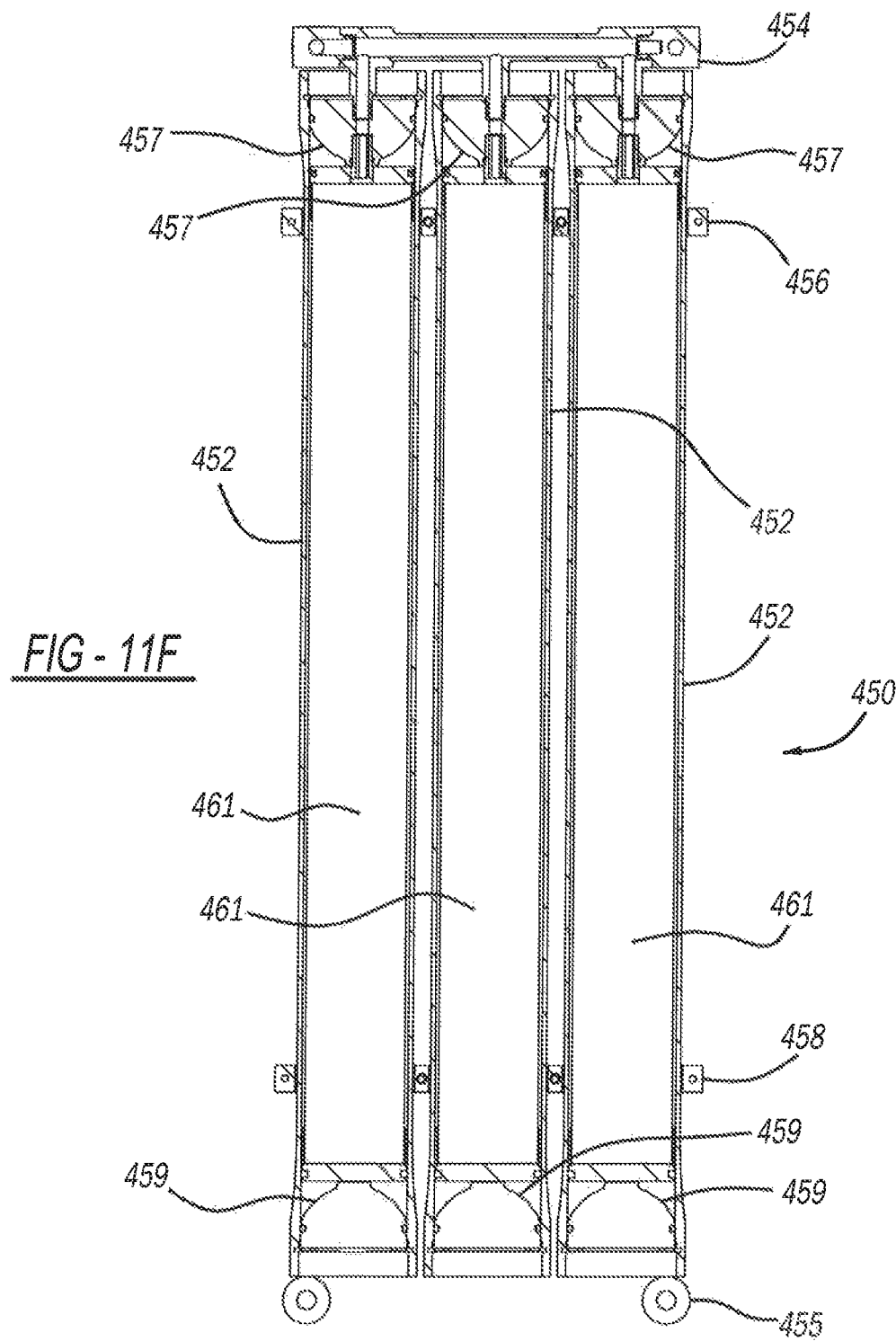
Figure 11G:
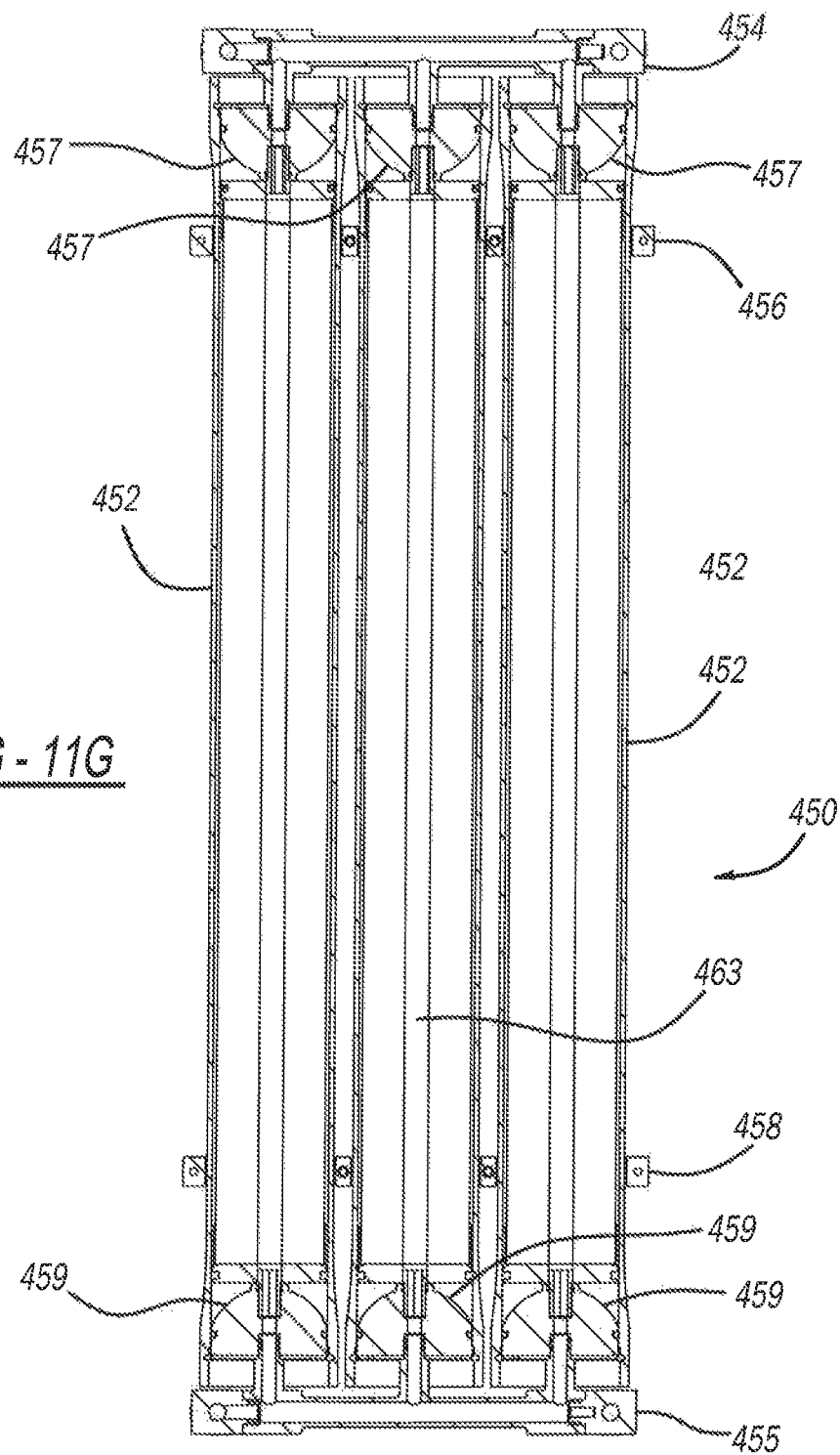
Figure 11H:
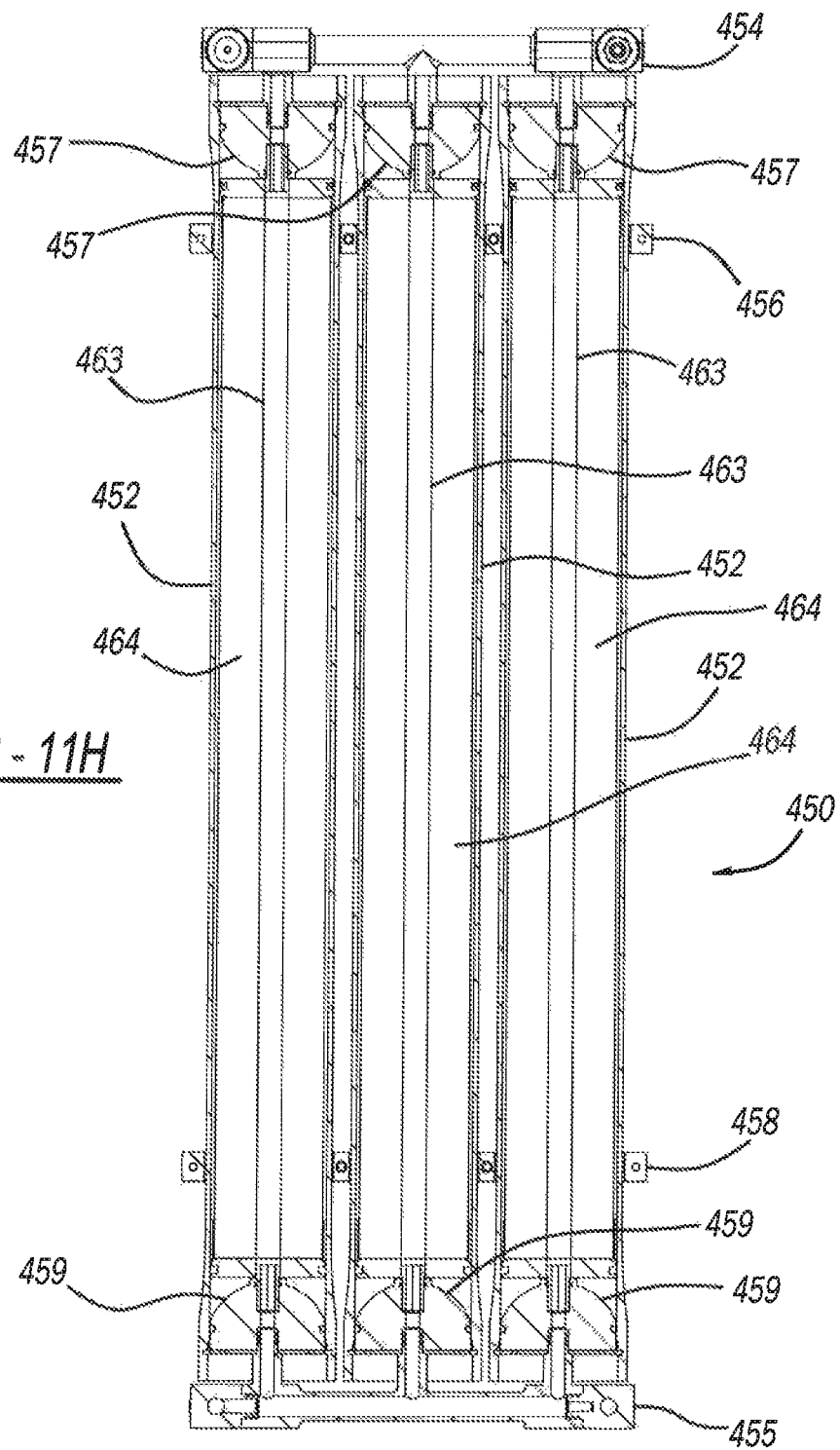

FIG. 11E shows a cassette 350 with two reverse osmosis units 352. Membrane brackets 356 and 358 hold the reverse osmosis units together. Top manifold 354 and bottom manifold 355 are shown.

FIGS. 11 F to H show three vertical cross-sections through a reverse osmosis cassette. FIG. 11F shows a section through the cassette on the concentrate side of each unit. Cassette 450 has three reverse osmosis units 452, and membrane brackets 456, 458. Top manifold 454 and bottom manifold 458. Top endcaps 457 and bottom endcaps 459 are shown in cross-section. The interior of the unit 461 is shown. FIG. 11G shows a section through the same cassette but where the section is shown towards the center of the cassette. Permeate path 463 is shown and concentrate side of cartridge is shown 464. FIG. 11H shows a cross-section through the permeate (clean water) side of the reverse osmosis unit.

In this and other preferred examples, water is flowed into each reverse osmosis unit up through a first channel of the bottom manifold 455 into the reverse osmosis cartridges on concentrate side 464. A fraction of water passes through the membrane to permeate path 463. The permeate fraction is flowed a second channel of the bottom manifold, as a consequence of pressure differences in the cartridge. In these examples, the concentrate fraction may be flowed through the channels of the top manifold. In other examples, the flow of input water may be reversed, such that water is flowed through the top manifold and, the flow of the concentrate and permeate occurs through the bottom and top manifolds respectively.

Figure 11I:
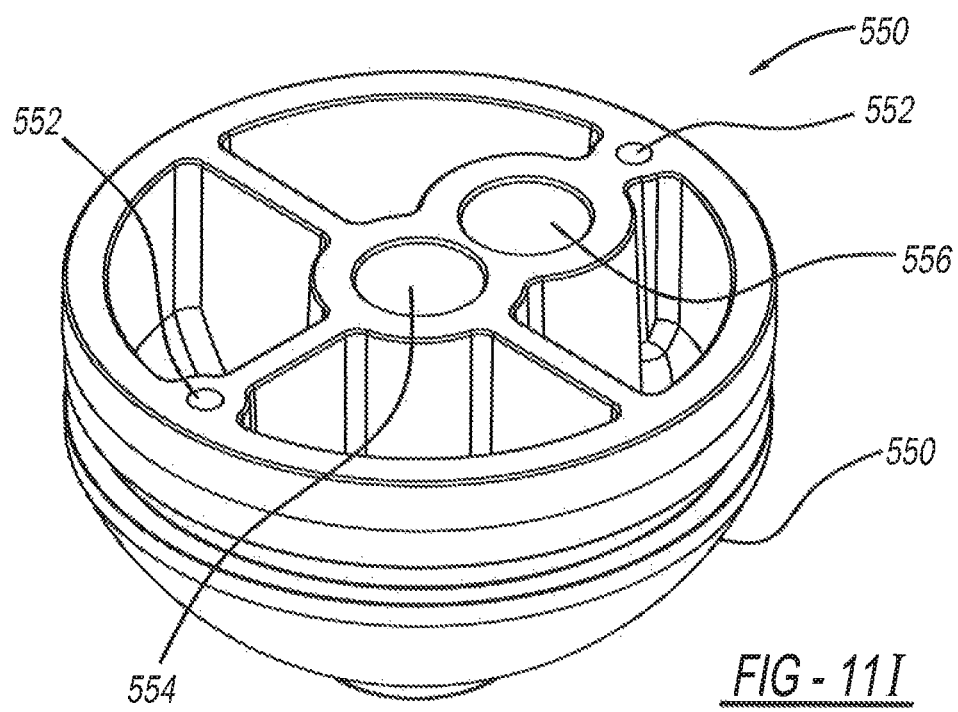
Figure 11J:
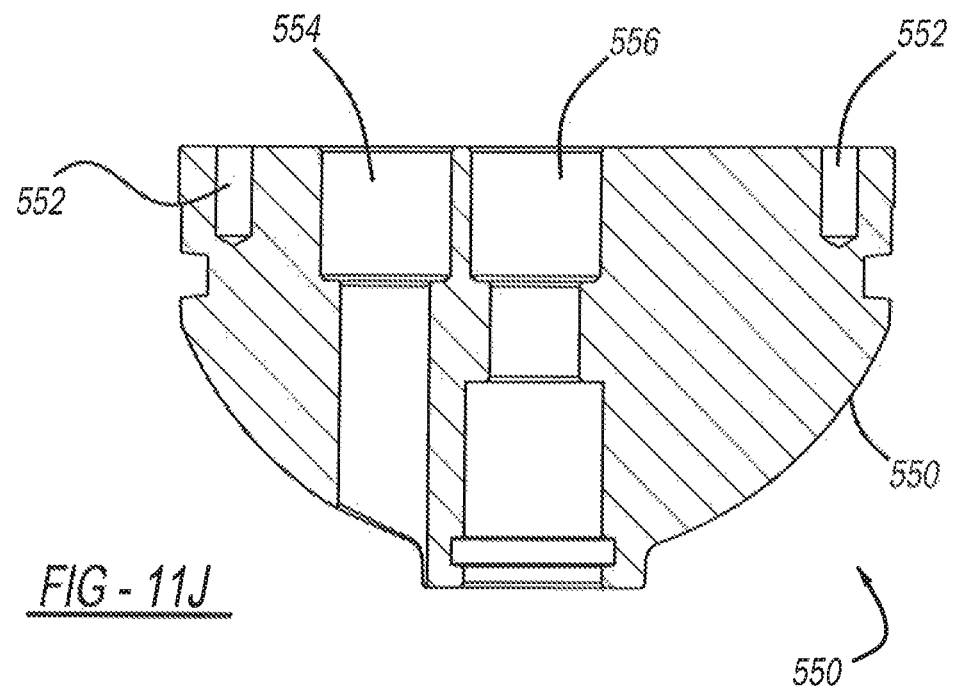

FIG. 11I shows a reverse osmosis unit endcap in perspective view. Endcap 550 has a body 551 and two tubes 554, 556 that encompass two channels for permeate flow and concentrate flow respectively. FIG. 11J shows the endcap of FIG. 11I in cross-section.

Figure 12A:
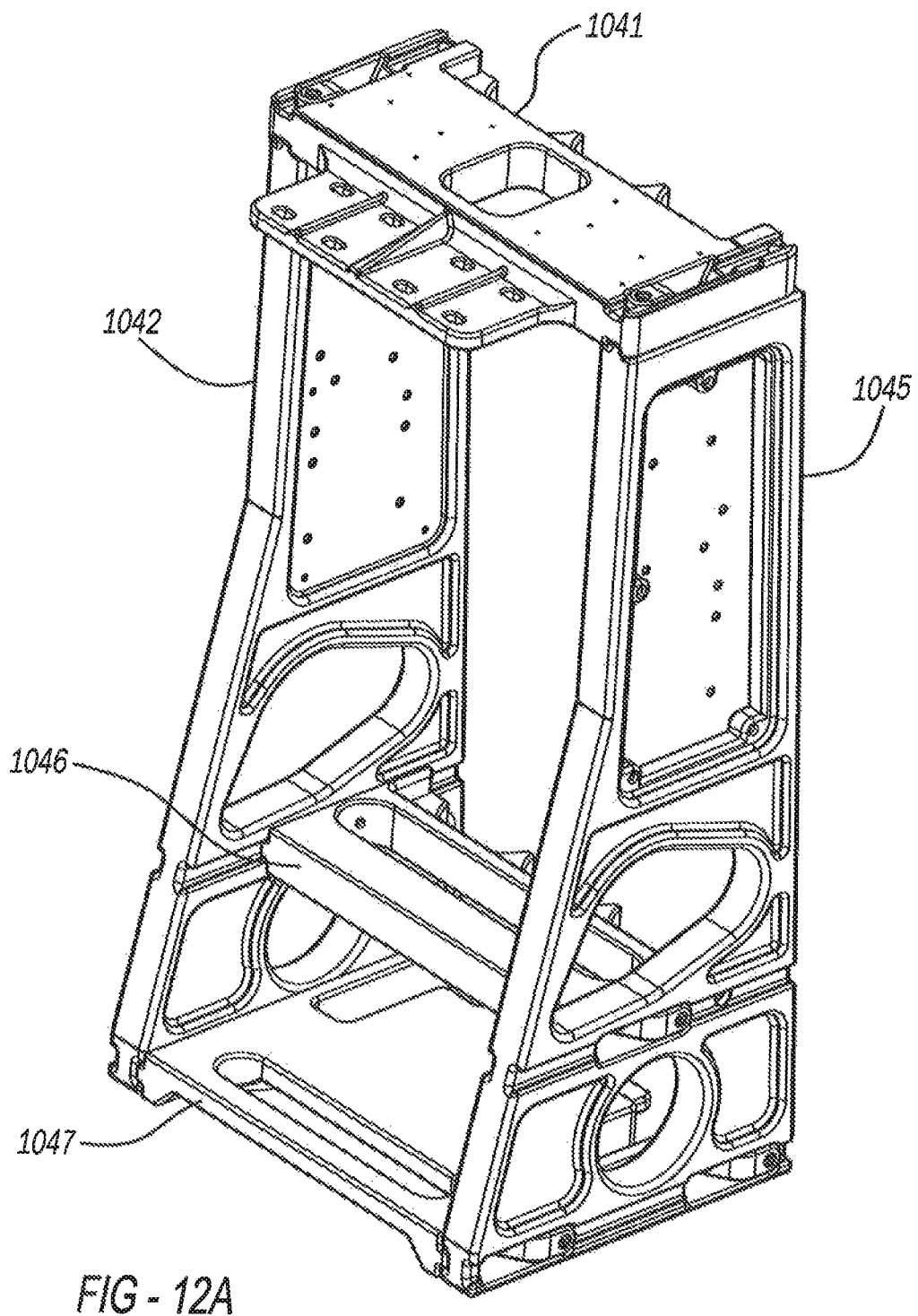
FIGS. 12A and 12B shows the frame of water treatment system of the disclosure in an assembled and disassembled state.
Figure 12B:
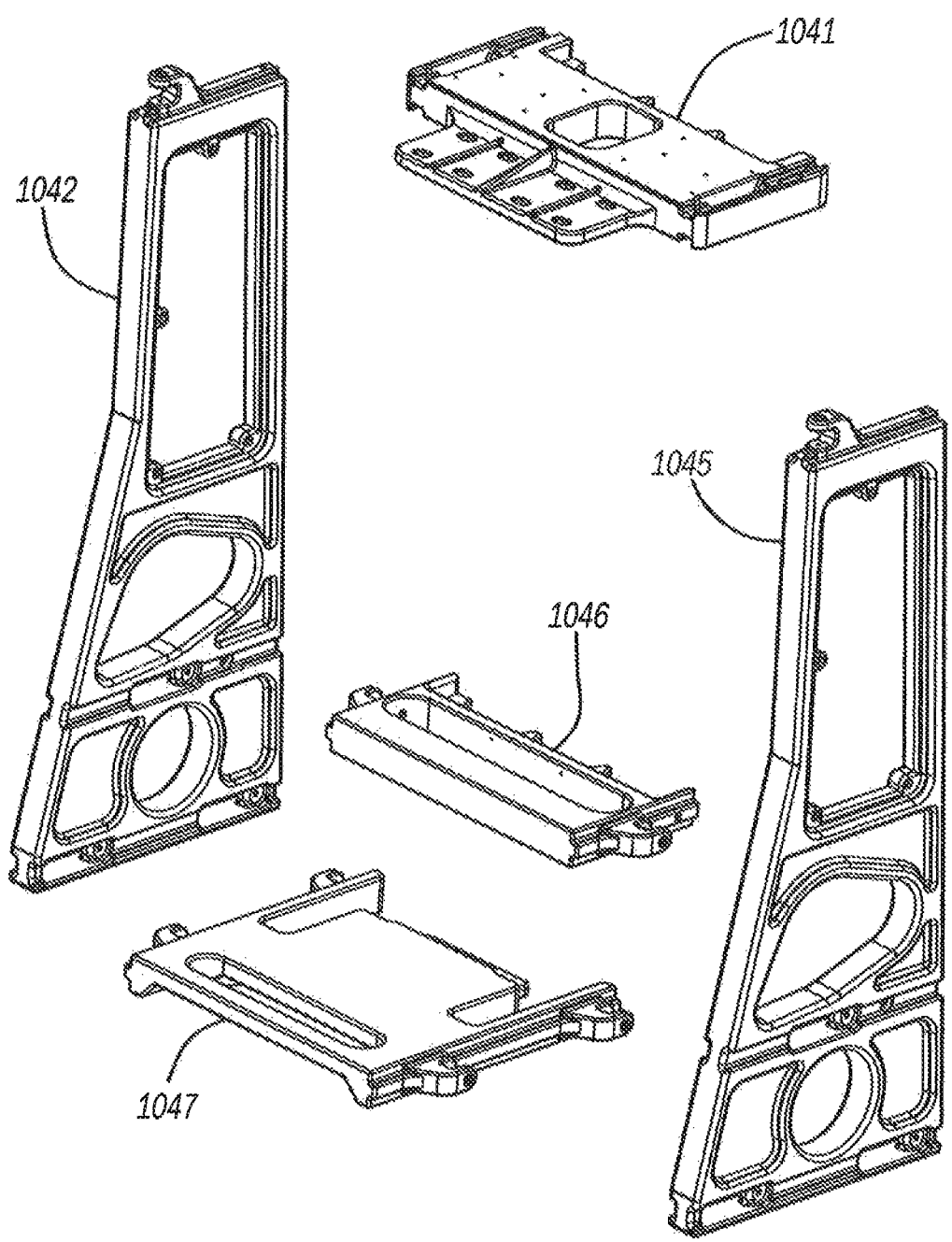

FIGS. 12A and 12B show an example of the frame 11 in an assembled and disassembled state respectively. This example includes side supports 1042, 1045, upper support 1041, middle support 1046 and lower support 1047. The frame is made from a material does not rust or otherwise corrode. For example, the parts of the frame are made of a lightweight, non-rusting material, such as a plastic. The assembly of the frame does not require welding or similar processes. Instead, the parts of the frame may be assembled by fitting tabs together. In preferred examples, the frame may be easily shipped in a disassembled state using flat packaging.

Figure 13A:
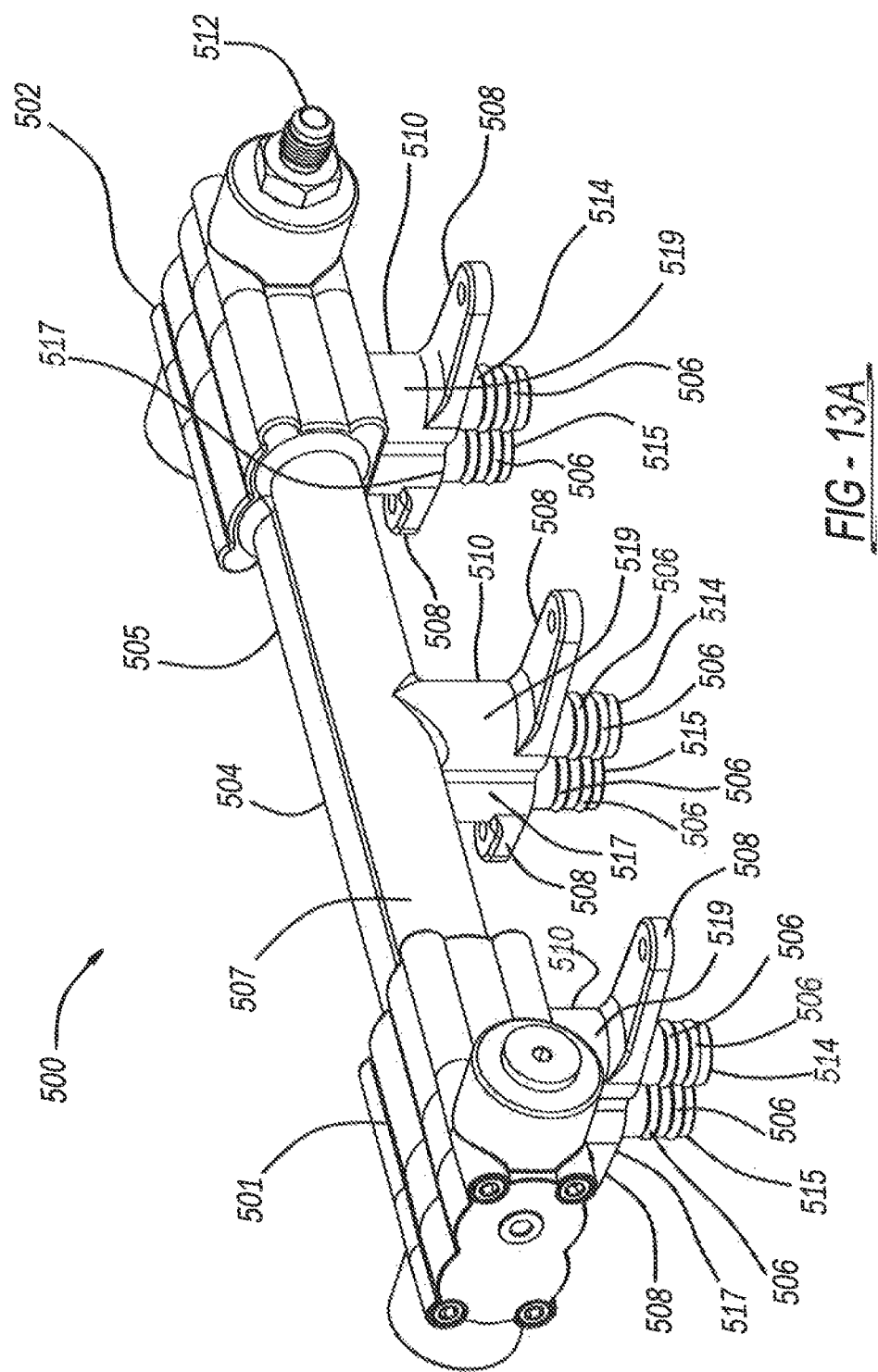
FIGS. 13A-13D show views of examples of a top manifold according to the disclosure.
Figure 13B:
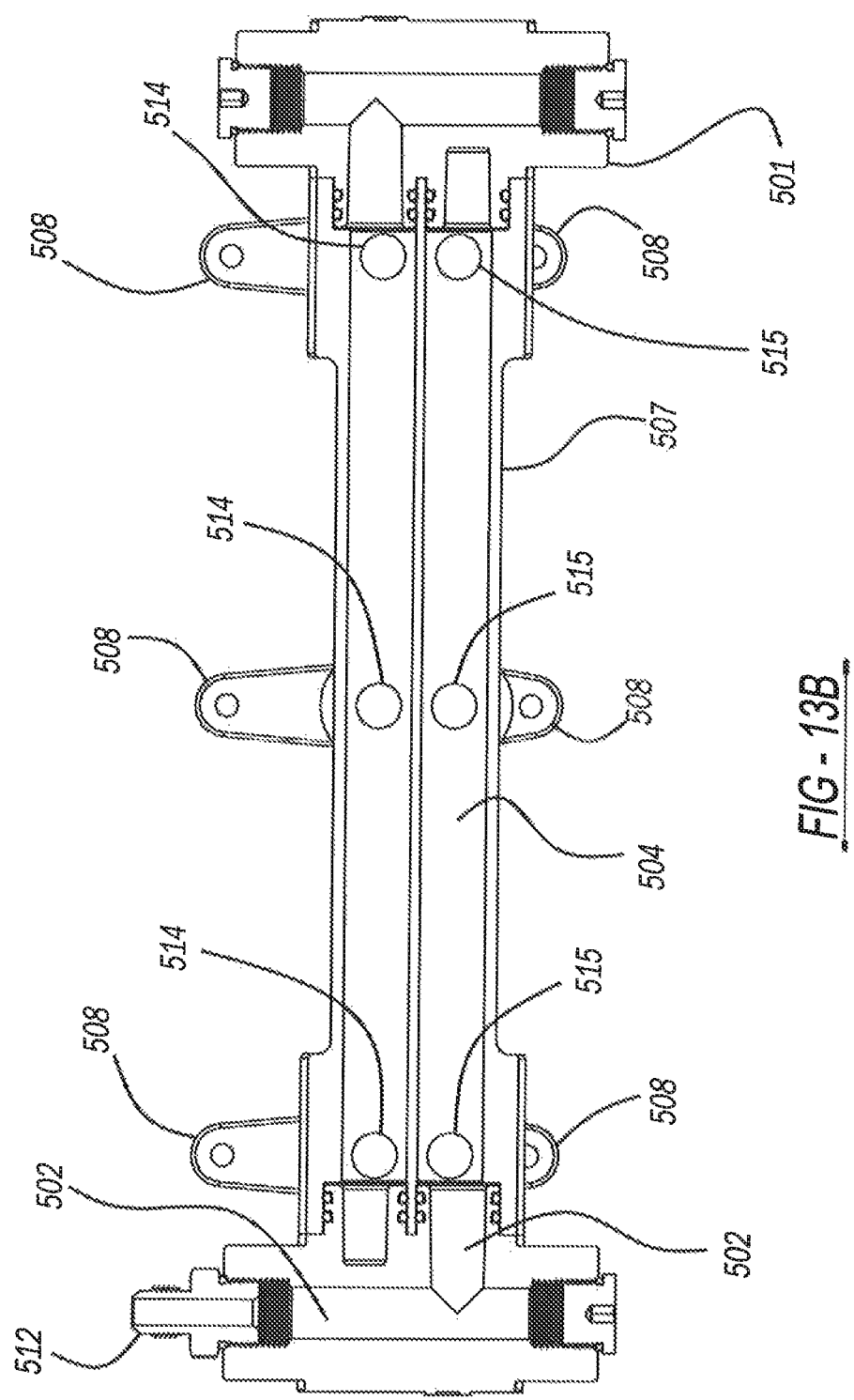

FIGS. 13A and 13B show further views of examples of a manifold according to the disclosure. FIG. 13A shows a perspective view of a manifold 500 where the manifold is designed to link three reverse osmosis cartridges at the top of the units. In this example, the manifold 500 is manufactured as a single piece. In preferred examples, the manifold is constructed of a lightweight, robust material. In preferred examples, the manifold is manufactured from a plastic. In this example, the manifold includes horizontal body section 504. In preferred examples, the horizontal body section is long enough to link the three reverse osmosis cassettes. In this example, the manifold 500 links the reverse osmosis cassettes at the top of the cassettes. The manifold includes two adaptors 501, 502. Adaptor 502 includes a fitting 512 for concentrate flow from the RO cassette.

In this example, the horizontal body section 504 of the manifold has two separate tubes 505, 507 which each include channels, not shown in this figure. In this example, tube 505 is designed to carry permeate and tube 507 is designed to carry concentrate. The channels are isolated from each other such that fluid in each channel does not co-mingle.

As shown in FIG. 13A, the manifold also includes three vertical sections 510 integrated into the horizontal body section 504. Each of the three vertical sections has two tubes 517, 519, where each tube includes a channel in fluid communication with a channel of the horizontal body section. The channel of tube 517 is in fluid communication with the channel of horizontal body section 505 and contains permeate flow. Tube 519 is in fluid communication with tube 507. Vertical body sections 510 include fittings 514, 515 that are placed into a fitting of a reverse osmosis cartridge. The manifold fittings may include 0-rings 506. The vertical sections may also include tabs 508 that may be used to affix the manifold to the system.

FIG. 13B shows a manifold similar to that shown in FIG. 13A but viewed from beneath the manifold. Manifold 500 includes tabs includes a horizontal body section 505 with two tubes 504, 507. Vertical sections 514 are shown. Each vertical section includes channel where the channels are isolated from each other such that fluid does not co-mingle. End pieces 501 and 502 are also shown.

Figure 13C:
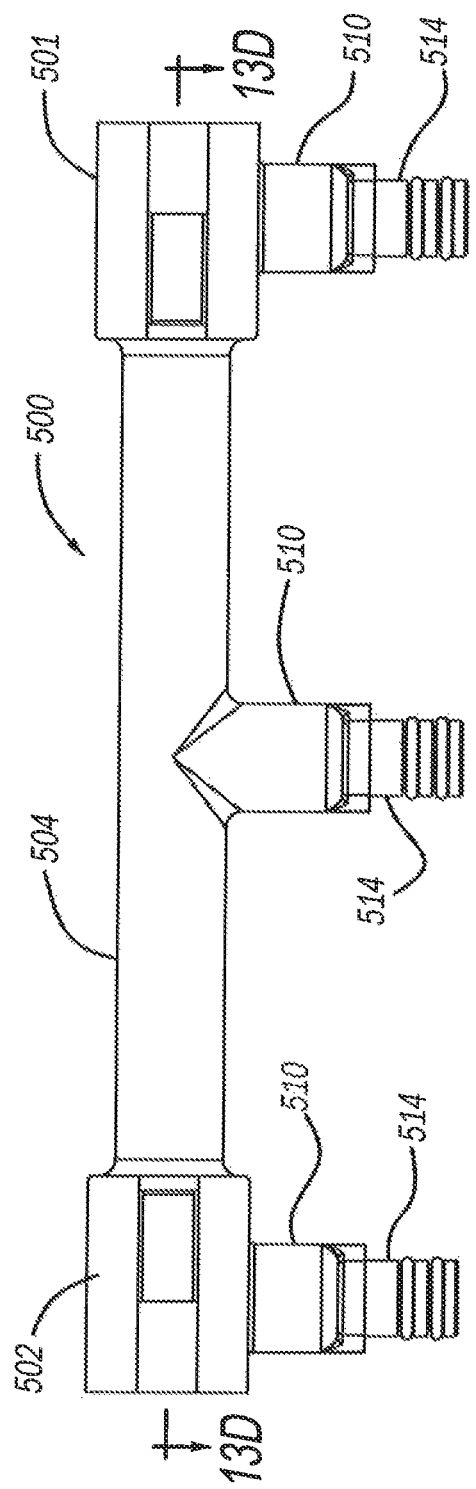
Figure 13D:
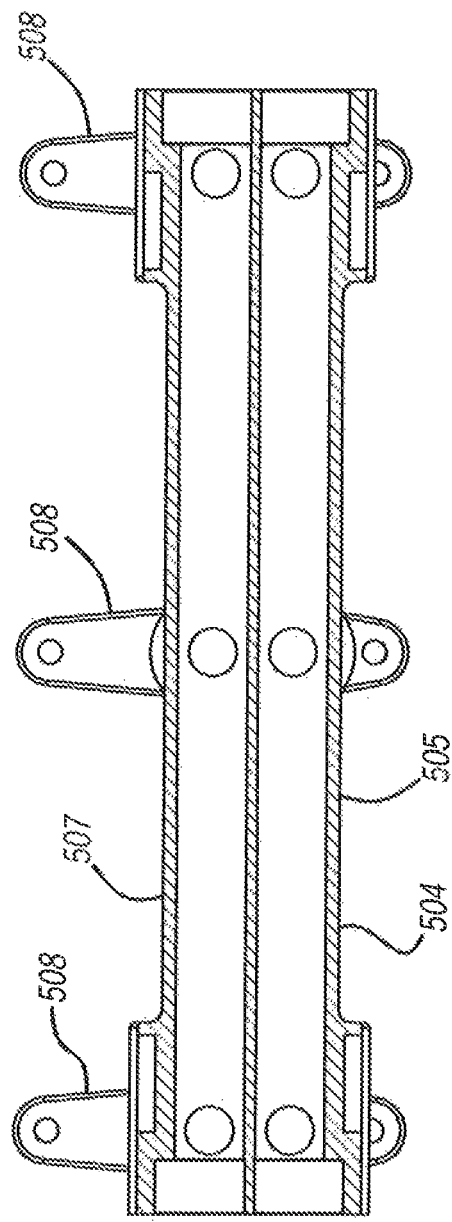

FIG. 13C shows a top manifold as viewed from one side. FIG. 13D shows a cross-section of the manifold of 13C as seen from above. Manifold 500 has horizontal body portion 504 and vertical body portions 510 and fittings 514. Adaptors 501 and 502 are also shown. In FIG. 13D, tubes 505 and 507 are shown in cross-section and showing permeate and concentrate channels.

Figure 14A:
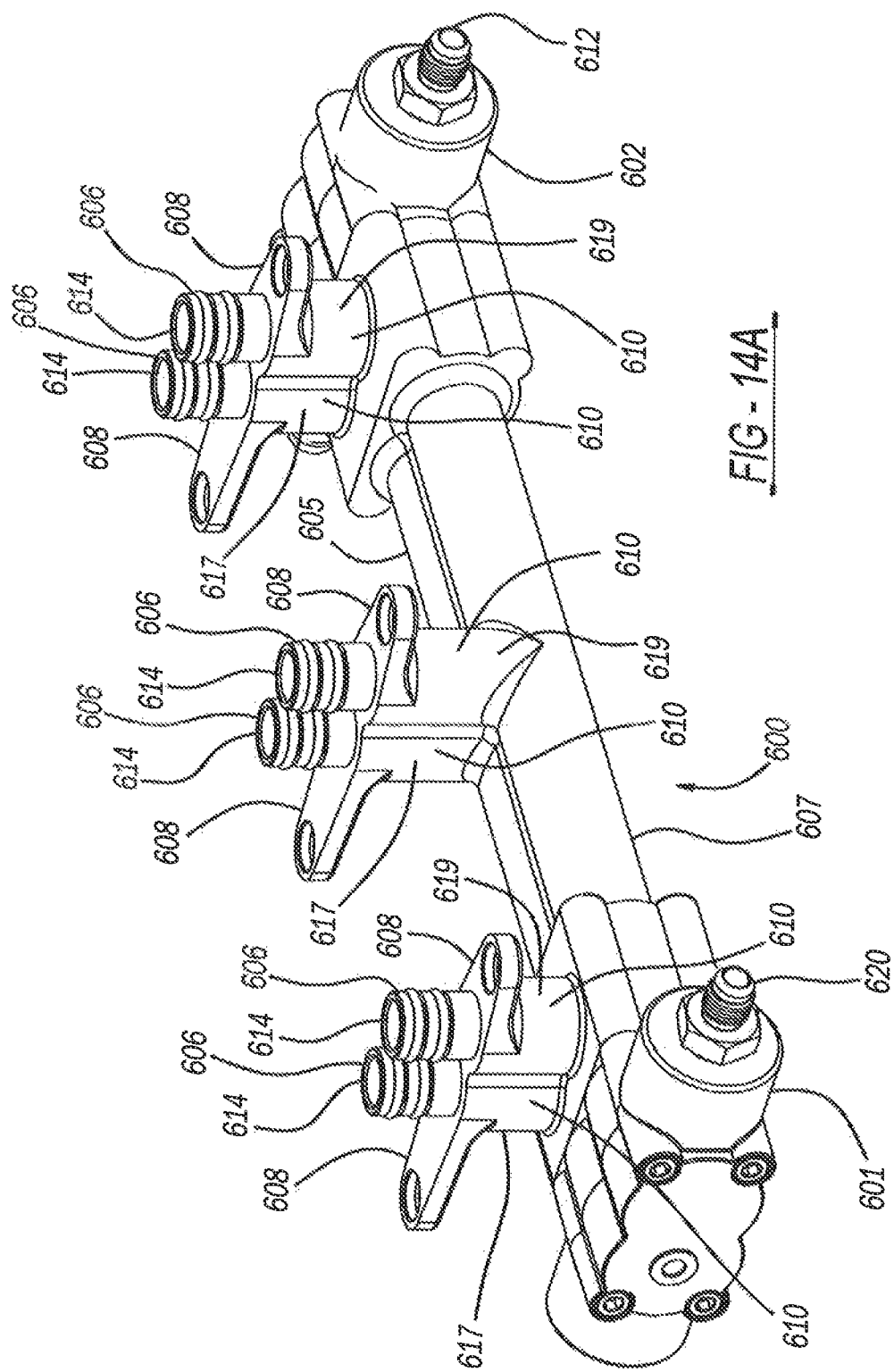
FIGS. 14A-14B show views of a bottom manifold according to the disclosure

FIGS. 14A and B show views of a manifold 600 in a perspective view where the manifold links three reverse osmosis cartridges at the bottom of the units. In this example, the manifold 600 is manufactured as a single piece. In preferred examples, the manifold is constructed of a lightweight, robust material. In preferred examples, the manifold is manufactured from a plastic. The manifold 600 includes a horizontal body section 604. In preferred examples, the horizontal body section is long enough to link three reverse osmosis cartridges. In this example, the manifold links the reverse osmosis cartridges at the bottom of the cartridges. The manifold includes two adaptors 601, 602. In this example, the manifold has two separate tubes 605,607 which each include channels. For example, tube 605 may be carry permeate and tube 607 may carry concentrate. The channels are isolated from each other such that fluid in each channel does not co-mingle.

In this example, the manifold also includes three vertical sections 610 integrated into the horizontal body section 604. Each of the vertical sections 610 has two tubes, 617, 619 where one tube (617) has a channel that carries permeate and the second tube (619) has a channel that carries concentrate. Each of the vertical body sections includes fittings 614, 615 that slot into a fitting of a reverse osmosis cartridge. The manifold fittings may include O-rings 606. The vertical sections may also include tabs 608,609 that may be used to affix the manifold to the system.

Figure 14B:
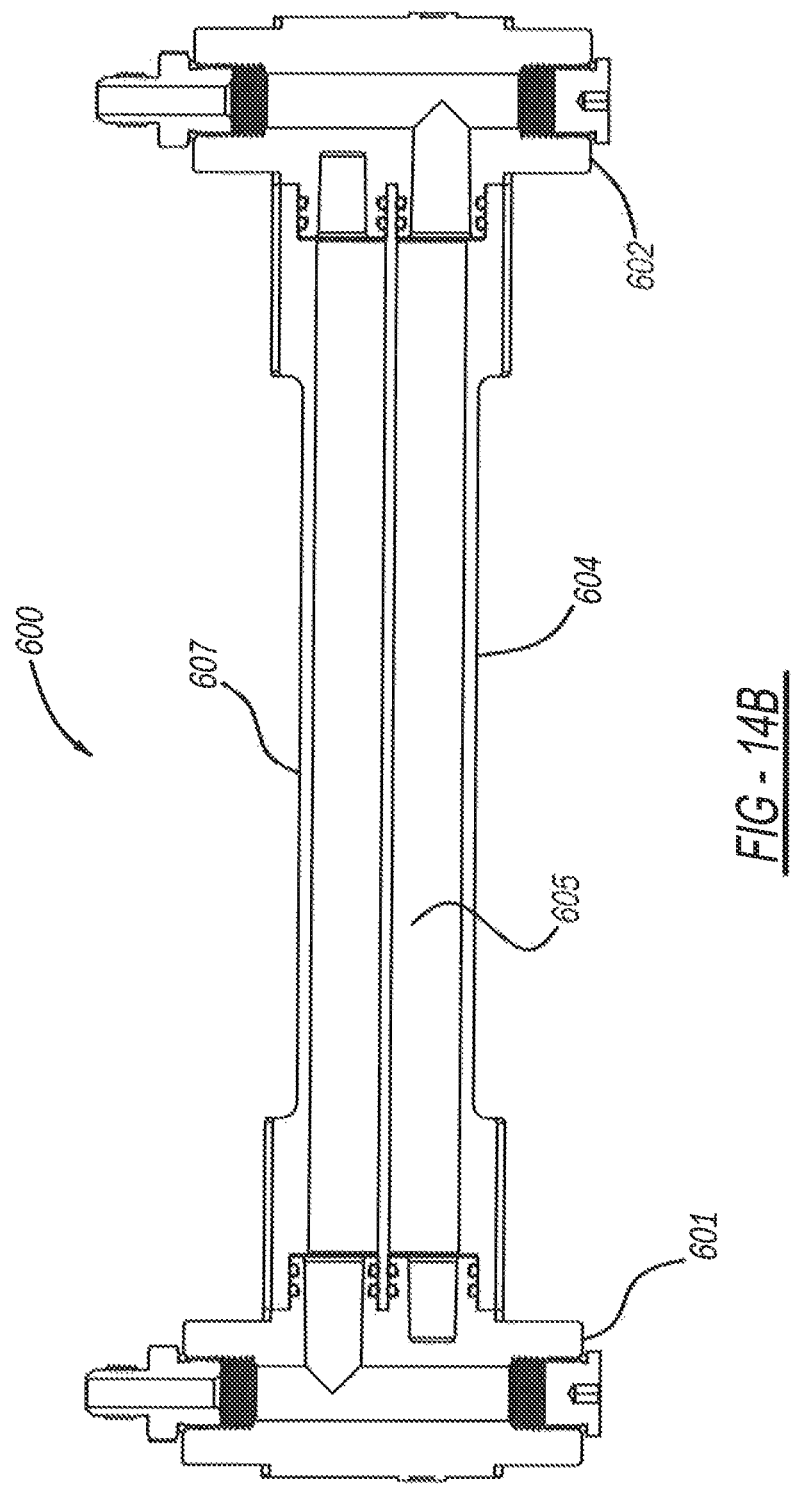

FIG. 14B shows a manifold similar to that shown in FIG. 14A but viewed looking up at the bottom of the manifold. Manifold 600 includes tabs 608, 609 and includes a horizontal body section 605 with two tubes 604, 607. End pieces 601 and 602 are also shown FIG. 15A shows a view of a manifold 700 in a perspective view where the manifold links two reverse osmosis cartridges at the top of the units. In preferred examples, the horizontal body section 704 is long enough to link two reverse osmosis cartridges. In this example, the manifold links two reverse osmosis cartridges at the top of the units. The manifold includes two adaptors 701, 702.

In this example, the manifold also includes two vertical sections 710 integrated into the horizontal body section 704. Each of the vertical body sections includes fittings 714,715 that slot into a fitting of a reverse osmosis cartridge the manifold fittings may include O-rings 706. The vertical sections may also include tabs 708,709 that may be used to affix the manifold to the system.

Figure 15B:
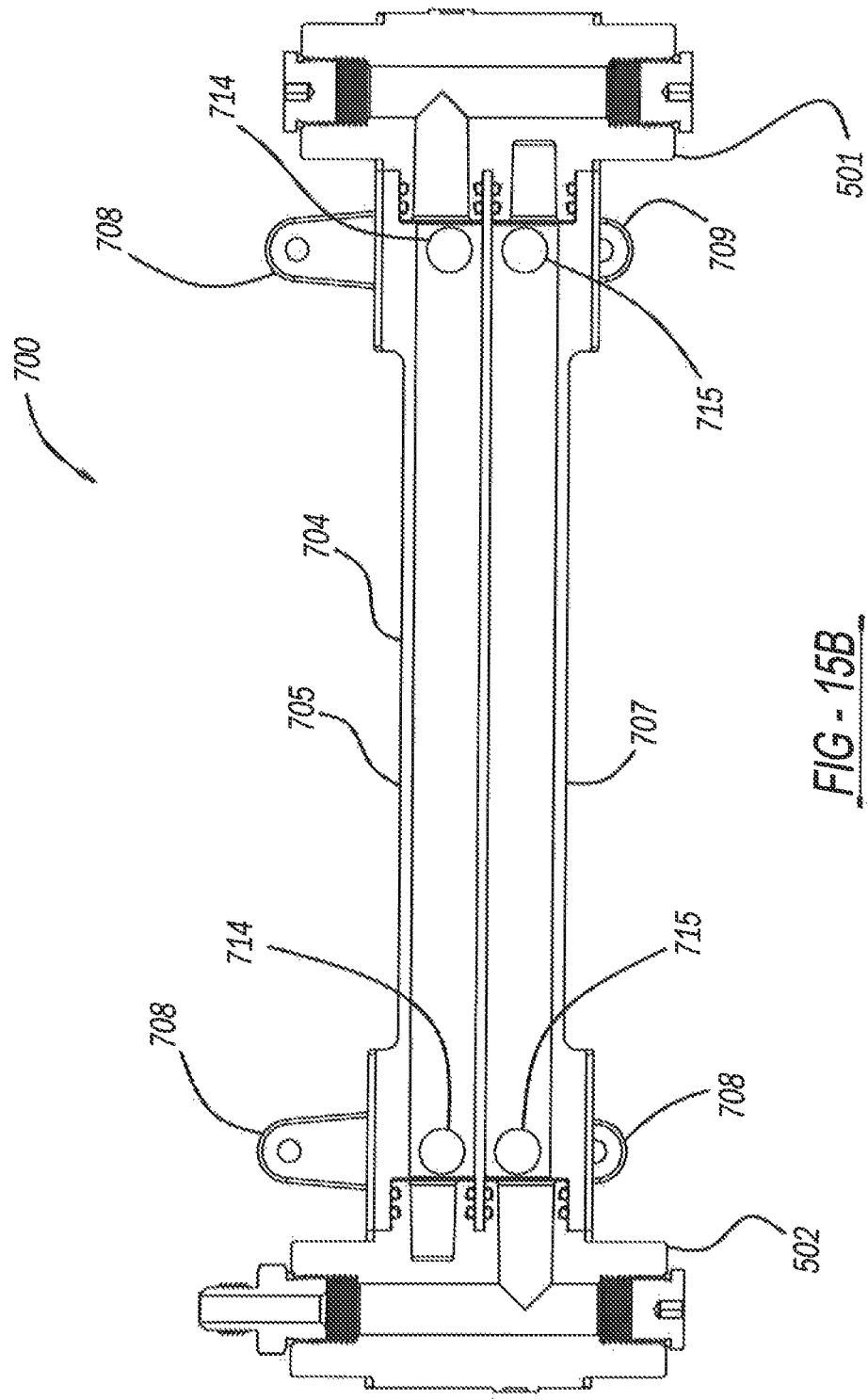

In this example, the manifold has two separate tubes 705,707 which each include channels. The channels are isolated from each other such that fluid in each channel does not co-mingle, FIG. 15B shows a manifold similar to that shown in FIG. 15A but viewed looking at the bottom of the manifold. Manifold 700 includes tabs includes a horizontal body section 704 with two tubes 705, 707. Vertical sections 714 are shown. Each vertical section includes a channel where the channels are isolated from each other such that fluid does not co-mingle. End pieces 701 and 702 are also shown. Outlet 717 is also shown.

FIGS. 16A and 16B show a view of a manifold in a perspective view where the manifold links two reverse osmosis cartridges at the bottom of the cartridges. In this example, the manifold 800 is manufactured as a single piece. In preferred examples, the manifold is constructed of a light-weight, robust material. In preferred examples, the manifold is manufactured from a plastic. The manifold 800 includes a horizontal body section 804. In preferred examples, the horizontal body section is long enough to link two reverse osmosis cartridges. In this example, the manifold links the reverse osmosis cartridges at the bottom of the units. The manifold includes two adaptors 801, 802. In this example, the manifold has two separate tubes 805,807 which each include channels, not shown in this figure. In this example, tube 805 is designed to carry permeate and tube 807 is designed to carry concentrate. The channels are isolated from each other such that fluid in each channel does not co-mingle.

In this example, the manifold also includes two vertical body sections 810 integrated into the horizontal body section 804. Each of the vertical sections 810 has two tubes, 817, 819 where one tube (817) has a channel that carries permeate and the second tube (819) has a channel that carries concentrate. Each of the vertical body sections includes fittings 814,815 that slot into a fitting of a reverse osmosis cartridge. The manifold fittings may include O-rings 806. The vertical sections may also include tabs 808,809 that may be used to affix the manifold to the system.

Figure 17A:
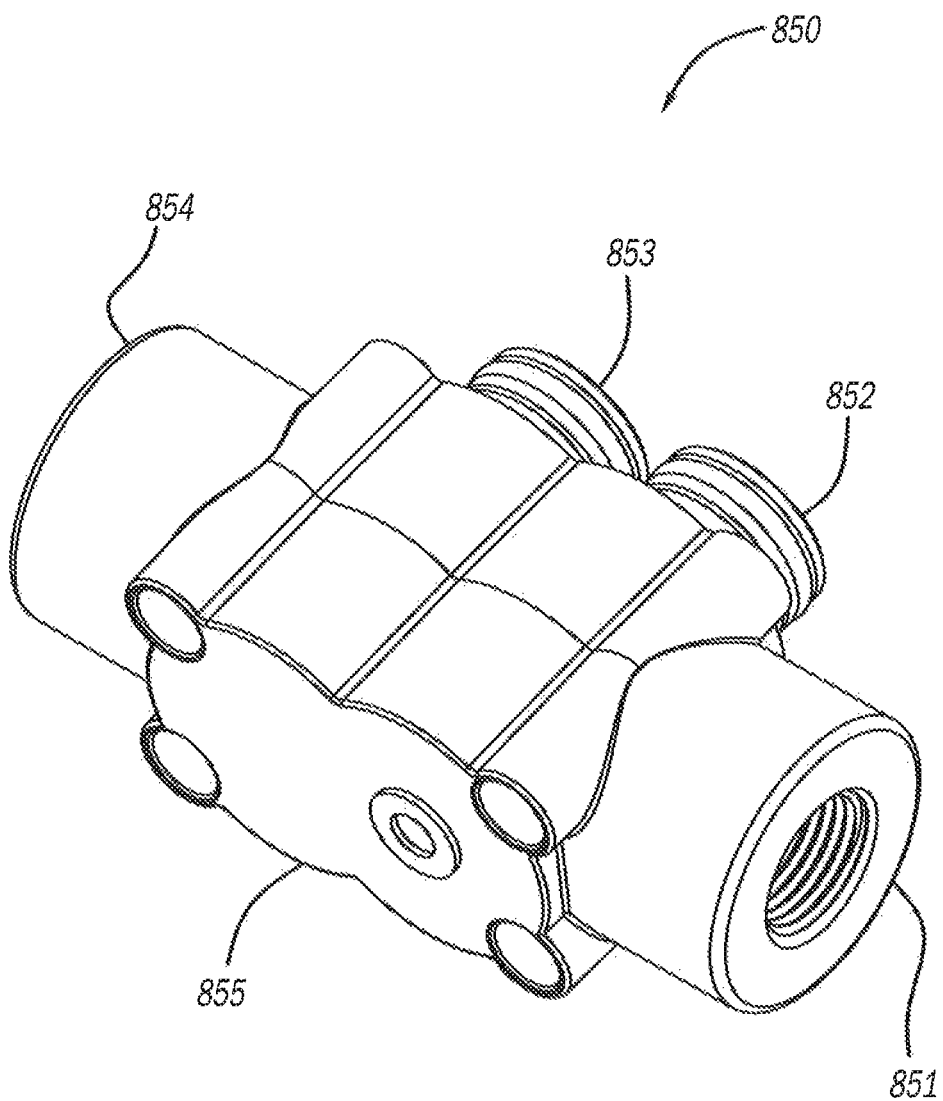
FIGS. 17A-17C show views of examples of an adaptor according to the disclosure
Figure 17B:
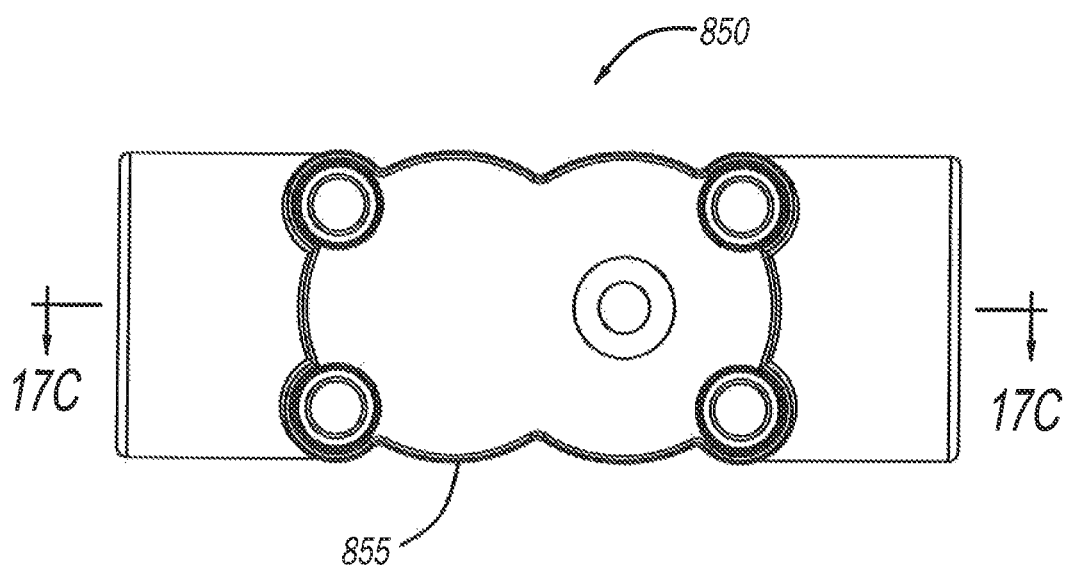
Figure 17C:
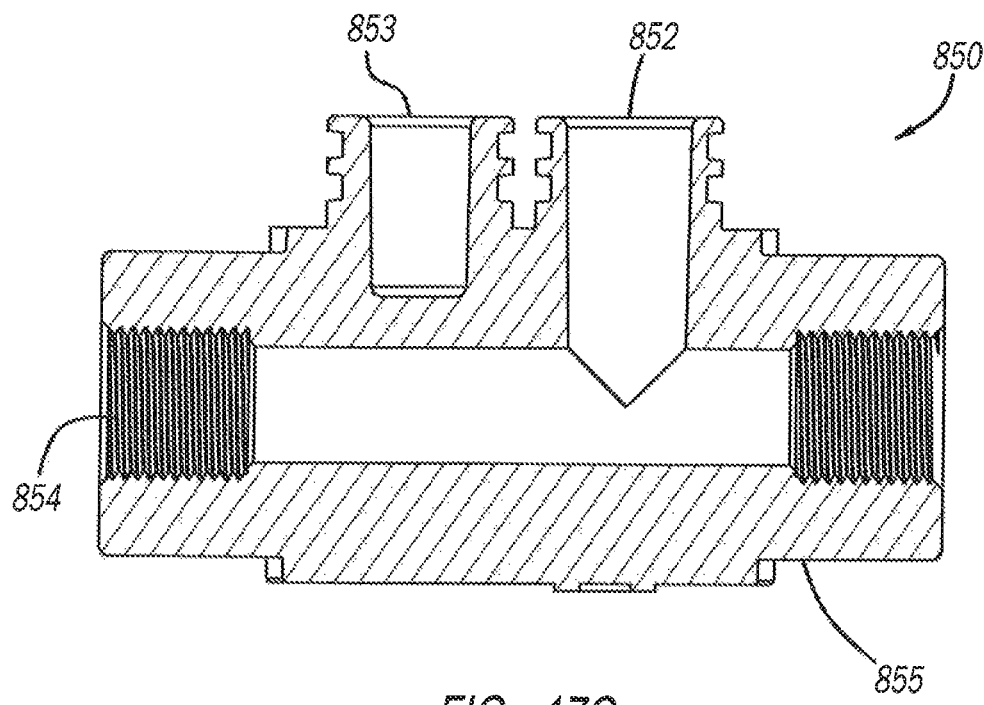

FIGS. 17A and B show views of an adaptor for the manifold of the disclosure. FIG. 17A shows a perspective view of adaptor 850 which includes body 855 and ports 851, 852, 853 and 854. In FIG. 17B, the adaptor is shown in cross-section, revealing internal channels within the adaptor.

In preferred examples, a system of the disclosure includes at least one modular bypass unit that includes at least two of the following: inlet, outlet, bypass and sensors for flow, TDS (total dissolved solids) and water pressure. The integration of these components into a modular unit facilitates assembly of a system of the disclosure. A modular unit also facilitates service of the unit.

Figure 18B:
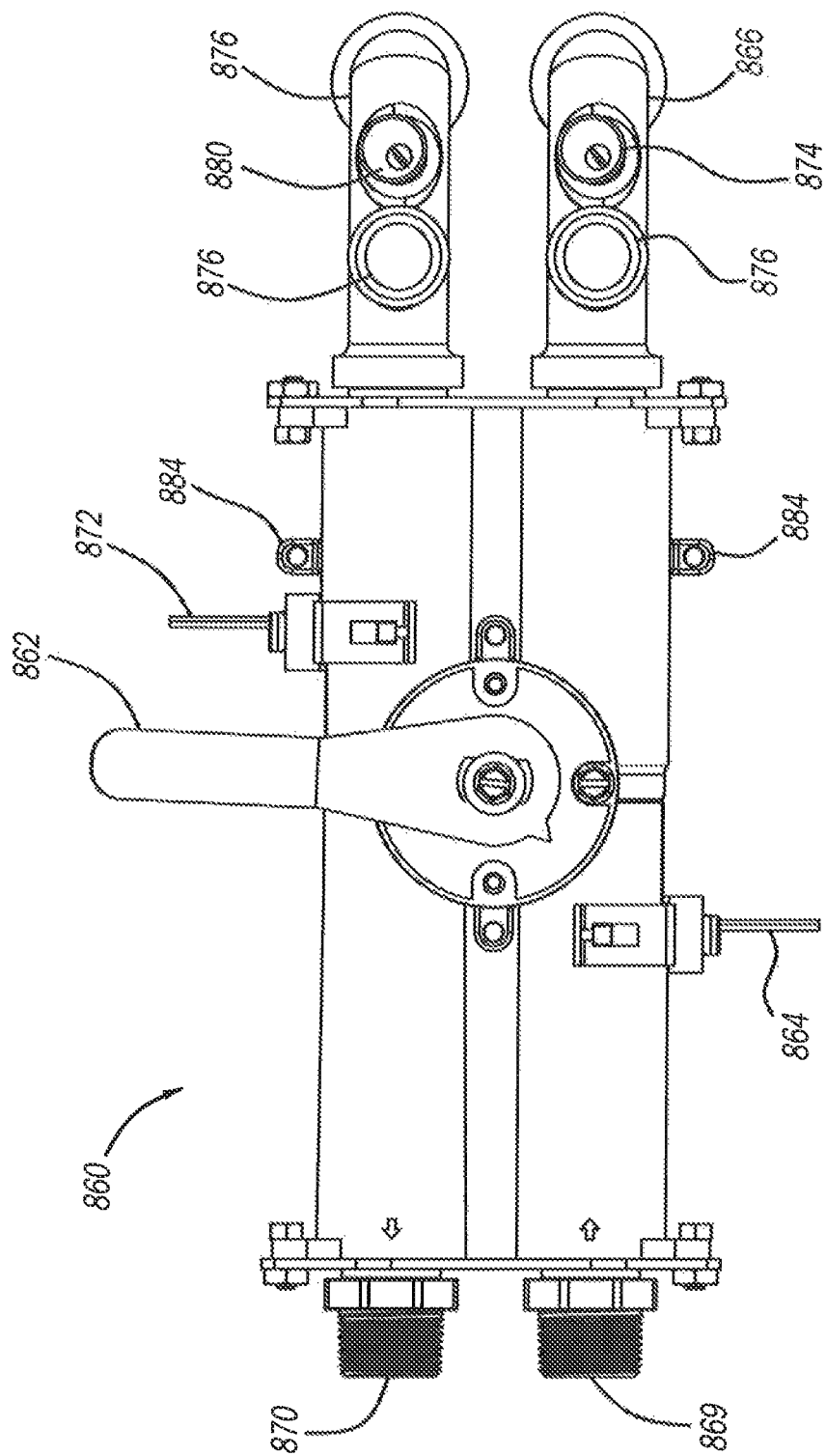
Figure 18C:
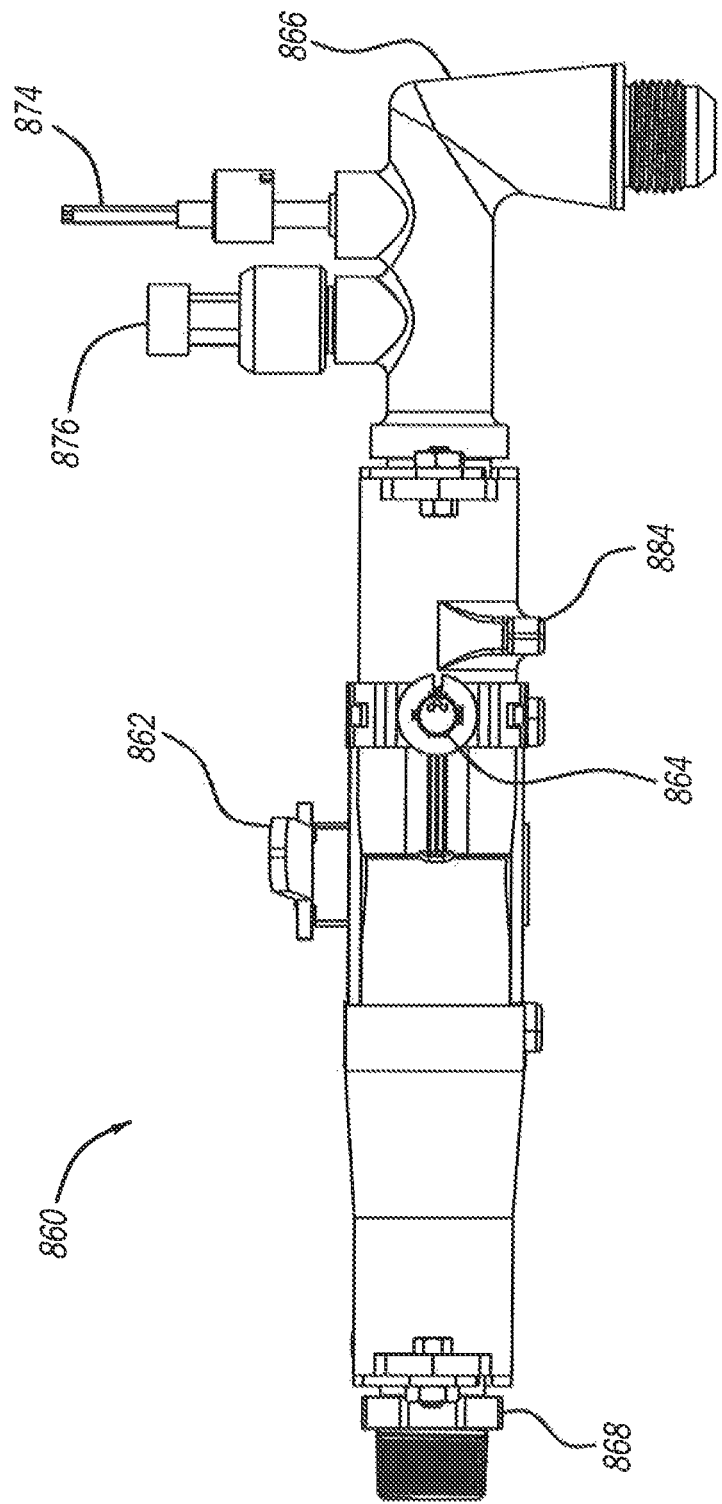
Figure 18D:
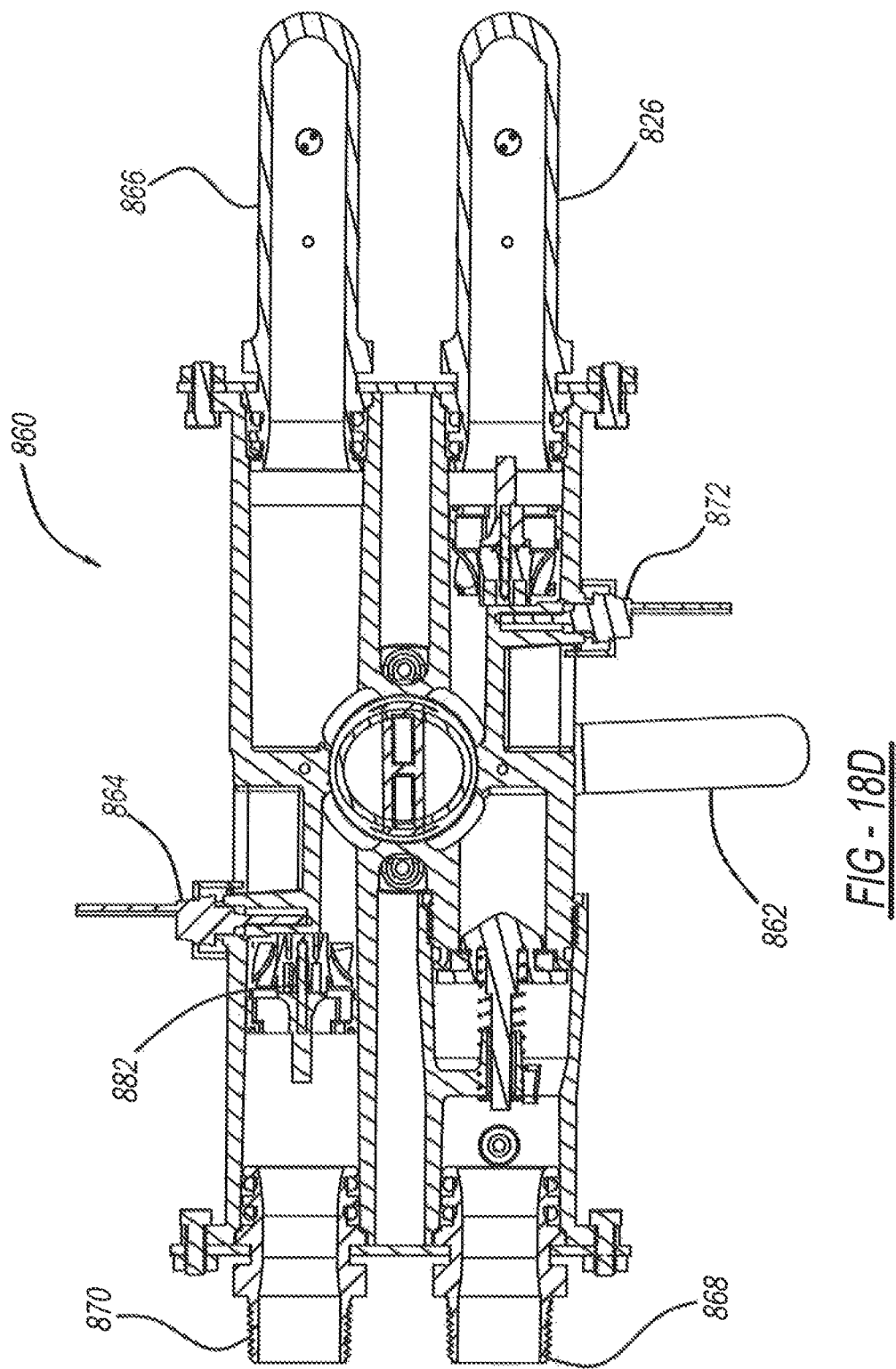

FIGS. 18A-D show one example of a modular unit according to the disclosure. FIG. 18A shows the unit in a perspective view. FIG. 18B shows the unit from above, FIG. 18C shows the unit from one side and FIG. 18D shows the modular unit from below in a cutaway view. The unit 860 includes a bypass 862, flow meter 864 for monitoring flow of inlet 868. The unit also includes an outlet 870 with corresponding flow meter 872. The unit further includes and channel to filters 886, a TDS sensor 874 and pressure sensor 876. Pressure filter 878 and TDS filter 880 are also present. One-way check valve 873 is also present. Tabs 884 may be used to affix the unit to the system. Pipe 886 carries water returning from filtration and reverse osmosis cartridges.

According to the disclosure, input water enters inlet 868 and passes through pipe 801, past flow meter 864, pressure sensor 876, TDS sensor 874, through channel 866 to the filtration cassettes. After passing through the filtration units and reverse osmosis cassettes, the output water returns through channel 886 past pressure sensor 878 and TDS sensor 880 through outlet 870. The water may be then be stored or used.

Example 3

The disclosure also describes components and methods to flush the system. According to the disclosure, a system may be flushed to remove undesirable solids such as scale, debris and other non-dissolved material present in the system, including undesirable material that is present on a surface in the system. In a preferred example, the system may be flushed to remove undesirable material that is deposited, precipitated, collected on or adhering to the membranes of the one or more reverse osmosis cartridges. For example, during reverse osmosis, contaminants may be deposited on, precipitate on, collect on, or adhere to the concentrate side of the reverse osmosis membrane. The presence of undesirable material may cause reduced efficiency of water purification by the system or may cause reduced membrane life. The flushing of the system may also remove insoluble material from other parts of the system, such as, for example, the filtration units, the tubing or fittings In some examples, a large volume of water is passed through the system to remove the undesirable material. In some examples, the large volume of water may passed through the system at high flow rates. In particularly preferred examples, the water is flowed through the system at high volume, high flow rates, and in short bursts. According to the disclosure, short bursts at high flow rates and high volumes increase the turbulence of water passing through the system. This increased turbulence facilitates the removal of undesirable material. In preferred examples, the water is flowed into the system at up to 20 times the operational flow rate, or up to 10 times the operational flow rate or up to 5 times the operational flow rate. The water may be flowed during a flush in bursts lasting from 5 to 30 second bursts, or from 10 to 30 second bursts.

The disclosure is also directed to a flush combination valve that provides for different paths for the flow of water through a system or allows for the system to be flushed with large volumes of water, thereby removing undesirable material. According to the disclosure, at least one such combination valve is placed in the water flow path of a system of the disclosure where the valve(s) may be activated to change the flow path. For example, the valve assembly may be used to change the flow path to allow the flushing of the system of any solid debris, precipitates or insoluble material that collect anywhere in the system including on the membranes used for reverse osmosis. The flush combination valve may be positioned on the system to monitor concentrate flow.

Figure 19A:
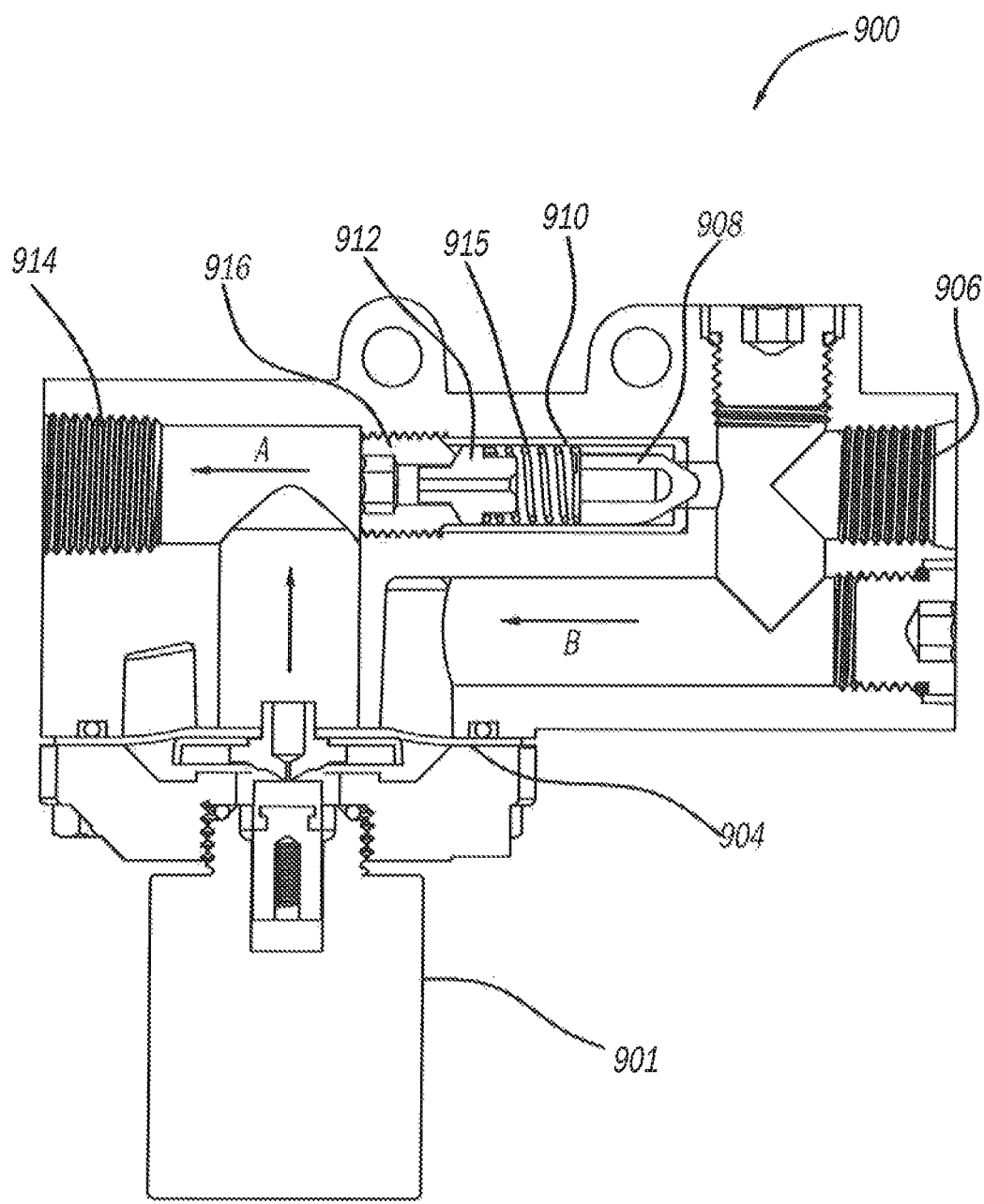
Figure 19B:
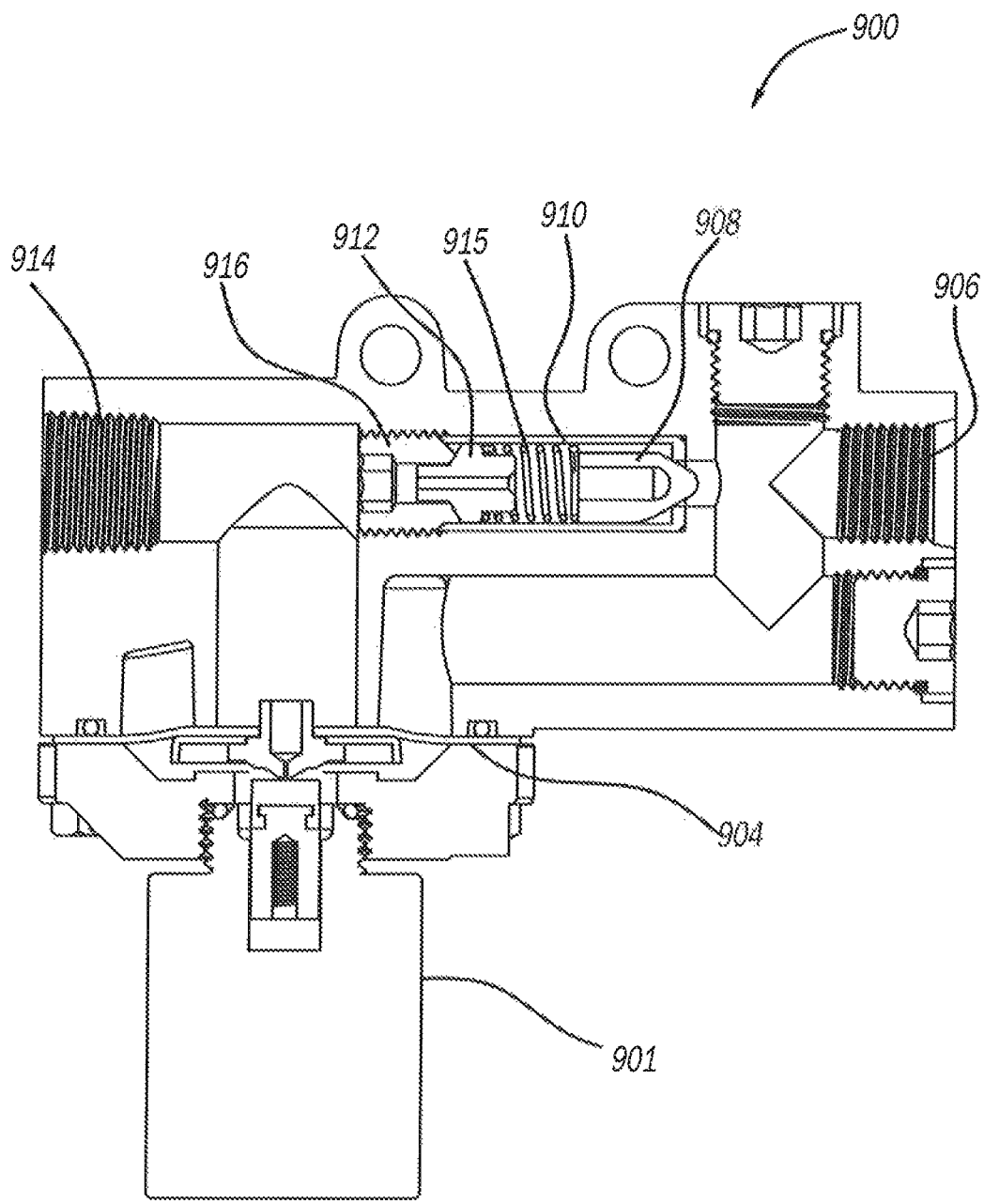
Figure 19C:
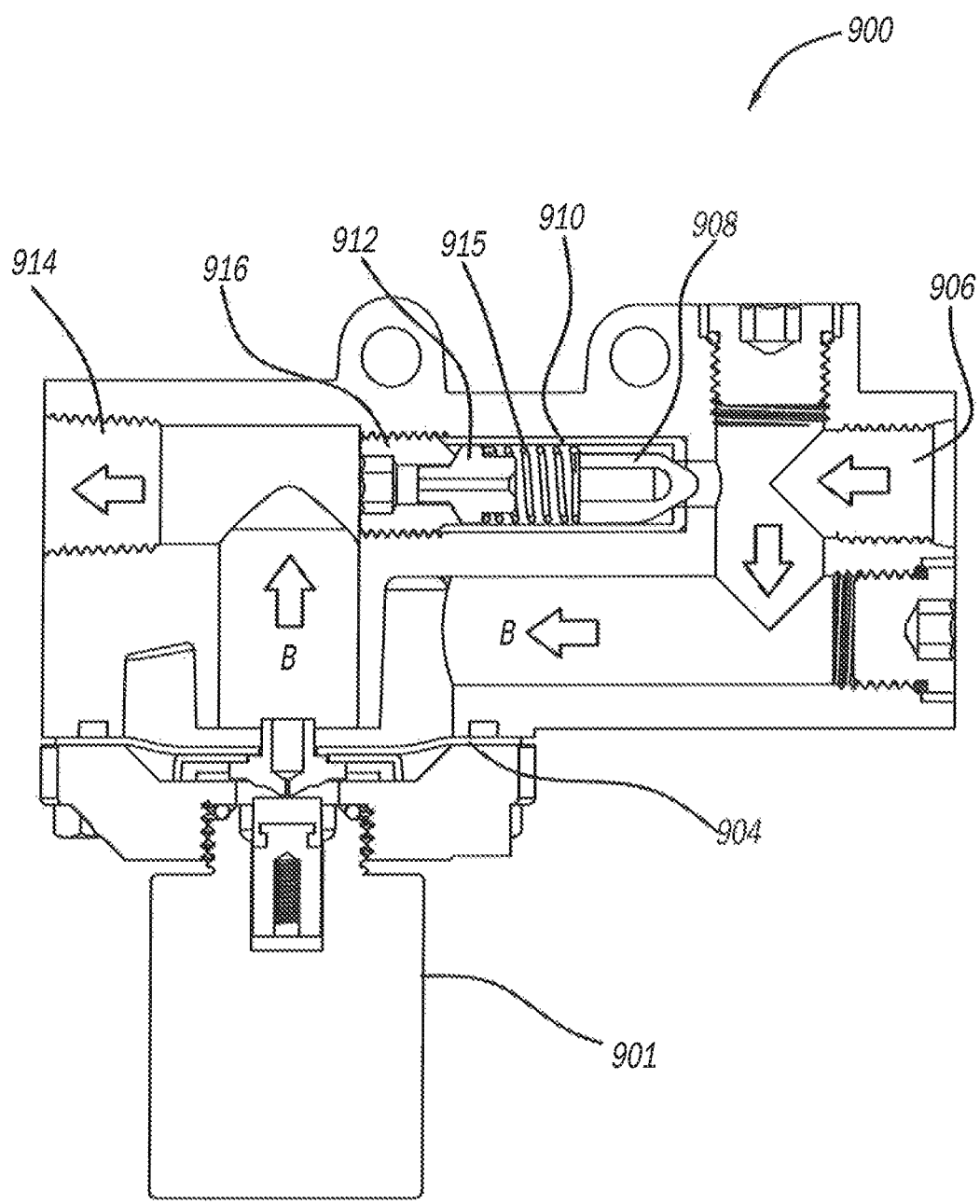

An example of flush combination valve 900 is shown in FIGS. 19A to 19D. FIGS. 19A to 19C shows the valve in cross-section. The valve 900 includes an inlet 906 where water enters the valve 900. The valve 900 includes channel A. A check valve 907 is present at the end of channel A where the valve includes check valve seat 908, spring 910, metering jet 912, and jet position screw 916 The valve also includes channel B. The valve includes diaphragm 904. The valve includes a top access plug and side access plug. The valve includes an outlet 914 where water exits the valve 900. Solenoid 901 is also present.

According to the disclosure, the valve may be used to switch between at least two different flow paths for the flow of water in the system. In one example, shown in FIG. 19A, the check valve may be set to prevent water pressure below a set value from passing through the check valve. This is advantageous, for example, when the system is not in use, thereby conserving water.

When the system is in use and water is pumped through the system as shown in FIG. 19B, water pressure is adequate to open the check valve 907. In the example of FIG. 19B, the diaphragm 904 remains closed through the action of the solenoid 901. Water passes the check valve and passes through the jet passage 912. The size of the jet passage is selected to regulate the flow of water through the system to the outlet.

Figure 19D:
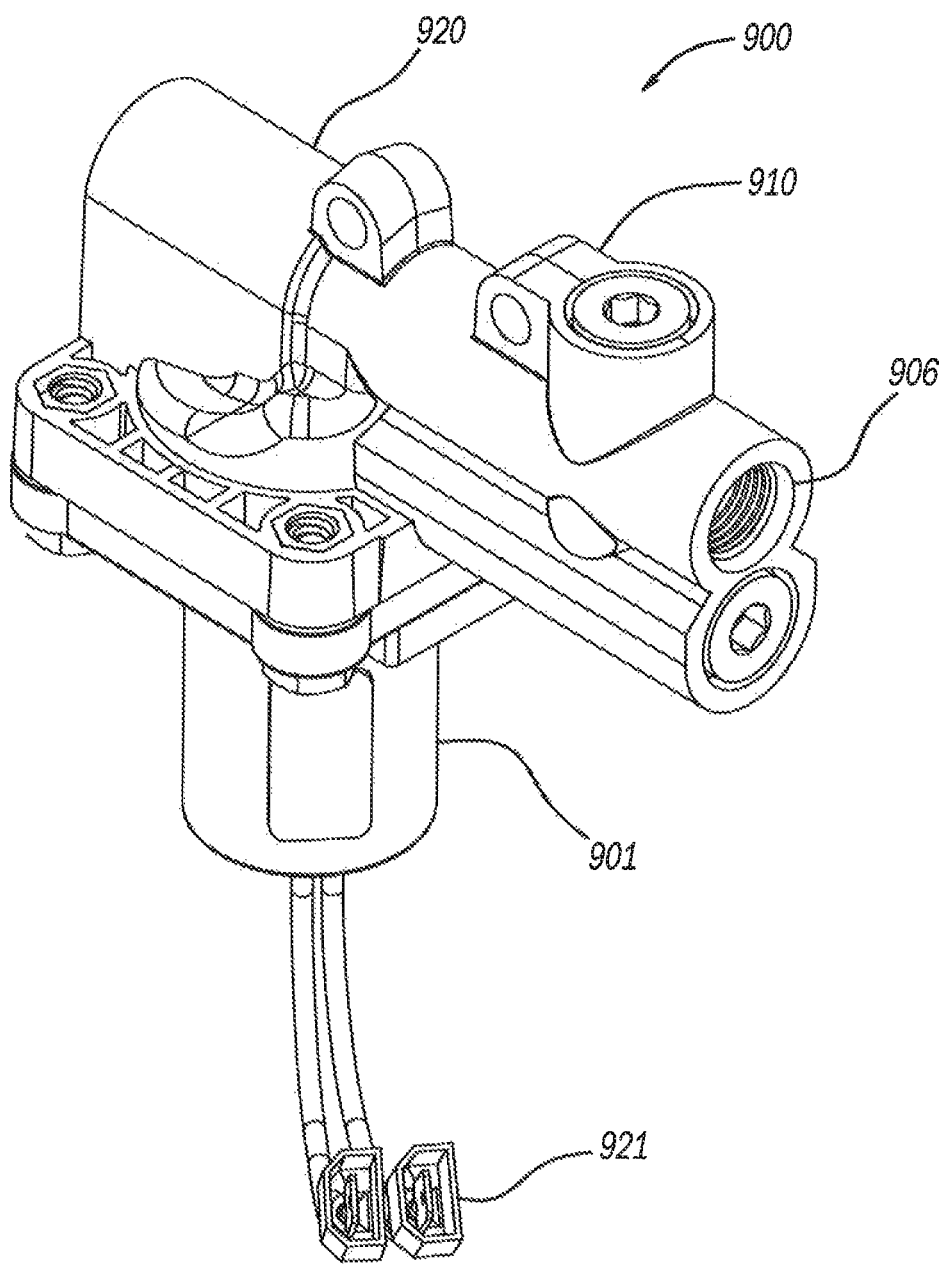
Figure 19E:
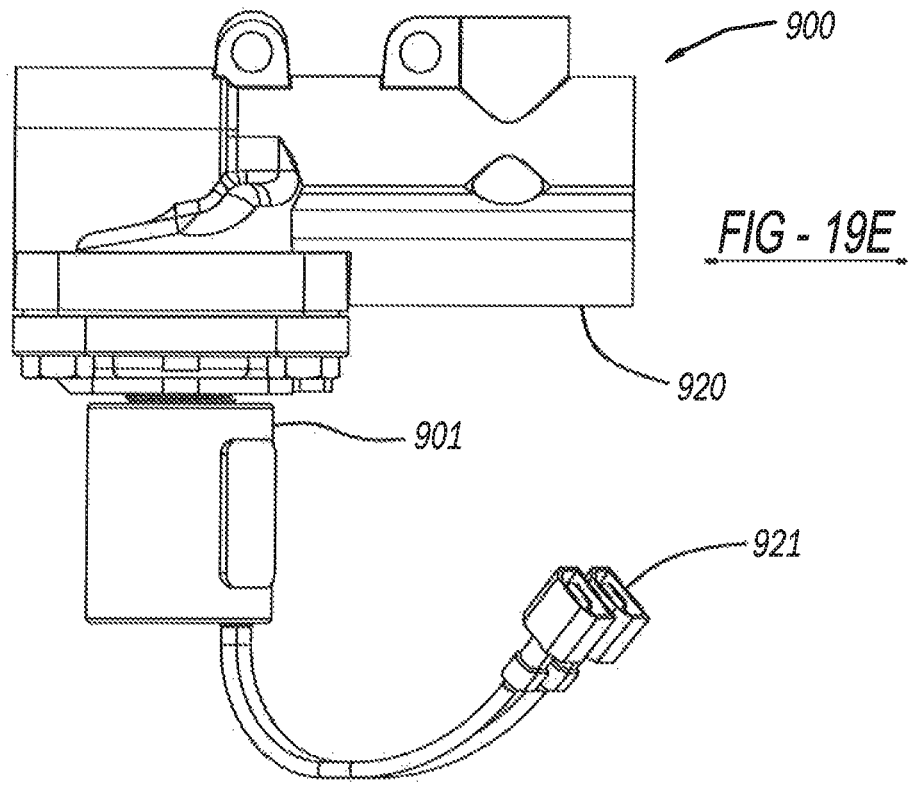
Figure 19F:
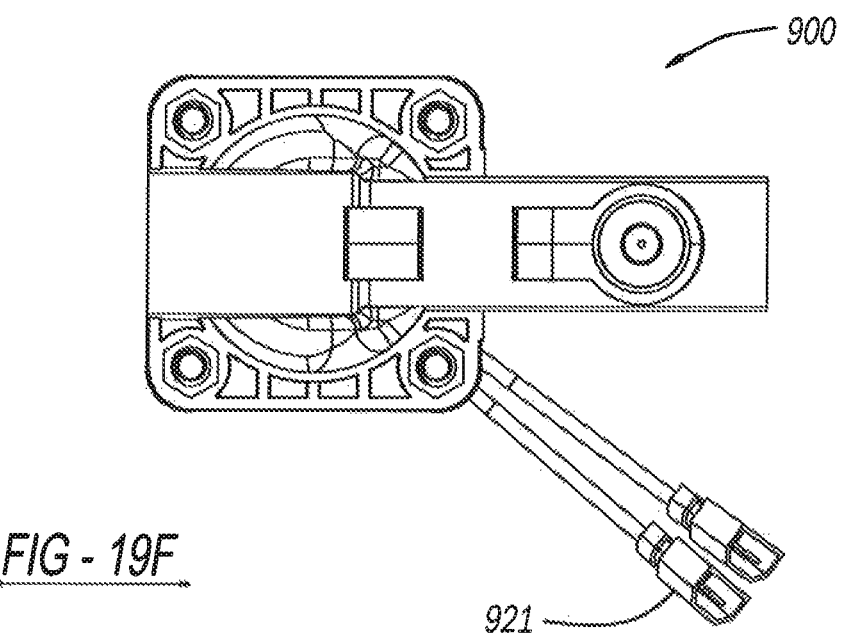
Figure 19G:
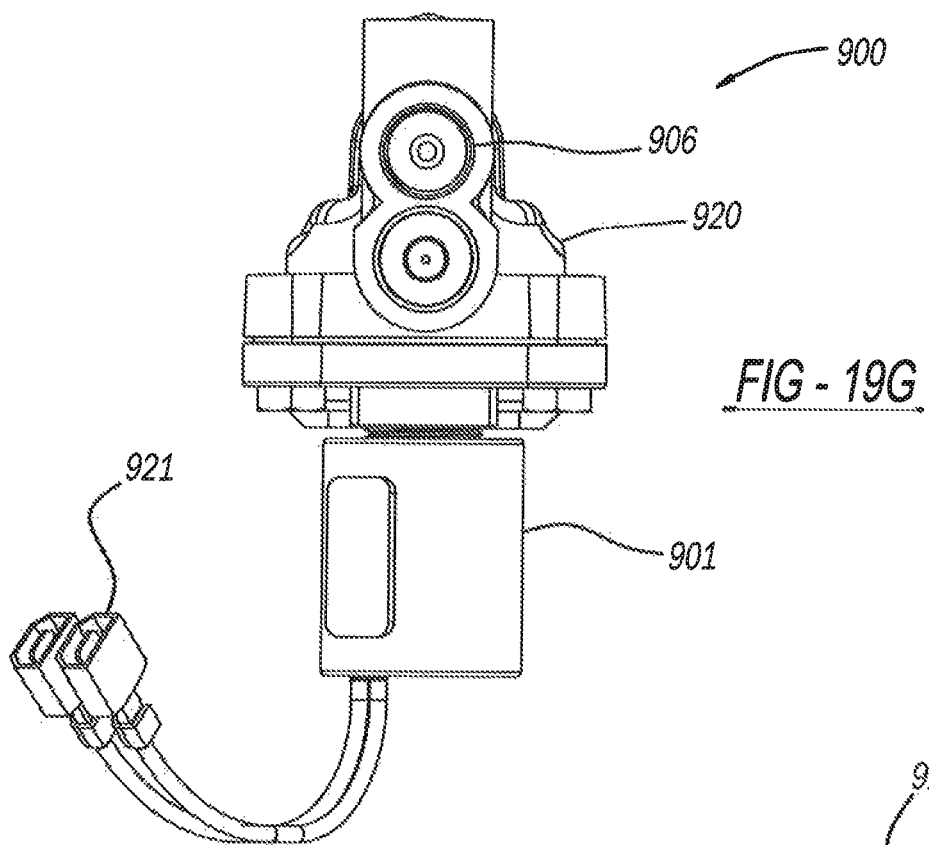
Figure 19H:
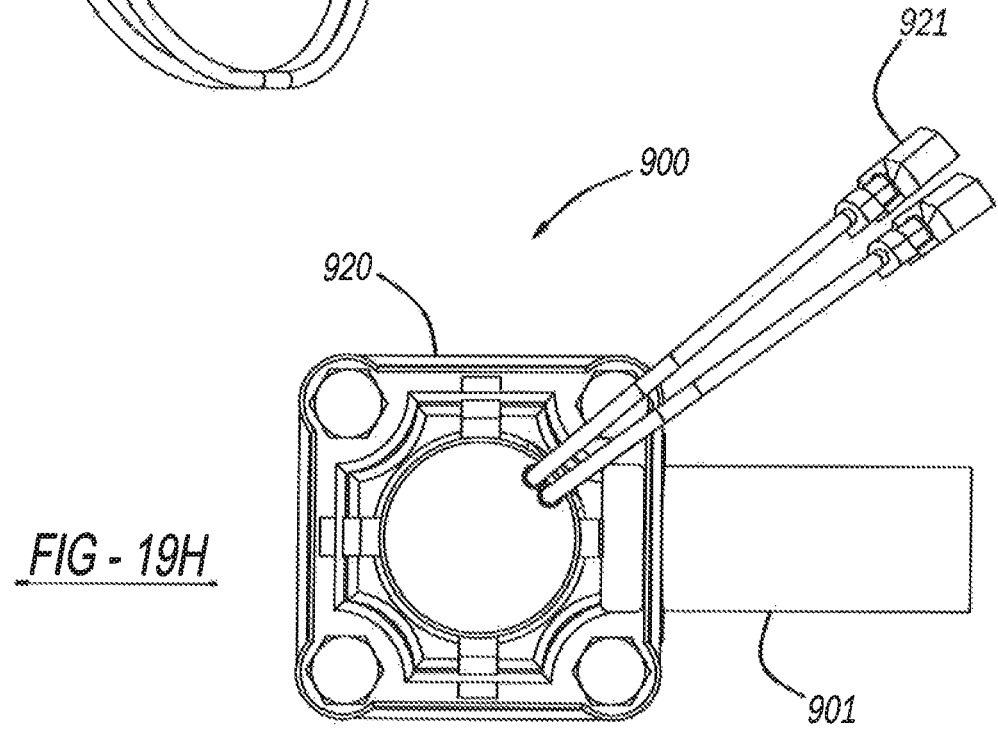

According to the disclosure, the valve may provide another water path. According to this example, a solenoid 901 may open the diaphragm 904, thereby allowing water flow through channel B. The water pressure in Channel A may drop to a pressure below the pressure set for the check valve 907. As a result, water does not pass through the metering jet orifice 912. FIG. 19D shows different external views of the combination flush valve in perspective views. Combination flush valve 900 includes body 920, electrical connection 921, inlet 906, solenoid 901 and check valve 910.

Figure 20:
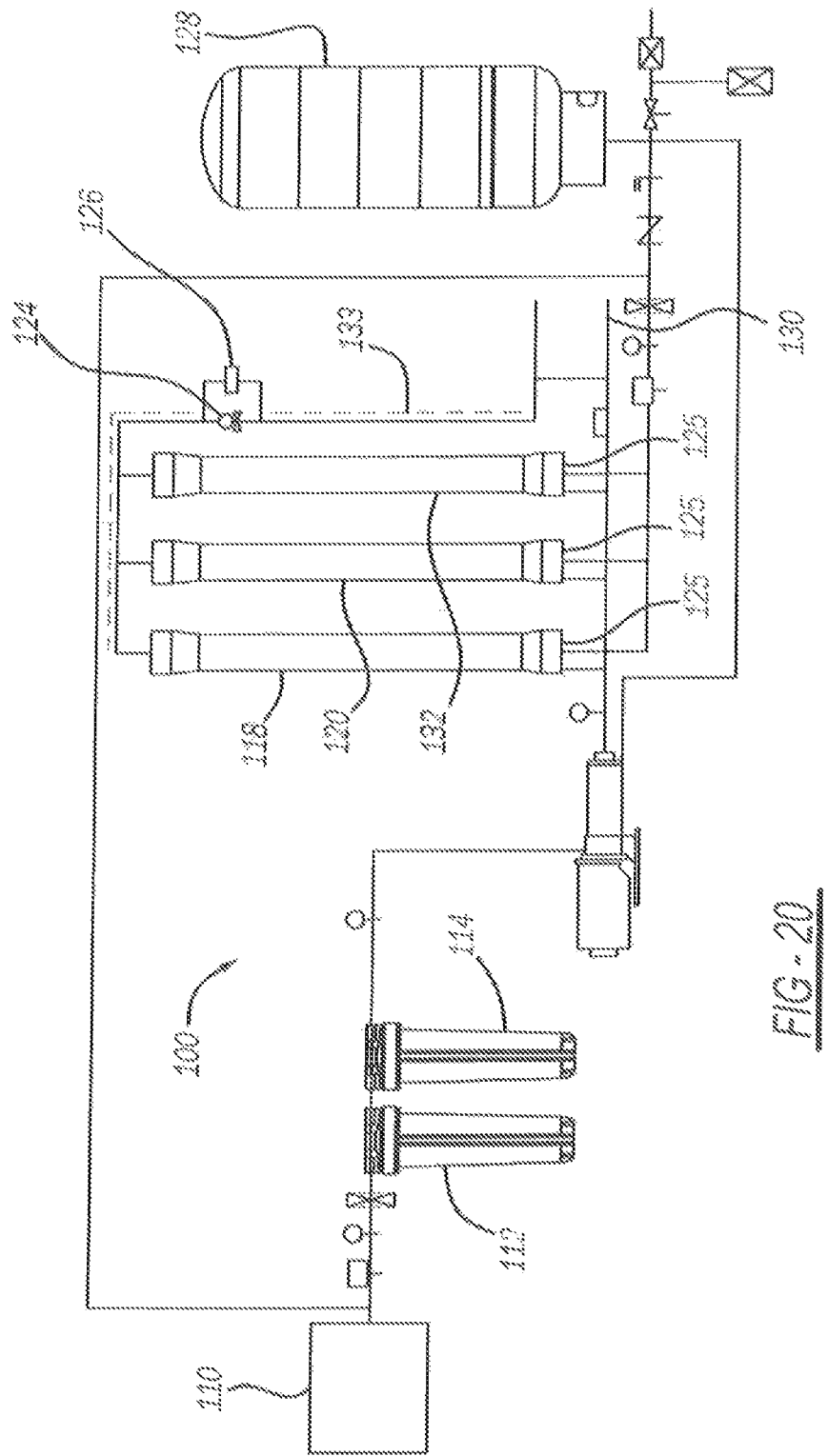
FIG. 20 shows a schematic view of a system according to the disclosure
Figure 21:
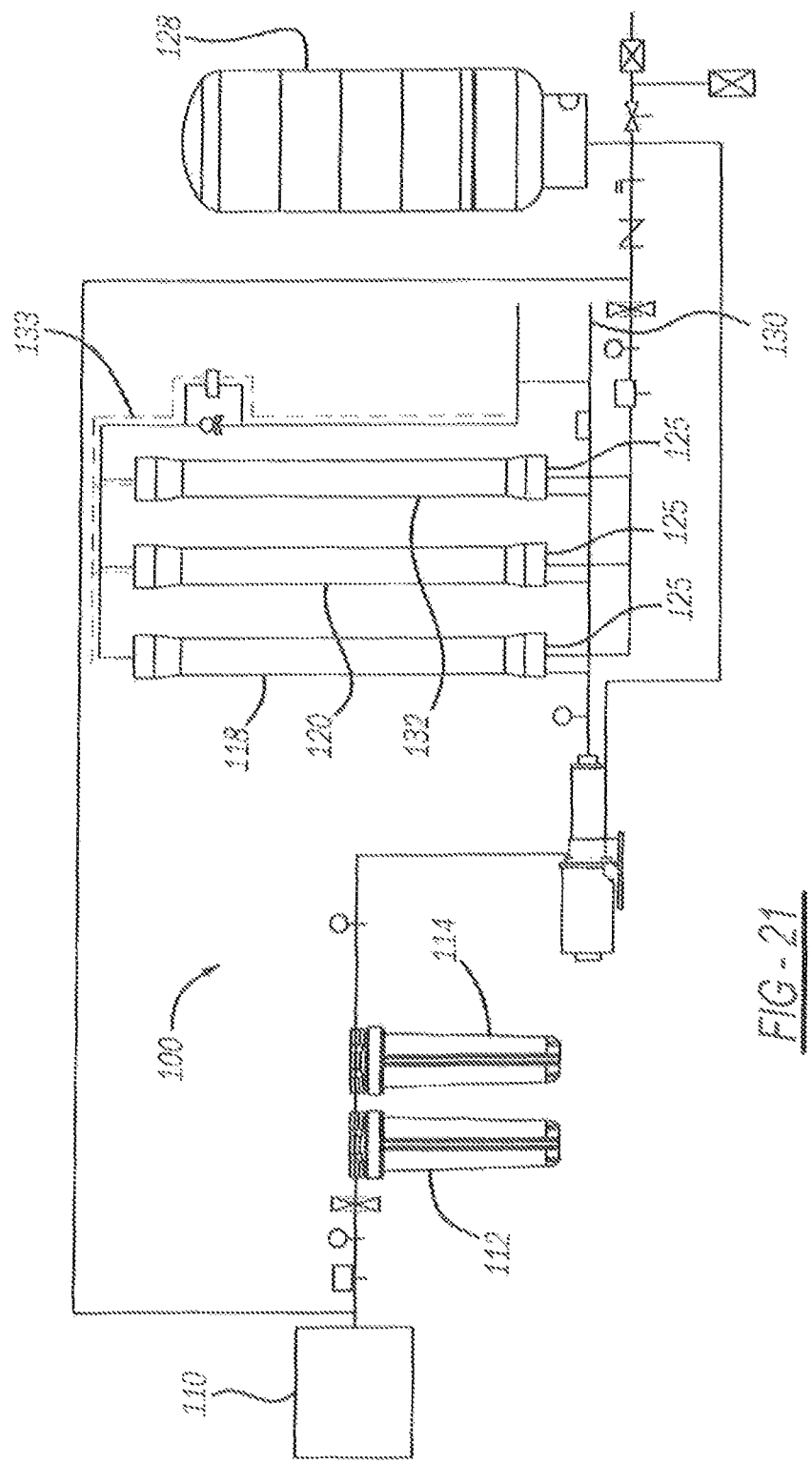
FIG. 21 shows a schematic view of the system of FIG. 20 during flush operations

FIGS. 20 and 21 are schematics of a system 100 according to the disclosure. During normal operation (FIG. 20), input water is flowed through inlet 110 and water passes through sediment filter 112 and carbon filter 114. Booster pump 116 may be used to increase flow to reverse osmosis cartridges 118, 120,122. During reverse osmosis, a fraction of the input water flows across a membrane in the cartridges, forming the permeate. In this example and similar examples, after passing through the membrane the permeate water (Lines with arrowheads) flows from the bottom 125 of the reverse osmosis cartridges for further purification or for storage 128. The amount of water crossing the membrane is related to the flow rate of the input water into the cartridges. According to this example, concentrate water passes through flow regulator or meter 124 which regulates the flow of the input water and thereby regulates the amount of permeate water generated by the system (water flow path shown dash/dot line).

According to this and other examples, the system 100 may run a flush cycle after a predetermined period. For example, a flush cycle may be performed after the filling of a storage tank. In one example, during a flush cycle, input water enters through inlet 110 and passes through sediment 112 and carbon 114 filters and reverse osmosis cartridges 118, 120, 122 as previously described. During the flush cycle, the flush solenoid valve 126 is activated for brief periods and the concentrate water flow thereby bypasses flow regulator 124 such that the flow rate is no longer regulated. The booster pump 116 remains activated and a high flow rate of water passes through the reverse osmosis cartridges 118, 120,122 in short bursts (water flow path shown dash/dot line). In this situation, there is little or no permeate flow. For example, the solenoid may be left on for 10 seconds, then shut down for 5 seconds, then turned back on for 10 seconds. This cycle may be repeated a predetermined number of times, depending, for example on the properties of the input water. The bursts of water during the flush cycle dislodge and remove, any undesirable, undissolved material in the system.

Example 4

In another example, a system according to the disclosure undergoes a high turbulence flush where the water used for flushing has a lower concentration of impurities than input or concentrate water. For example, a system may be flushed using permeate water. That is, the system is flushed using water that has passed through a system during the normal operation of the system, where the normal operation of the system is to treat an input water.

According to this example, permeate water is passed through a system to displace or dissolve any accumulated, unwanted material including debris, deposits, scale, precipitates or otherwise non-dissolved material that has collected on a surface of the system, such as the reverse osmosis membranes. According to the disclosure, the permeate water is flowed into the system at high flow rates to create turbulence that aids in the displacement, dissolution or otherwise removal of accumulated, unwanted material. In addition accumulated, unwanted material may more easily dissolve in permeate water that is used to flush the system, given the low concentration of dissolved material in the permeate water.

Figure 22:
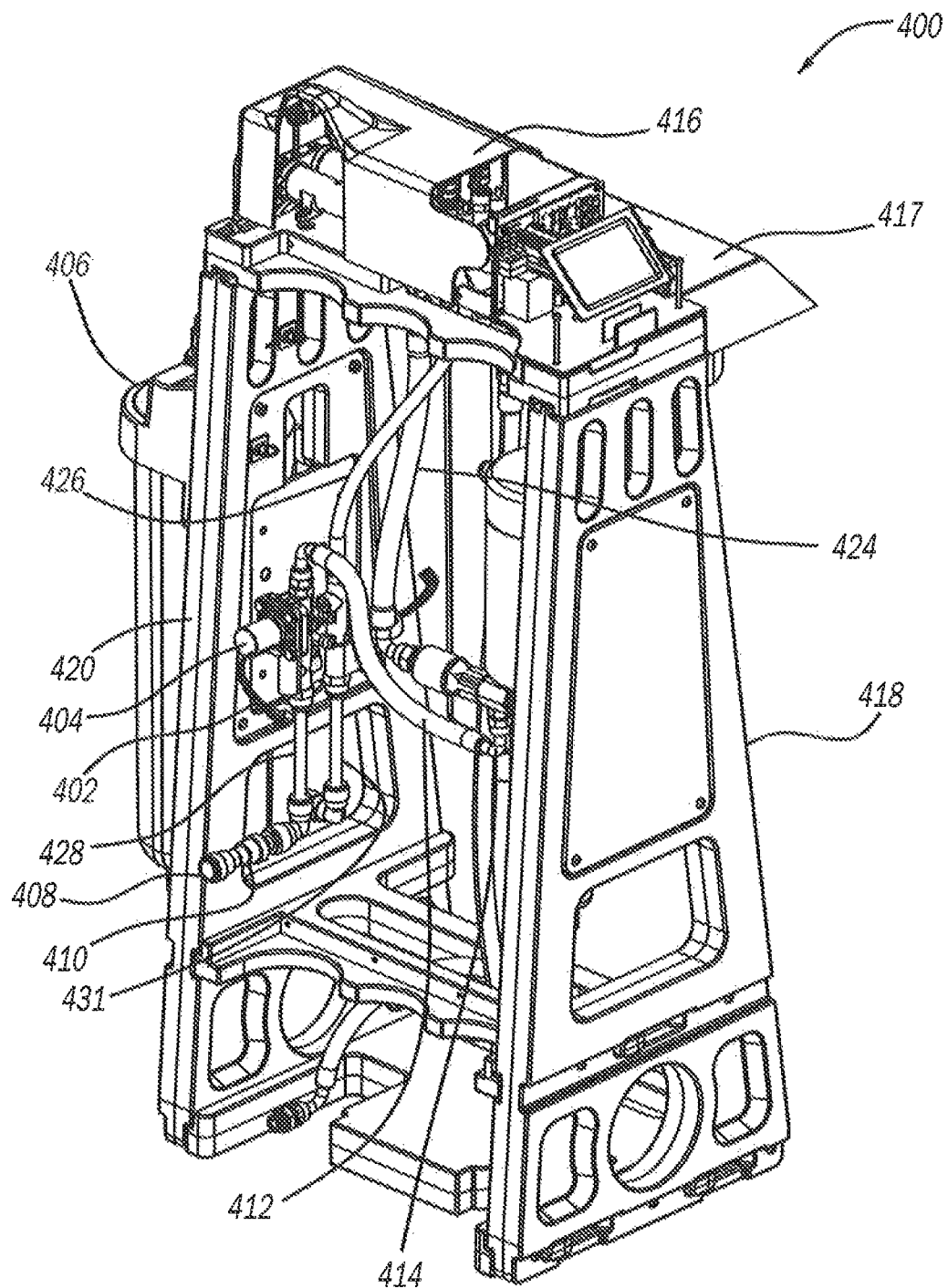
FIG. 22 shows a perspective view of a water treatment system according to the disclosure where the reverse osmosis units have been removed to show the interior of the system.
Figure 23:
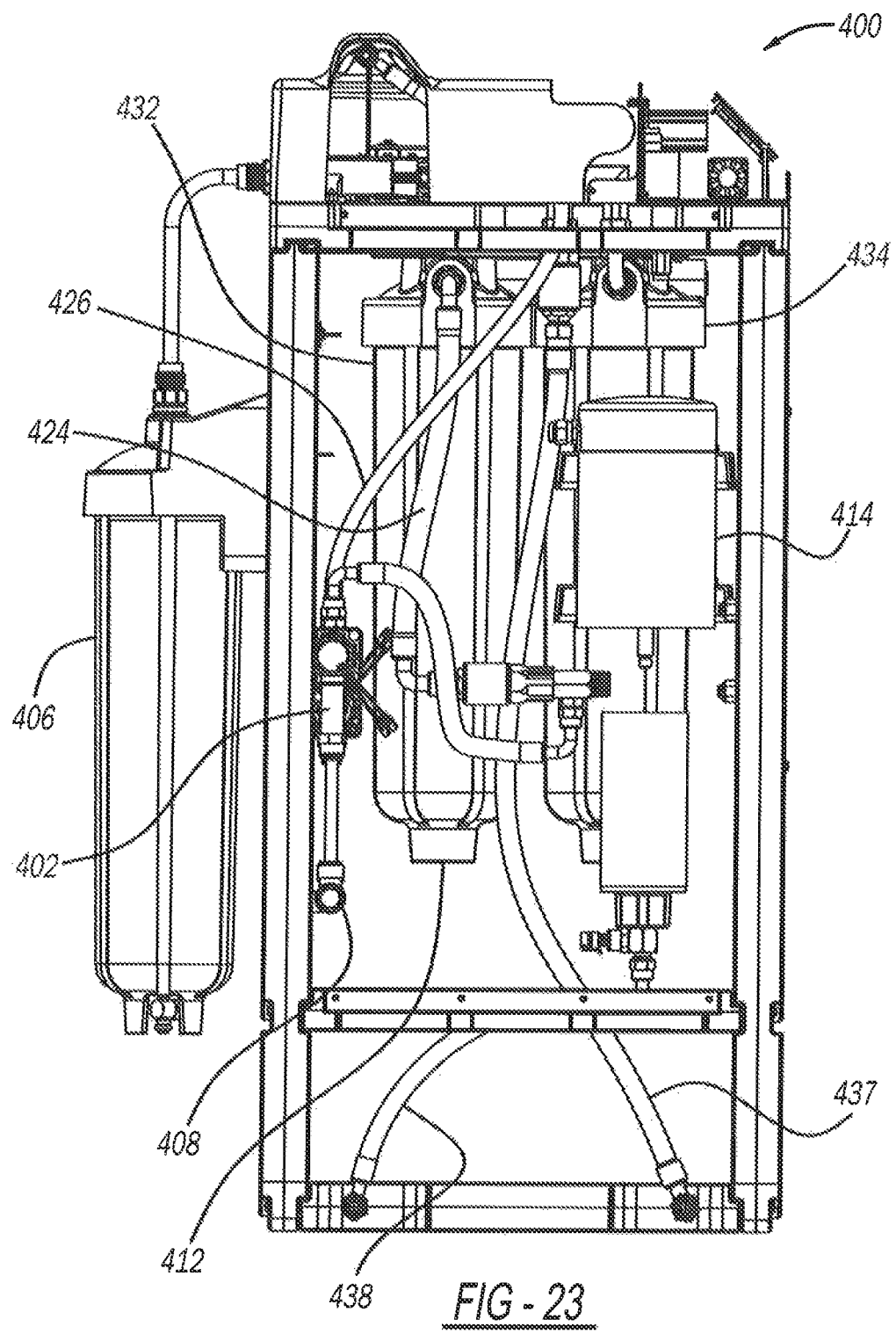
FIG. 23 shows a side view of a water treatment system according to the disclosure where the reverse osmosis units have been removed to show the interior of the system.

FIG. 22 shows a water treatment system in a perspective view, where the system uses permeate water to perform flush cycles of the system. FIG. 23 shows a similar system from the side. In these figures, the reverse osmosis cartridges are omitted to more clearly show the interior of the system, including the permeate flush valve and its components. The permeate flush valve may be mounted onto all examples of systems previously described. For example, the systems that have up to six reverse osmosis units.

System 400 includes permeate flush valve 402 with solenoid 404. Inlet 408 allows permeate water to permeate flush valve. During flush cycles, permeate flush valve 402 opens to allow permeate water to pass through feed line 412 to booster pump 414. Also shown in this view of the system are remineralizer 406, top cover 416 with display 417 and side panels 418, 420. Also, shown is line 424 is placed between prefilters 432,434 to Booster pump 414 for use during normal use of a system. Concentrate flush valve 428 is shown with feed lines 426 and 431. In some preferred examples of the disclosure, a check valve may be included at 410.

Figure 24A:
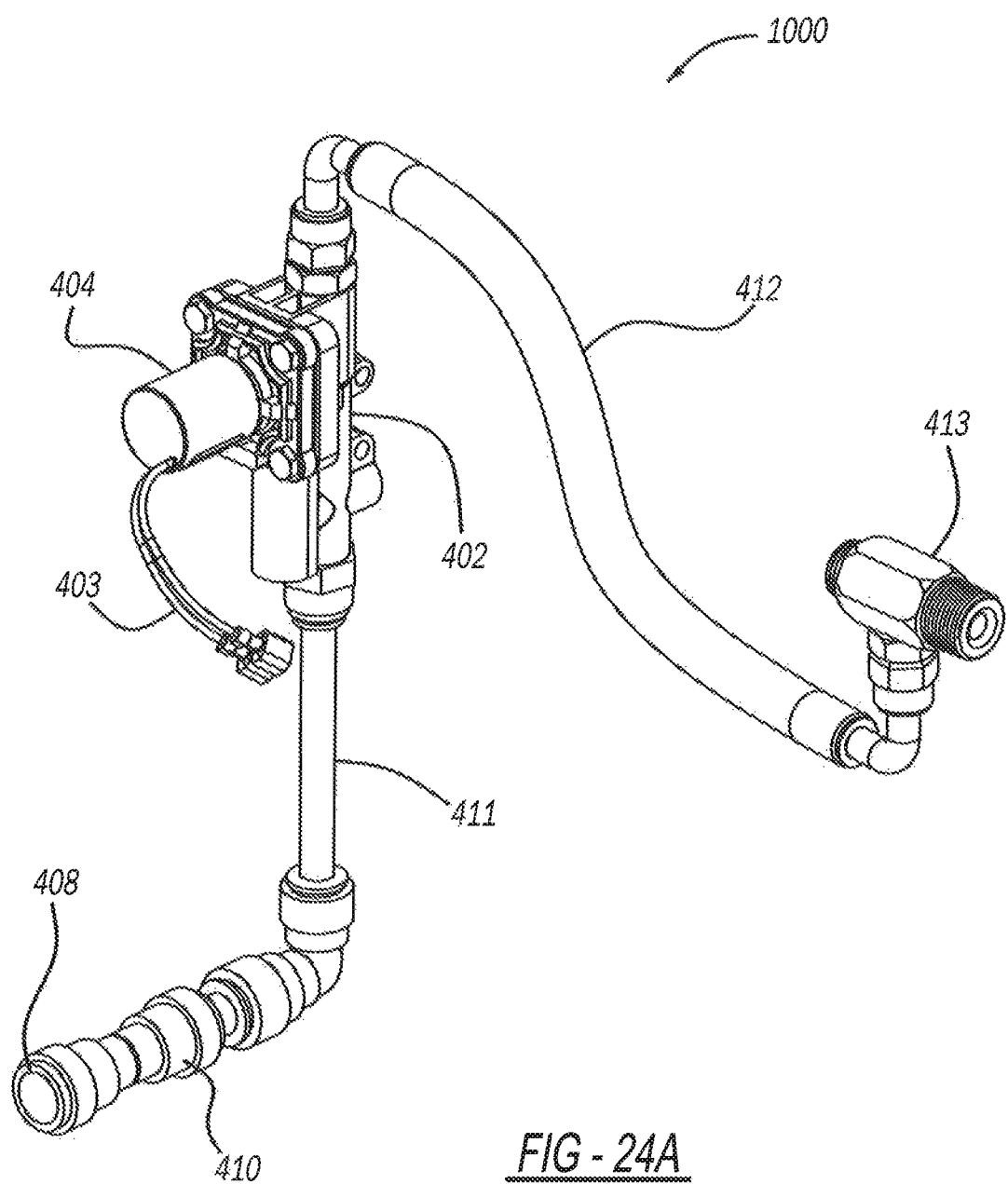
FIGS. 24A to C show different views of a permeate flush valve assembly according to the disclosure.
Figure 24B:
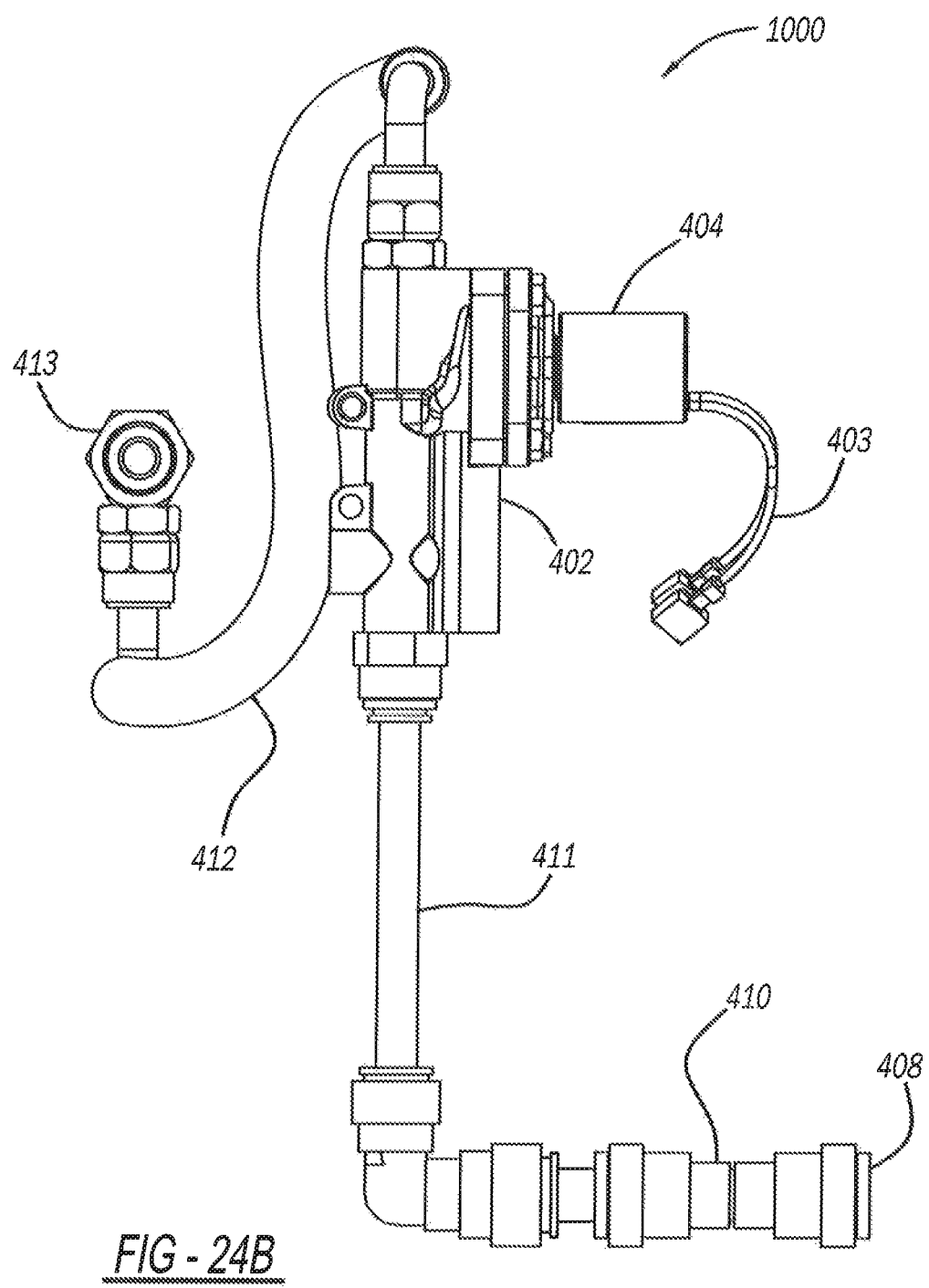
Figure 24C:
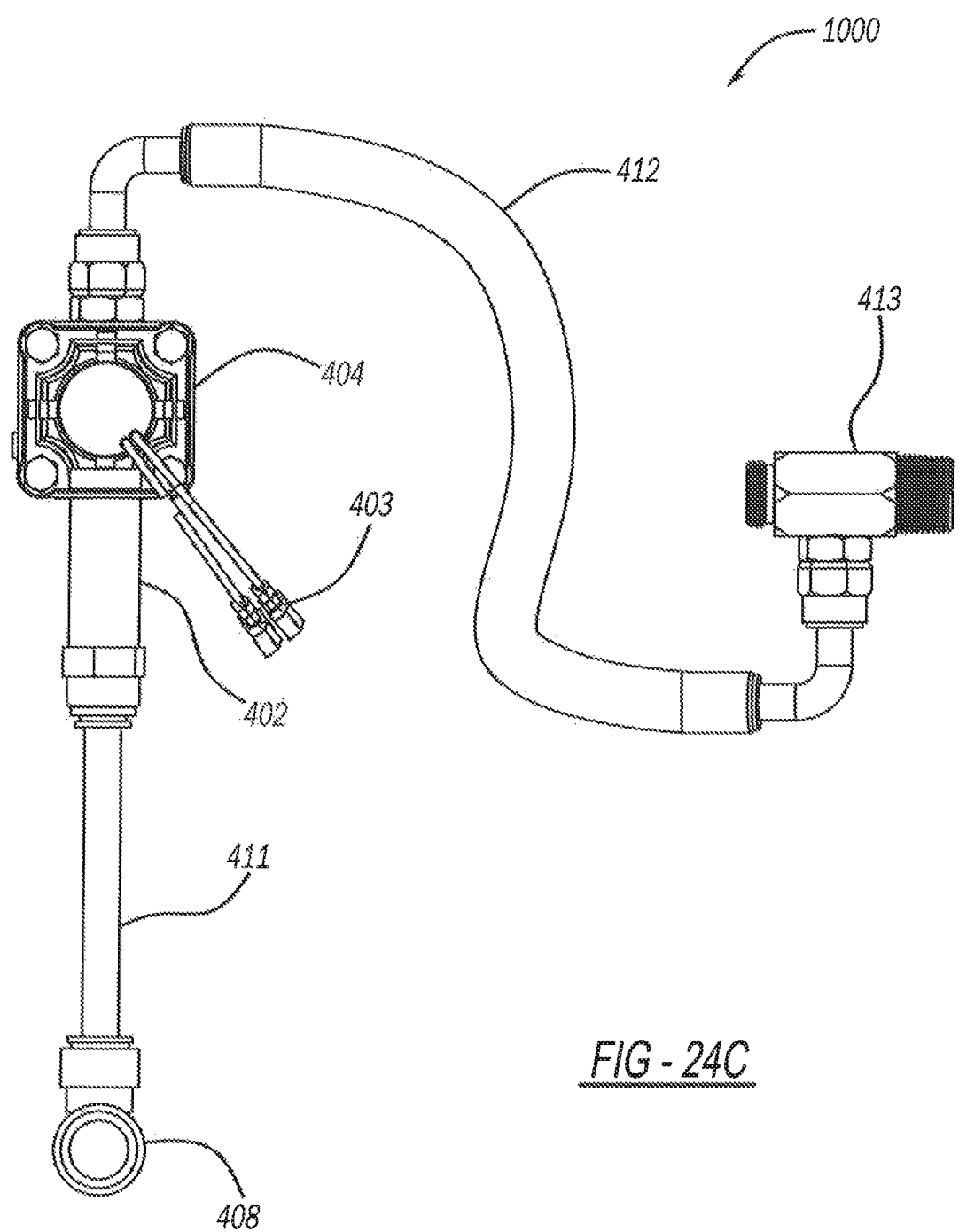

FIGS. 24A to 24C show different views of a permeate flush valve assembly according to the disclosure. Permeate flush assembly 1000 includes permeate flush valve 402, solenoid 404, power cable 403, inlet 408, one-way check valve 410, line from inlet to valve 411, line from valve to outlet 412, outlet fitting 413.

Figure 25:
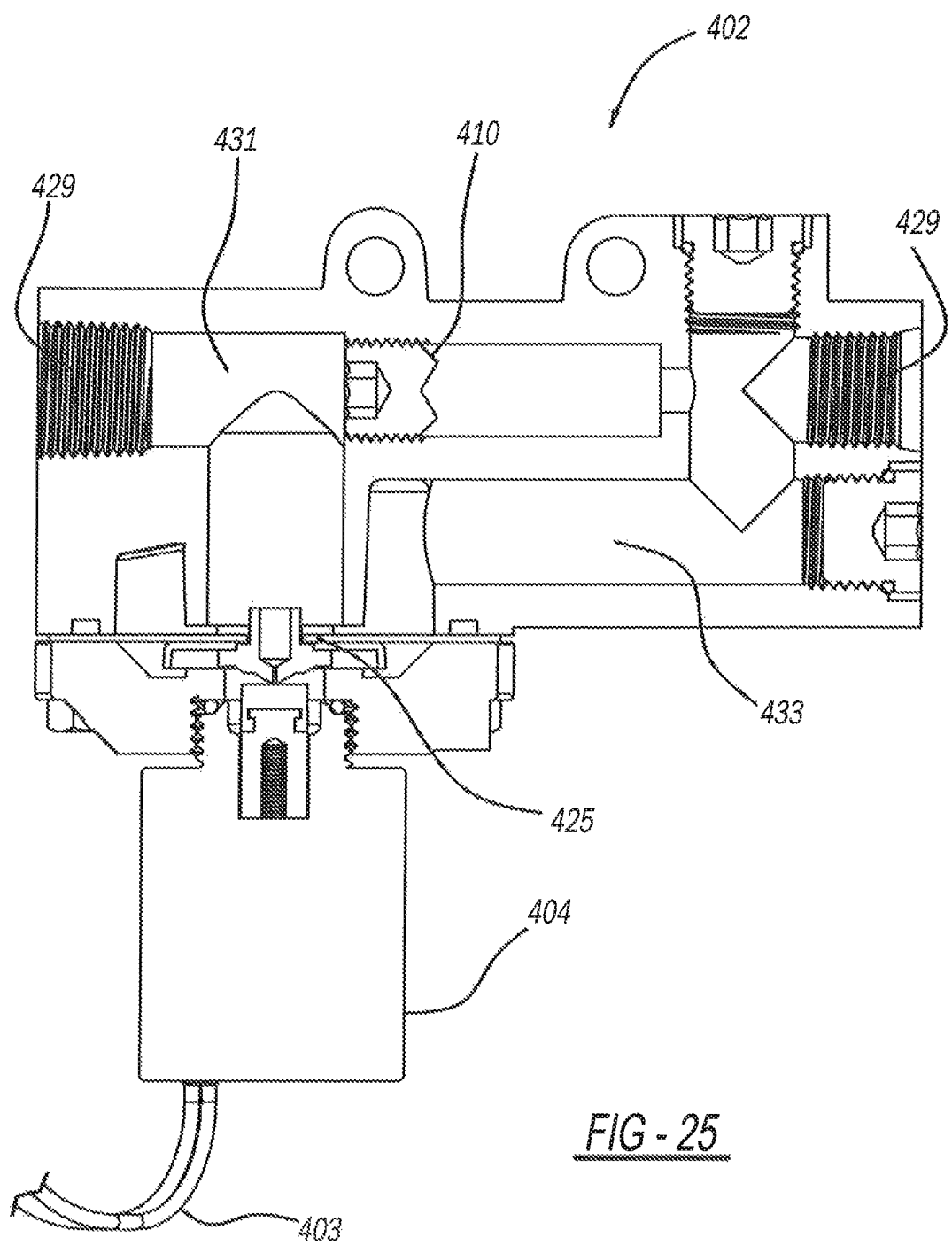
FIG. 25 shows a cross-sectional view of a permeate flush valve according to the disclosure

FIG. 25 shows a permeate flush valve 402 in cross-section, where the valve is in a closed position. The cross-section shows inlet 427, channel 431, channel 433 and outlet 429. Solenoid 404 is shown as well as plunger 425. According to the disclosure, the valve remains closed under normal operating conditions. During a flush procedure, solenoid 404 opens valve 402 such that plunger 425 is disengaged. Permeate water is able to flow through inlet 427 through channel 431 and channel 433 to outlet 429.

Figure 26:
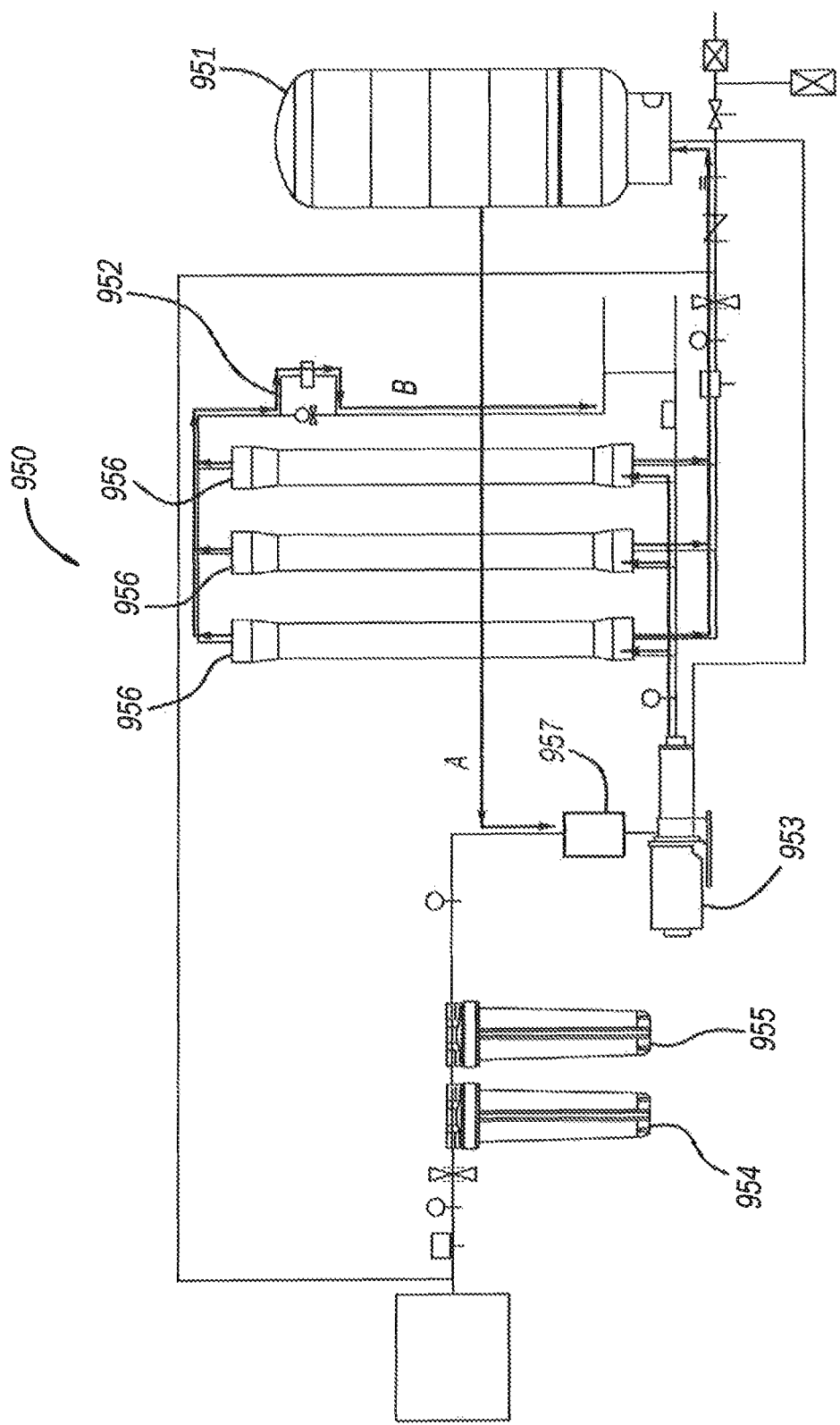
FIG. 26 shows a schematic illustrating the procedure of flushing the system according to the disclosure.

FIG. 26 is a schematic showing one example of high turbulence flush using permeate water. According to this example, permeate water is maintained in a tank under pressure, after having been flowed into the tank during normal operation of a system. For example, the tank may be a hydro-pneumatic tank. The tank may be pressurized up to 100 psi (689 Kilopascals) or up to 90 psi or up to 80 psi, or up to 70 psi or up to 60 psi. In preferred examples, the tank is pressurized from about 10 psi to about 100 psi or from about 30 to about 90 psi.

According to this and similar examples, a system 950 includes a permeate flush valve 957, generally as previously described. During normal operation, the solenoid maintains the permeate valve in a closed position. Permeate water is produced from input water and flowed into the tank 951 for storage, according to examples in this disclosure. Pump 953, filtration units 954, 955, and reverse osmosis cartridges 956 are shown.

At a selected time and at a selected frequency, the system may be flushed with permeate water. According to preferred examples, when the tank is at a selected pressure, the permeate flush valve 957 is opened through the action of the solenoid. In preferred examples, the valve is opened when the tank pressure reaches from about 75 to about 90 psi. In a particularly preferred example, the valve is opened when the tank pressure is about 83 psi. The opening of the permeate valve permits the flow of permeate water from the tank and into the reverse osmosis cartridges of the system, as shown by the thin arrow (Line A) leading from the tank. In preferred examples, the boost pump is not operating during this flow of permeate water. In preferred examples, the water for flushing takes the same path through the pump to the reverse osmosis units as input water undergoing purification. In preferred examples, the flush combination valve 952 is open, thereby allowing the concentrate to flow at high rate away from the system.

After a selected time, a boost pump is switched on for a selected period. The pump may be switched on from about one to 30 seconds after the valves are opened, or from about one to 20 seconds, or from about five seconds to about 15 seconds. The pump may be on for about one second to about 15 seconds, or from about one to about 10 seconds or from about one to about 6 seconds. In preferred examples, the pump is on for 5 seconds. The boost pump increases the flow rate through the system, creating sufficient turbulence to remove unwanted material that has accumulated on the system. In preferred examples, the flow rate is increased up to 15 times the flow rate of under normal operation, or up to 12 times, up to 10 times, or up to 5 times.

The pump is shut off after a selected period and a new cycle is started. The boost pump activation time and the interval between pump activations may remain the same or may vary cycle to cycle. In various examples, each cycle uses about 1 to about 8 gallons of permeate water, each cycle uses about 1 to about 6 gallons of permeate water, and each cycle uses about 3 to about 5 gallons of permeate water. In particularly preferred examples. According to preferred examples, the water is flushed from the system during each cycle and sent to a drain.

The number of cycles for flushing may be preset. In other examples, the number of cycles may be linked to the performance of the system. For example, a TDS monitor may be used to follow the amount of TDS found in the flushed water. In one example, when the TDS level of flushed water reaches a level close to the TDS level of the permeate water stored in a tank, then the flushing cycle may be stopped. According to the disclosure, after the desired number of flushing cycles, the flush valve are closed and the system resumes normal operation. Table 3 summarizes one possible sequence for three cycles of permeate flushing. According to this disclosure, there may be up to 20 cycles, up to 15 cycles, up to 10 cycles, up to 5 cycles.

In other examples, a second pump may be utilized to pump water from a storage tank to the system to facilitate transfer of permeate water to the system during the flushing process. For example, the pump may be utilized if the storage tank is not pressurized sufficiently for the flow of permeate water to the system.

TABLE 3

Example of Permeate flush cycle fill tank to 83 psi
turn off pump
1-open flush valves -10 sec
2- turn on pump - 5 sec
3- turn off pump - 10 sec
4- turn on pump - 5 sec
5- turn off pump - 10 sec
6- turn on pump - 5 sec
7 - turn off pump
8- After pump off, turn off flush valves
9- turn on pump until tank reaches 83 psi
10- turn on flush 10 sec Example 5

According to preferred examples, a system of the disclosure may monitor and transmit data to advise a user on the status of a system. The data may be obtained from sensors placed at locations throughout the system. In some examples, a system includes a monitor or similar device that displays data about the system. A system may include a control unit that receives the sensor information. In some examples, a user may be able to alter the performance of the system by using keypad, or similar device, to change the parameters and, therefore, the operation of the system.

In preferred examples, a system may transmit information to a remote location. In preferred examples, data about the system status may be transmitted to a user's electronic device using a cellular network or a WiFi network. For example, the data be transmitted to an application on a user's device, such as handheld phone. The application may be designed so that a user may select desired parameters to be visualized from a list of monitored parameters.

In preferred examples, the system may transmit data relating to least one of the following, without limitation: water pressure at different sites in the system, flow rate, gallons of water since last service, warnings concerning component lifetime, total dissolved solids in input water, total dissolved solids in output water, water flow details and alarms concerning pressure at different sites in the system. For example, the system may transmit data that includes one or more of the parameters listed in Table 2.

TABLE 2

Items to Display
Pressures - inlet
concentrate
outlet
Flow (all)

Inlet
Outlet
Concentrate
Recovery rate %
total gallons (from last service) pre filter
total gallons (from last service) membrane
total gallons (from last service) ACC, Pre filter
total gallons (from last service) ACC, Post filter
Filter % left
Membrane % left
Change filter warning/Pre filters
Change Membrane warning
Change pre filter warning (accessory)
Change post filter warning (accessory)
TDS In & Out
Flow usage chart day
week
month
12 months
year to year
Alarms TDS to high
Pump pressure to low (under 100 psi)
inlet pressure to low (under 10 psi)
Pump pressure to high (over 220 psi)
pre filter life at 10%
Pre filter life at 0%
membrane life at 10%

In some examples, the system may only transmit data to inform a user on the status of the system and the user may not be able to after system parameters to effect system performance. In other examples, a user may be able to change the performance of the system from a remote location. For example, and without limitation, a user may use an application on a handheld device to stop water flow, increase flow, increase or decrease the minerals added to the water after purification.

Obviously, many modifications and variations of the present disclosure are possible in light of the above teachings. It is, therefore, to be understood that within the scope of the disclosure, systems and methods may be practiced otherwise than as specifically described.

The invention claimed is:
1. A water treatment system, comprising
at least one filtration cassette;
wherein said at least one filtration cassette comprises at east two linked filtration cartridges;
wherein said at least two filtration cartridges are linked by an adaptor;
at least one reverse osmosis cassette;
wherein said at least one reverse osmosis cassette comprises at least two linked reverse osmosis cartridges:
said at least two reverse osmosis cartridges fluidly and physically linked by at least one first manifold and by at least one second manifolds;
said at least one first and said at least one second manifolds each having two channels;
said at least one first manifold flowing input water into said at least two reverse osmosis cartridges in a first channel;
said first manifold flowing permeate away from said at least two reverse osmosis cartridges in a second channel;
said second manifold flowing concentrate away from said at least two reverse osmosis cartridges;
wherein said first and second channels of each of said first manifold and of said second manifold are non-concentrically placed;
wherein said first and second channels of each of said first manifold and of said second manifold share a common wall;
wherein said at least two reverse osmosis cartridges of said at least one reverse osmosis cassette are in parallel;
said first manifold fluidly and physically connected to the bottom of said at least two reverse osmosis cartridges;
said second manifold fluidly and physically connected to the tops of said at least two reverse osmosis cartridges;
at least one pump;
a permeate flush assembly;
said permeate flush assembly comprising:
a permeate flush valve;
said permeate flush valve comprising plunger, said plunger disengaged during a flush cycle;
a one-way check valve;
a solenoid; and
a hydropneumatic tank;
wherein permeate flows from said hydropneumatic tank through said permeate flush valve to said at least one pump during a flush cycle;
permeate flowing from said at least one pump to said first channel of said first manifold during a flush cycle;
wherein the permeate follows the same path during a flush cycle as input water during purification;
a combination flush valve comprising a concentrate inlet communicating with said second manifold, a concentrate outlet, and first and second flow paths therethrough between said concentrate inlet and said concentration outlet,
wherein said first flow path includes a one-way check valve and a metering jet passage, and said second flow path includes a solenoid diaphragm valve;
a frame; and
at least one bypass unit.
2. The water treatment system of claim 1 wherein said hydropneumatic tank holds from about 30 gallons to about 100 gallons of water.
3. The water treatment system of claim 1 wherein said hydropneumatic tank is maintained from about 75 psi to about 80 psi when said hydropneumatic tank is full.

4. The water treatment system of claim 1 comprising a unit that transmits real time information about the status of said water treatment system.

5. The water treatment system of claim 1 wherein said bypass unit comprises an outlet, an inlet, a flow meter, a bypass valve, at least one TDS sensor and at least one pressure sensor.

6. The water treatment system of claim 1 wherein said frame comprises five sections.

7. The water treatment system of claim 1 wherein said frame is made from plastic.

8. The water treatment system of claim 1 wherein water from said tank is flowed through said permeate flush valve to said reverse osmosis cartridges in 5 to 10 second bursts during said flush cycle.

9. The water treatment system of claim 1 wherein water from said tank is flowed through said permeate flush valve to said at least two reverse osmosis cartridges at from about 10 to about 100 gallons per minute.

* * * * *